United States Patent [19]
Okuchi et al.

[11] Patent Number: 5,877,680
[45] Date of Patent: Mar. 2, 1999

[54] APPARATUS FOR AUTOMATICALLY ADJUSTING AIMING OF HEADLIGHTS OF AN AUTOMOTIVE VEHICLE

[75] Inventors: Hiroaki Okuchi, Anjo; Kenichi Nishimura, Gifu; Takanori Ota, Aichi; Ryoji Kawakami, Toyota; Ryosuke Naito, Aichi; Yuji Yamada, Toyota, all of Japan

[73] Assignees: Denso Corporation, Kariya; Toyota Jidosha Kabushiki Kaisha, Toyota, both of Japan

[21] Appl. No.: 989,402

[22] Filed: Dec. 12, 1997

[30] Foreign Application Priority Data

Dec. 13, 1996 [JP] Japan .................................. 8-334140
Mar. 17, 1997 [JP] Japan .................................. 9-062634
Mar. 17, 1997 [JP] Japan .................................. 9-062635

[51] Int. Cl.$^6$ ........................................ B60Q 1/26
[52] U.S. Cl. .............. 340/468; 340/457.2; 362/464; 315/82
[58] Field of Search ............................ 340/468, 469, 340/457.2; 362/464, 465, 466; 315/82, 83

[56] References Cited

U.S. PATENT DOCUMENTS

| | | | |
|---|---|---|---|
| 5,182,460 | 1/1993 | Hussman ............................. | 315/82 |
| 5,588,733 | 12/1996 | Gotou .................................. | 315/82 |
| 5,633,710 | 5/1997 | Kumra et al. ...................... | 315/82 |
| 5,645,338 | 7/1997 | Kobayashi ........................... | 362/61 |
| 5,660,454 | 8/1997 | Mori et al. .......................... | 362/61 |

FOREIGN PATENT DOCUMENTS

| | | |
|---|---|---|
| 0 355 539 | 2/1990 | European Pat. Off. . |
| 0 470 401 | 2/1992 | European Pat. Off. . |
| 0 470 408 | 2/1992 | European Pat. Off. . |
| 0 554 663 | 8/1993 | European Pat. Off. . |
| 63-162386 | 7/1988 | Japan . |
| 63-166672 | 7/1988 | Japan . |
| 5-29857 | 4/1993 | Japan . |
| 5-250901 | 9/1993 | Japan . |
| 7-164960 | 6/1995 | Japan . |
| 7-277068 | 10/1995 | Japan . |
| 8-225039 | 9/1996 | Japan . |

*Primary Examiner*—Jeffery A. Hofsass
*Assistant Examiner*—Anh La
*Attorney, Agent, or Firm*—Pillsbury Madison & Sutro LLP

[57] ABSTRACT

A pitch angle in the back-and-forth direction of the vehicle body is calculated based on output signals of height sensors disposed at front and rear wheels of the vehicle. A vehicle traveling speed is obtained. A vehicle acceleration is obtained from the vehicle traveling speed. Using the vehicle traveling speed and the vehicle acceleration, a judgement is made to determine the control mode corresponding to the vehicle traveling condition, by selecting one from the group consisting of a stopping mode, an acceleration mode, a deceleration mode and a constant-speed mode. An actuator target value (i.e., target aiming adjustment angle) is calculated in accordance with the determined control mode. To obtain this actuator target value, a filter is used to process the pitch angle so that the headlights do not dazzle an oncoming vehicle's driver. Then, the aiming adjustment for the headlights is performed by actuating actuators in accordance with the actuator target value. The pitch angle is adequately processed by using a preferable filter. Therefore, the aiming adjustment of the headlights is not performed unnecessarily or erroneously.

15 Claims, 19 Drawing Sheets

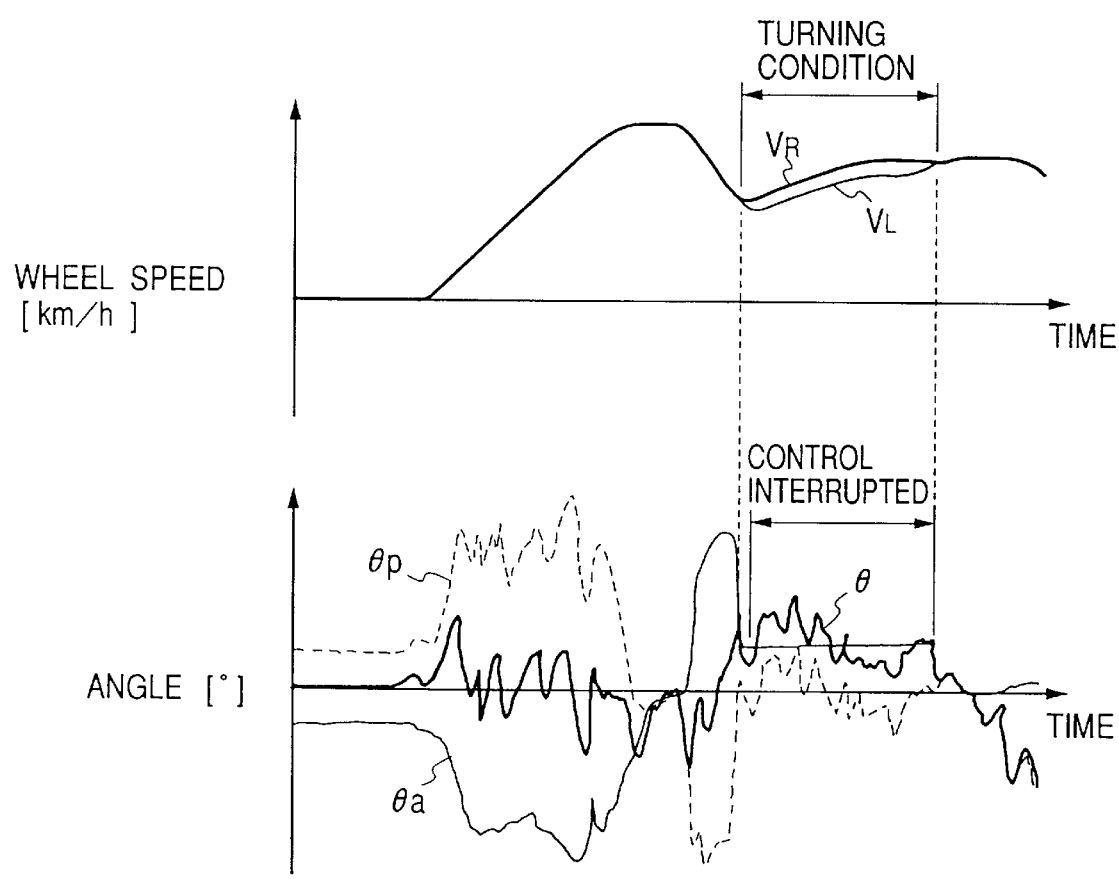

APPARATUS FOR AUTOMATICALLY ADJUSTING AIMING OF HEADLIGHTS OF AN AUTOMOTIVE VEHICLE

BACKGROUND OF THE INVENTION

The present invention relates to an automatic aiming adjustment apparatus for automatically adjusting an aiming direction of headlights installed on an automotive vehicle.

Conventionally, an aiming adjustment of headlights of an automotive vehicle has been carefully performed. If the optical axis of the headlights is directed toward a too much higher level due to an inclination of a vehicle body, the headlights may dazzle an oncoming vehicle's driver. If the optical axis of the headlights is directed toward a too much lower level, the subjective vehicle's driver may lose the far field of view. Thus, there is an earnest desire to accurately maintain the optical axis of the headlights within an optimum range.

Unexamined Japanese Patent Application No. 8-225039, published in 1986, discloses a related technique. According to this prior art, a vertical acceleration or deceleration is obtained from rotational speed signals of a vehicle wheel. The obtained vertical acceleration or deceleration is then used to obtain a signal representing a dynamic change of the level or height of the vehicle body. An actuator (i.e., operating element) is driven in accordance with the signal representing the dynamic change of the vehicle's level or height, to realize an automatic aiming adjustment for the headlights.

The above-described aiming adjustment for the vehicle headlights disclosed in the Unexamined Japanese Patent Application No. 8-225039 is simple in arrangement. However, this system is disadvantageous in that the aiming adjustment may be performed contrarily to the driver's intent. For example, when the vehicle is accelerated or decelerated on a rough road, the actuator is driven frequently in response to the surface roughness of the load.

Unexamined Japanese Utility Model Application No. 5-29857, published in 1993, discloses another related technique. According to this prior art, a vehicle's stopping condition is detected. And, the aiming adjustment of the headlights is performed based on a variation in the vehicle height when the automotive vehicle is stopped.

SUMMARY OF THE INVENTION

The present invention has an object of providing a novel and excellent apparatus for automatically adjusting aiming of headlights of an automotive vehicle which is capable of controlling the aiming of the headlights in accordance with a vehicle traveling condition so as to eliminate any erroneous or undesirable aiming adjustments.

In order to accomplish the above-described and other related objects, a first aspect of the present invention provides an apparatus for automatically adjusting aiming of headlights of an automotive vehicle characterized by the following features. For example, vehicle height sensors are provided at front and rear portions of a vehicle body. A gradient calculating means calculates an inclination of an aiming direction of the headlights of the automotive vehicle with respect to a horizontal plane based on output values of the vehicle height sensors. For example, a wheel speed sensor detecting a rotational speed of a vehicle wheel is used to detect a vehicle traveling speed. An acceleration of the vehicle body is calculated using the vehicle wheel speed. A mode setting means determines a control mode suitable for a present traveling condition based on the vehicle traveling speed and the acceleration of the automotive vehicle. A filter switching means selects a preferable one of a plurality of filters in accordance with the control mode determined by the mode setting means. The plurality of filters are provided for changing response sensitivity in the aiming adjustment for the headlights. An aiming adjusting means adjusts the aiming direction of the headlights based on a filtered angle which is obtained by modifying the inclination calculated by the gradient calculating means with the filter selected by the filter switching means. With this arrangement, the inclination is properly amended by using the filter suitable for the vehicle traveling condition. Thus, the aiming adjustment for the headlights can be adequately performed.

Preferably, the mode setting means sets an initial control mode for a predetermined time immediately after the control mode is switched. With this arrangement, the aiming adjustment is performed promptly according to the initial control mode for the predetermined time immediately after the control mode is switched. In general, there is a tendency that the inclination of the vehicle body is largely changed immediately after the control mode is switched.

Preferably, the mode setting means sets the initial control mode only when the absolute value of a change in the inclination of the aiming direction exceeds a predetermined value during the predetermined time immediately after the control mode is switched. With this arrangement, the aiming adjustment is performed promptly according to the initial control mode when the inclination of the aiming direction causes a large variation in the absolute value immediately after the control mode is switched.

Preferably, the mode setting means sets the initial control mode only when a change in the inclination of the aiming direction exceeds a predetermined value corresponding to an acceleration or a deceleration of the automotive vehicle during the predetermined time immediately after the control mode is switched. With this arrangement, the aiming adjustment is performed promptly according to the initial control mode when the inclination of the aiming direction causes a large variation due to acceleration or deceleration immediately after the control mode is switched.

Preferably, the mode setting means sets the initial control mode only when both a change in the acceleration of the automotive vehicle and a change in the inclination exceed predetermined values respectively corresponding to an acceleration or a deceleration of the automotive vehicle during the predetermined time immediately after the control mode is switched. With this arrangement, the aiming adjustment is performed promptly according to the initial control mode when both the acceleration of the automotive vehicle and the inclination of the aiming direction cause large variations due to acceleration or deceleration immediately after the control mode is switched.

Preferably, the mode setting means sets the initial control mode only when a change in the inclination exceeds a predetermined value corresponding to an acceleration or a deceleration of the automotive vehicle and a change of an output value obtained from the vehicle height sensor is within a predetermined value during the predetermined time immediately after the control mode is switched. With this arrangement, the aiming adjustment is performed promptly according to the initial control mode when the inclination of the aiming direction causes a large variation due to acceleration or deceleration immediately after the control mode is switched but the output of the vehicle height sensor is a smaller value within the predetermined value.

Preferably, the mode setting means calculates a vehicle traveling speed by accumulating pulse numbers detected by the vehicle speed sensor for a predetermined time required to assure desired acceleration accuracy in determining the control mode, and renews the vehicle traveling speed every predetermined time corresponding to an adjustment interval for the aiming adjustment performed by the aiming adjusting means. With this arrangement, it becomes possible to obtain the desirable acceleration accuracy. And, the aiming adjustment is performed promptly by renewing the vehicle traveling speed every predetermined time corresponding to the aiming adjustment interval.

Preferably, an inclination correcting means is used in an event of malfunction of the system for correcting the inclination calculated by the gradient calculating means based on a deviation of a present output value of the vehicle height sensor from a referential output value representing a standard vehicle height. With this arrangement, when the system malfunctions, an output error caused by a mistake in installation of the vehicle height sensor is adequately corrected. Thus, the aiming direction of the headlights can be adjusted to an angle corresponding to the referential vehicle height.

Preferably, a mean angle is obtained as an average of the inclination calculated by the gradient calculating means when the automotive vehicle is traveling at a constant speed, and the aiming adjusting means adjusts the aiming direction of the headlights based on the mean angle of the inclination in an event of malfunction of the system. With this arrangement, when the system malfunctions, the aiming direction of the headlights is corrected to an adequate angle corresponding to the mean angle obtained as an average of the inclination when the automotive vehicle is traveling at a constant speed, which is an aiming direction of the headlights when the vehicle attitude is stabilized.

Furthermore, a second aspect of the present invention provides an apparatus for automatically adjusting aiming of headlights of an automotive vehicle characterized by the following features. For example, vehicle height sensors are provided at front and rear portions of a vehicle body. A gradient calculating means calculates an inclination of an aiming direction of the headlights of the automotive vehicle with respect to a horizontal plane based on output values of the vehicle height sensors. For example, a wheel speed sensor detecting a rotational speed of a vehicle wheel is used to detect a vehicle traveling speed. An acceleration of the vehicle body is calculated using the vehicle wheel speed. A mode setting means determines a control mode suitable for a present traveling condition based on the vehicle traveling speed and the acceleration of the automotive vehicle. A filter switching means selects a preferable one of a plurality of filters in accordance with the control mode determined by the mode setting means. The plurality of filters are provided for changing response sensitivity in the aiming adjustment for the headlights. An aiming adjusting means adjusts the aiming direction of the headlights based on a filtered angle which is obtained by modifying the inclination calculated by the gradient calculating means with the filter selected by the filter switching means. The mode setting means provides a plurality of judging levels for checking the vehicle acceleration. When the vehicle acceleration exceeds a lower judging level of the plurality of judging levels for a predetermined time or when the vehicle acceleration exceeds an upper judging level of the plurality of judging levels, it is judged that there is a tendency that the automotive vehicle will soon enter into an acceleration or deceleration condition. Thus, the control mode is set to an appropriate mode corresponding to vehicle's accelerating or deceleration condition. With this arrangement, the inclination is properly amended by using the filter suitable for the vehicle traveling condition. Thus, the aiming adjustment for the headlights can be adequately performed. In this case, when there is a tendency that the automotive vehicle will soon enter into an acceleration or deceleration condition, the filtering of the inclination is performed at an earlier timing. Thus, the aiming adjustment for the headlights can be quickly and properly performed, increasing utility of the aiming system.

Preferably, the aiming adjusting means comprises the aiming correcting means. Thus, the target aiming direction, set as an initial value for the headlights, can be corrected in accordance with at least one of the braking distance corresponding to the present vehicle traveling speed and the distance to a preceding vehicle. Accordingly, the driver's visibility can be improved when the automotive vehicle is running on a highway. Even when the vehicle-to-vehicle distance is reduced, the aiming adjustment of the headlight can be performed adequately.

Furthermore, a third aspect of the present invention provides an apparatus for automatically adjusting aiming of headlights of an automotive vehicle characterized by the following features. For example, vehicle height sensors are provided at front and rear portions of a vehicle body. A gradient calculating means calculates an inclination of an aiming direction of the headlights of the automotive vehicle with respect to a horizontal plane based on output values of the vehicle height sensors. For example, a wheel speed sensor detecting a rotational speed of a vehicle wheel is used to detect a vehicle traveling speed. An acceleration of the vehicle body is calculated using the vehicle wheel speed. A mode setting means determines a control mode suitable for a present traveling condition based on the vehicle traveling speed and the acceleration of the automotive vehicle. A filter switching means selects a preferable one of a plurality of filters in accordance with the control mode determined by the mode setting means. The plurality of filters are provided for changing response sensitivity in the aiming adjustment for the headlights. An aiming adjusting means adjusts the aiming direction of the headlights based on a filtered angle which is obtained by modifying the inclination calculated by the gradient calculating means with the filter selected by the filter switching means. In this case, when the turning judging means judges that the automotive vehicle is turning, the aiming adjustment performed by the aiming adjusting means is interrupted. The aiming adjustment for the headlights can be performed with appropriate response sensitivity by processing an inclination with an optimum filter corresponding to the vehicle driving condition. When the automotive vehicle is turning, the aiming adjustment is interrupted. Even when the vehicle body shows unstable behavior, the aiming adjustment for the headlights is performed properly.

It is also preferable that, when the turning judging means judges that the automotive vehicle is turning, the aiming direction set by the aiming adjusting means is returned to the initial position, or response of the aiming adjustment performed by the aiming adjusting means is delayed.

Preferably, the aiming adjustment for the headlights performed by the aiming adjusting means does not immediately start in response to a detection of the turning condition of the automotive vehicle. A predetermined time has passed, the aiming adjustment is started. Accordingly, the aiming direction of the headlights is surely stabilized before the aiming adjustment for the turning condition is performed. Thus, it becomes possible to prevent the headlights from dazzling an oncoming vehicle's driver or prevent the subjective vehicle's driver from losing the visibility in a far area.

BRIEF DESCRIPTION OF THE DRAWINGS

The above and other objects, features and advantages of the present invention will become more apparent from the following detailed description which is to be read in conjunction with the accompanying drawings, in which:

FIG. 21 is a timing diagram showing an aiming control during a tuning condition performed by the automatic aiming adjustment apparatus for the headlights of an automotive vehicle in accordance with the third embodiment of the present invention;

DESCRIPTION OF THE PREFERRED EMBODIMENTS

Figure 1:
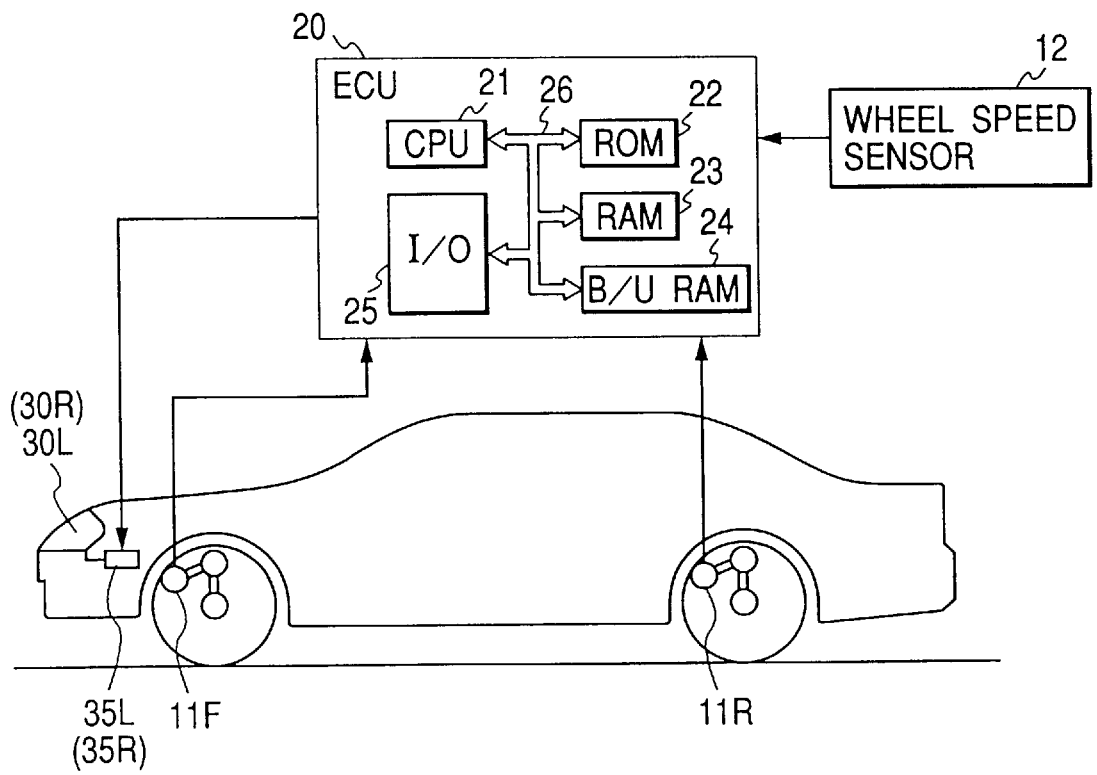
FIG. 1 is a schematic view showing an overall arrangement of an automatic aiming adjustment apparatus for the headlights of an automotive vehicle in accordance with a first embodiment of the present invention.

Preferred embodiments of the present invention will be explained hereinafter with reference to accompanied drawings. Identical parts are denoted by the same reference numerals throughout the drawings.

First Embodiment

FIG. 1 is a schematic diagram showing an overall arrangement of an automatic aiming adjustment apparatus for the headlights of an automotive vehicle in accordance with a first embodiment of the present invention.

In FIG. 1, a front (i.e. front wheel) height sensor (i.e., vehicle height sensor) 11F is provided on a front suspension provided between a front axle shaft and a vehicle body at a driver's seat side or an assistant driver's seat side. A rear (i.e. rear wheel) height sensor (i.e., vehicle height sensor) 11R is provided on a rear suspension provided between a rear axle shaft and the vehicle body at the driver's seat side or the assistant driver's seat side. The height sensor 11F detects a relative displacement (i.e., a displacement in the vehicle height) between the front axle shaft and the vehicle body, and generates a front height value (i.e., a displacement in the vehicle height at the front wheel side) HF. The height sensor 11R detects a relative displacement (i.e., a displacement in the vehicle height) between the rear axle shaft and the vehicle body, and generates a rear height value (i.e., a displacement in the vehicle height at the rear wheel side) HR. A wheel speed sensor 12, acting as a vehicle traveling speed sensor, is provided on the vehicle body. An output signal of this wheel speed sensor 12 is used for controlling a conventional ABS (i.e., Antilock Brake System). The wheel speed sensor 12 generates vehicle wheel speed pulses. Various sensor signals, including the vehicle wheel speed pulses, are entered into ECU (i.e., Electronic Control Unit) 20 installed on the automotive vehicle. For convenience' sake, both ECU 20 and the wheel speed sensor 12 are shown outside the vehicle body in FIG. 1.

ECU 20 is a logic circuit comprising CPU 21 functioning as a well-known central processing unit, ROM 22 storing control programs, RAM 23 storing various data, B/U (i.e., backup) RAM 24, an input/output circuit 25 and a bus line 26 connecting these components.

ECU 20 produces an output signal which is sent to actuators 35R and 35L of right and left headlights 30R and 30L. An aiming adjustment is performed for the right and left headlights 30R and 30L as described later. Various sensor signals, including the wheel speed sensor 12, are used to judge a present mode of the automotive vehicle among a constant speed mode, a stopping mode, an acceleration mode, a deceleration mode etc.

Figure 2:
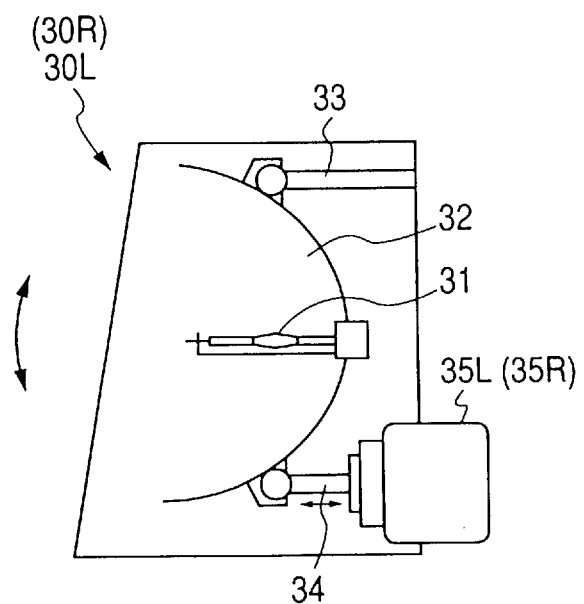
FIG. 2 is a cross-sectional view showing an essential arrangement of a headlight shown in FIG. 1.

FIG. 2 is a cross-sectional view showing an essential arrangement of the headlight 30L (or 30R) shown in FIG. 1.

As shown in FIG. 2, the headlight 30L (or 30R) comprises a lamp 31, a reflector 32 securely supporting the lamp 31, a stationary support rod 33 supporting one end of the reflector 32 swingable as shown by an arc arrow, a movable support rod 34 supporting the other end of the reflector 32 and shiftable in a back-and-forth arrow direction, and an actuator 35L (or 35R), such as a stepping motor or a DC motor, actuating the movable rod 34 in the back-and-forth arrow direction. Accordingly, the reflector 32 is inclined in an up-and-down direction by a later-described actuator target value (i.e., target aiming adjustment angle) θa about the distal end of the stationary support rod 33 in response to a back-and-forth movement of the movable support rod 34 shifted by the actuator 35L (35R). Thus, the aiming direction of each headlight 30L(30R) is adjusted. An initial setting for the aiming direction of each headlight 30L(30R) is performed beforehand, assuming a condition where only one passenger (i.e., a driver) is in the automotive vehicle.

The automatic aiming adjustment apparatus for the headlights of an automotive vehicle in accordance with this embodiment uses a back-and-forth pitch angle θp of the automotive vehicle. Hereinafter, a calculation for obtaining the back-and-forth pitch angle θp will be explained.

The back-and-forth pitch angle θp [°] is defined as a back-and-forth inclination of the automotive vehicle with respect to a predetermined reference plane and calculated using the following equation based on the front height value HF obtained from the height sensor 11F and the rear height value HR obtained from the rear height sensor 11R which are entered into ECU 20 together with other various sensor signals. In the following equation, Lw is a wheelbase (i.e., the distance between front and rear axles in a traveling direction) between the front wheel and the rear wheel.

$$\theta p = \tan^{-1}\{(HF-HR)/Lw\} \quad (1)$$

Figure 3:
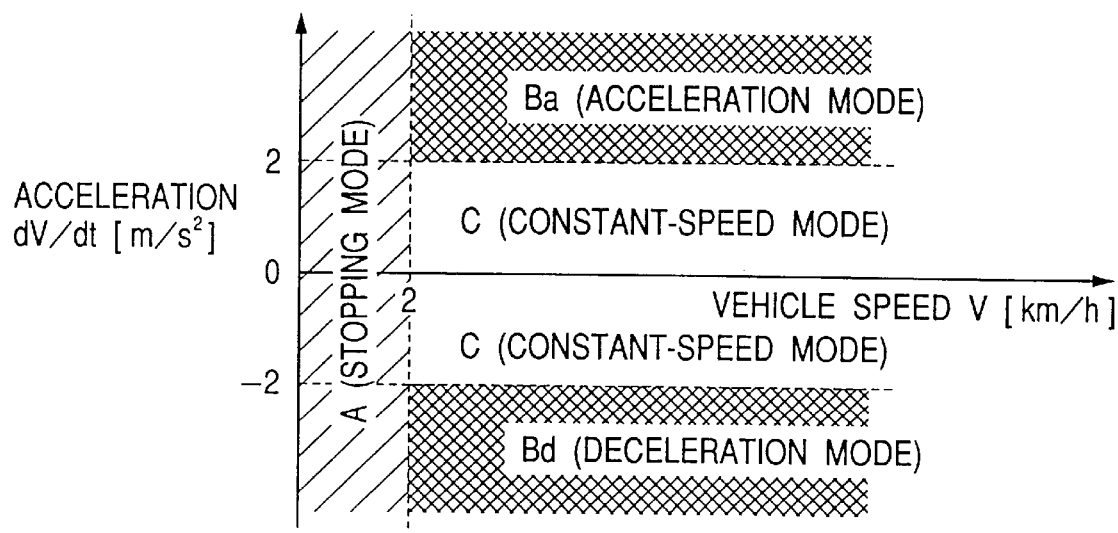
FIG. 3 is a table-like graph showing filter regions corresponding to control modes used in the automatic aiming adjustment apparatus for the headlights of an automotive vehicle in accordance with the first embodiment of the present invention.

FIG. 3 is a graph showing table-like filter regions representing various control modes used in the automatic aiming adjustment apparatus for the headlights of an automotive vehicle in accordance with the first embodiment of the present invention. In FIG. 3, an abscissa is a vehicle traveling speed V [km/h], while an ordinate is a vehicle acceleration dV/dt [m/s$^2$] which is a differential value of the vehicle traveling speed V. A plurality of filter regions A, Ba, Bd and C are provided for vehicle control modes (i.e., stopping mode, acceleration mode, deceleration mode, and constant-speed mode). The filter region Ba (i.e., acceleration mode) includes an auxiliary filter Ba1 corresponding to an initial acceleration mode assuming an initial acceleration stage continuing immediately after the control mode is switched, as well as another auxiliary filter Ba2 corresponding to a succeeding acceleration mode continuing after the initial acceleration mode. The filter region Bd (i.e., deceleration mode) includes an auxiliary filter Bd1 corresponding to an initial deceleration mode assuming an initial deceleration stage continuing immediately after the control mode is switched, as well as another auxiliary filter Bd2 corresponding to a succeeding deceleration mode continuing after the initial deceleration mode. The filter region C (i.e., constant-speed mode) includes an auxiliary filter C1 corresponding to an initial constant-speed mode assuming an initial constant-speed stage continuing immediately after the control mode is switched, as well as another auxiliary filter C2 corresponding to a succeeding constant-speed mode continuing after the initial constant-speed mode. These filters can be constituted by using a hardware arrangement capable of processing the height sensor signals (for example, a CR circuit having a capability of smoothing signals), or by using a software arrangement capable of processing the height sensor signals and the pitch angles (for example, a signal smoothing operation performed by ECU using a moving average method or a standard deviation method). The present system incorporates ECU. Thus, from the view point of cost, the present embodiment is based on the moving average method applied for processing the pitch angles.

In judging the filter region Ba (i.e., acceleration mode) or the filter region Bd (i.e., deceleration mode) in FIG. 3, the present embodiment uses the vehicle traveling speed V which is calculated based on the wheel speed pulses detected by the wheel speed sensor 12. When the automotive vehicle travels on a rough road, a rough road surface may induce a fluctuation in the wheel rotation. Thus, there is a possibility that an acceleration may be erroneously detected due to the fluctuation caused by the rough road surface nevertheless the vehicle is running at a constant speed. In response to this erroneous detection of an acceleration, usage of a filter may be interrupted and an aiming adjustment may be performed unnecessarily. To prevent such errors in the judgement of the filter region Ba (i.e., acceleration mode) or the filter region Bd (i.e., deceleration mode), it is preferable to carefully judge the acceleration only when a detected accelerated value exceeds a threshold (e.g., 2 m/s$^2$) continuously for a predetermined time equivalent to several detecting cycles or several tens to hundreds msec. If desirable, this judgement can be used for judging only one of the acceleration and the deceleration.

Figure 4:
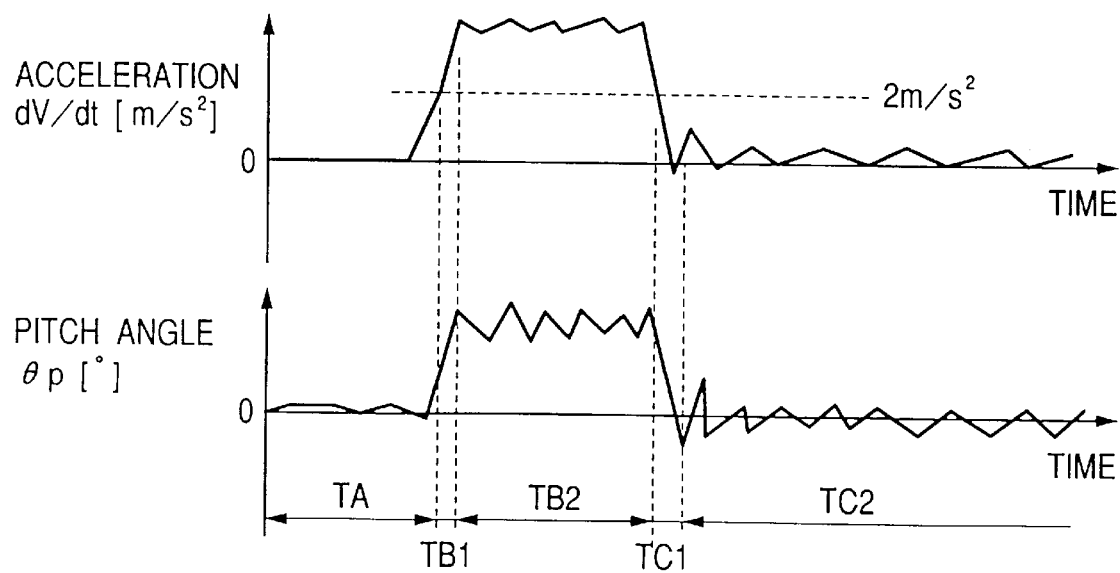
FIG. 4 is a graph showing a relationship between an acceleration and a pitch angle observed in response to the transfer of the control mode of the automotive vehicle in the automatic aiming adjustment apparatus for the headlights of an automotive vehicle in accordance with the first embodiment of the present invention.

FIG. 4 shows a relationship between the acceleration dV/dt [m/s$^2$] and the pitch angle θp [°] observed when the control mode of the automotive vehicle transfers from the stopping mode to the acceleration mode and further to the constant-speed mode. Hereinafter, an automatic aiming adjustment for the headlight 30L (30R) of the automotive vehicle will be schematically explained with reference to FIG. 4 in addition to FIG. 3 showing the filter regions corresponding to the above-described control modes.

In FIGS. 3 and 4, first of all, the control mode of the automotive vehicle is changed from the stopping mode (i.e., time band TA) to the acceleration mode (i.e., time band TB2). In response to this earlier change, the filter region is changed from the filter region A to the filter region Ba. Subsequently, the control mode is changed from the acceleration mode (i.e., time band TB2) to the constant-speed mode (i.e., time band TC2). In response to this later change, the filter region is changed from the filter region Ba to the filter region C. As shown in FIG. 4, during a transient period immediately after the control mode is switched (i.e., time bands TB1 and TC1), the pitch angle θp causes large fluctuation. However, after the passage of this duration, the fluctuation of the pitch angle θp calms down soon. If a strong filter is used to process the pitch angle θp obtained during the transient period (i.e., time bands TB1 and TC1) of the control mode, response will be worsened in the automatic aiming adjustment of the headlight 30L (30R) of the automotive vehicle. Thus, no filter or a very weak filter is used during the transient period (i.e., time bands TB1 and TC1) of the control mode. Subsequently, as an ordinary filter switching operation, a weak filter is used for processing pitch angle θp in the acceleration mode (i.e., time band TB2) while a strong filter is used in the constant-speed mode (i.e., time band TC2). In this manner, as described later in greater detail, each filter (A, Ba1, Ba2, Bd1, Bd2, C1, C2) of the filter region shown in FIG. 3 is switched in accordance with the control mode of the automotive vehicle (i.e., stopping mode, initial acceleration mode, ordinary acceleration mode, initial deceleration mode, ordinary deceleration mode, initial constant-speed mode, and ordinary constant-speed mode). The pitch angle θp, generated when the vehicle is traveling, is processed by using a selected filter so as to adequately adjust the aiming direction of the headlight 30L (30R).

Figure 5:
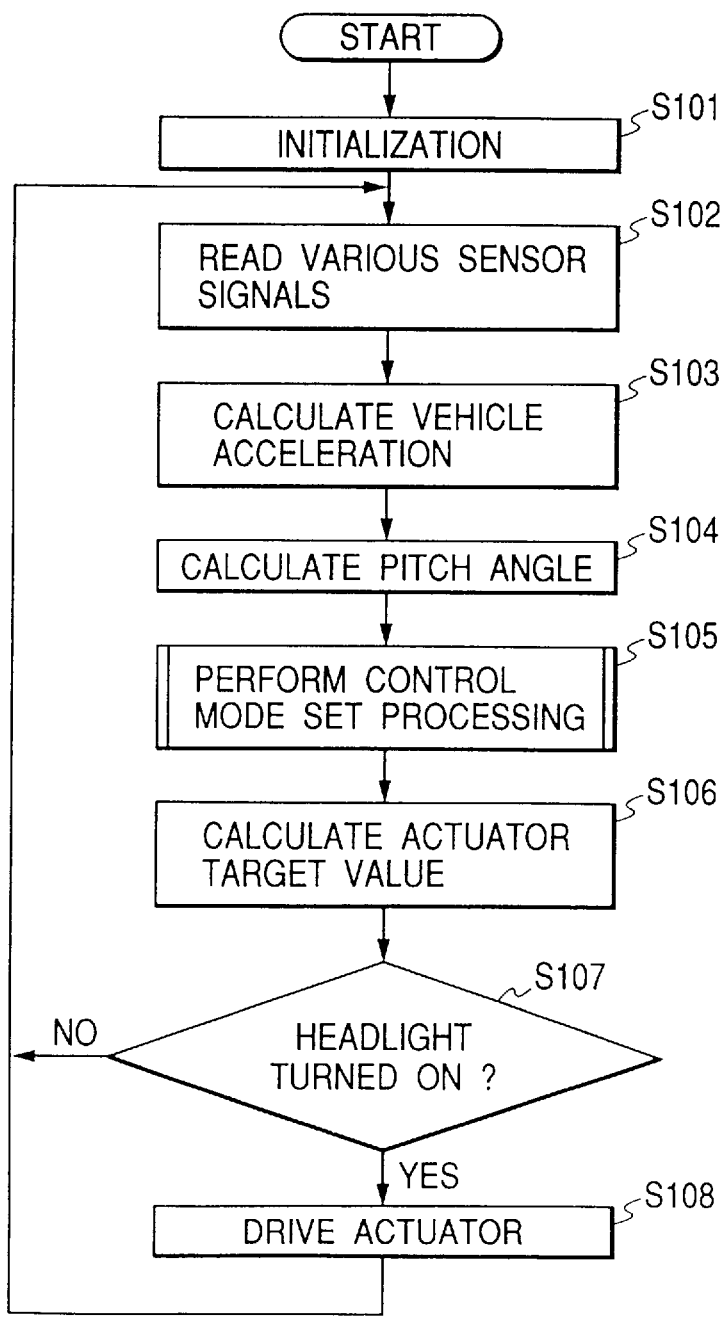
FIG. 5 is a flowchart showing a main routine performed in CPU of ECU used in the automatic aiming adjustment apparatus for the headlights of an automotive vehicle in accordance with the first embodiment of the present invention.

FIG. 5 is a flowchart showing a main routine performed in CPU 21 of ECU 20 incorporated in the automatic aiming adjustment apparatus for the headlights of an automotive vehicle in accordance with the first embodiment of the present invention. This main routine is executed at intervals of approximately 50 msec.

In FIG. 5, step S101 performs initialization processing. Next, step S102 reads various sensor signals including the wheel speed pulses, the front height value HF, and the rear height value HR. Step S103 calculates a vehicle acceleration α(=dV/dt) which is a differential value of the vehicle traveling speed V obtained from the wheel speed pulses read in step S102. Step S104 calculates the pitch angle θp based on the equation (1) using the front height value HF and the rear height value HR read in step S102. Step S105 executes control mode set processing which will be described later in greater detail.

Next, step S106 calculates a target actuator value (i.e., target aiming adjustment angle) θa which does not dazzle an oncoming vehicle's driver. In this case, θa ≈−θpf, where θpf is a pitch angle processed by a filter in the control mode set processing performed in the step S105. Step S107 judges whether the headlight 30L (30R) is tuned on or not. When the judgement condition is satisfied in step S107, i.e., when the headlight 30L (30R) is tuned on, step S108 drives the actuator 35L (35R) in accordance with the target actuator value θa calculated in step S106 so as to adjust the aiming direction of the headlight 30L (30R). Then, the control flow returns to step S102 to repetitively perform the processing of steps S102 through S108.

On the other hand, when the judgement condition is not satisfied in step S107, i.e., when the headlight 30L (30R) is tuned off, the control flow returns to step S102 without driving the actuator 35L (35R) and repetitively performs the processing of steps S102 through S107. Although not shown in the flowchart of FIG. 5, the control speed of the actuator 35L (35R) is variable and finely controlled in this embodiment.

Figure 6:
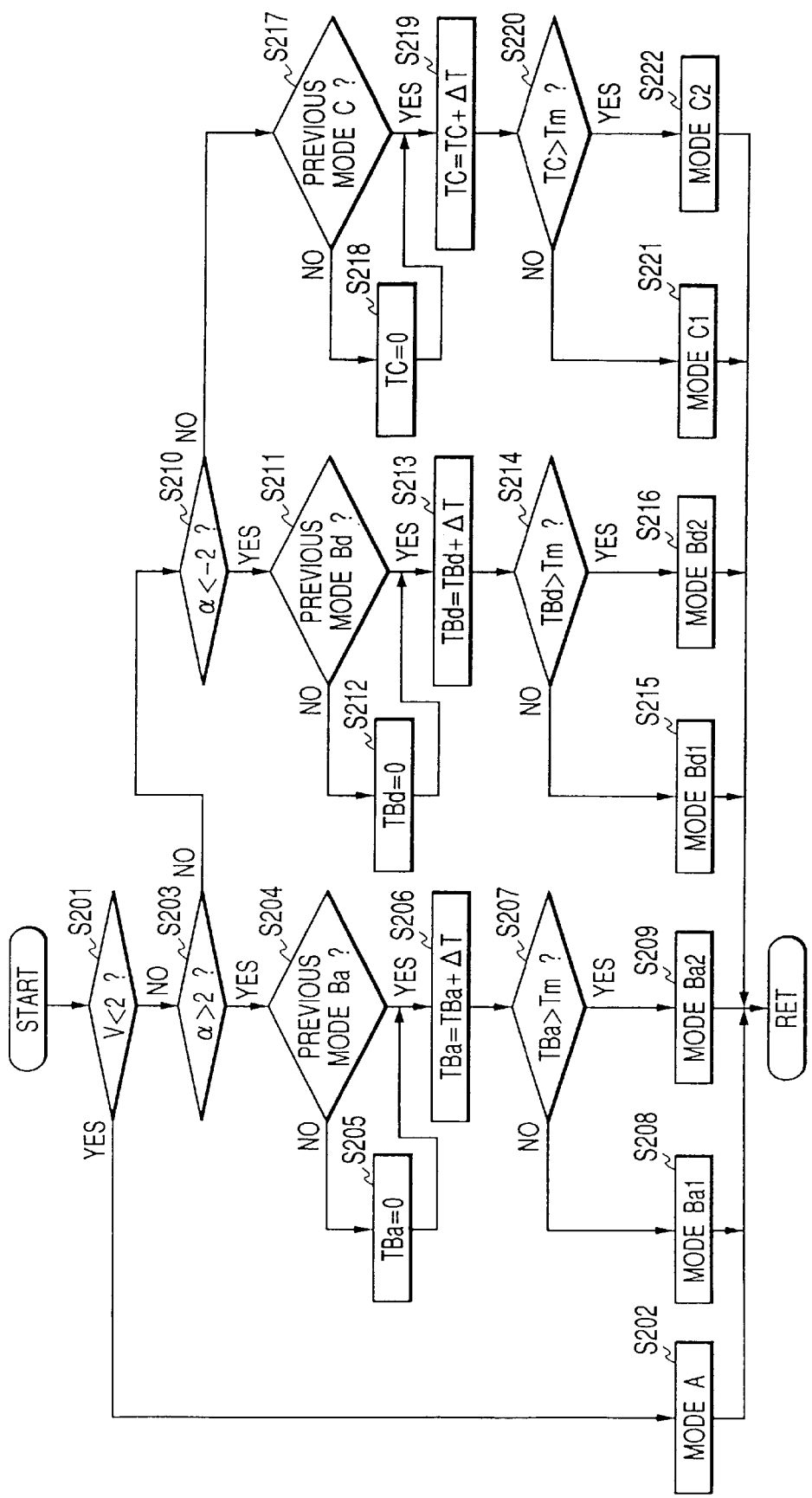
FIG. 6 is a flowchart showing a subroutine used in the control mode set processing shown in FIG. 5.

Next, details of the control mode set processing of step S105 will be explained. FIG. 6 shows a subroutine used for determining the control mode. The flowchart of FIG. 6 will be explained hereinafter with reference to the table-like graph of FIG. 3.

In FIG. 6, step S201 judges whether the vehicle traveling speed V is smaller than a predetermined value, e.g., 2 [km/h]. The judgement condition of step S201 is provided for detecting a stopping condition of the automotive vehicle. When the judgement condition is satisfied in step S201, i.e., when the vehicle traveling speed V is smaller than 2 [km/h], the control flow proceeds to step S202 and sets the stopping mode A corresponding to the filter region A shown in FIG. 3. In this filter region A, no filter or a very weak filter (equivalent to 1 sec moving average filter) is used. When the automotive vehicle is stopped, there is a possibility that the pitch angle may cause a large variation due to loading or unloading or the like. In such a case, it is preferable that the actuator responds quickly to the variation of the pitch angle. This is why no filter or a very weak filter is used in the filter region A. After setting the stopping mode A, this sub routine is terminated.

On the other hand, when the judgement condition is not satisfied in step S201, i.e., when the vehicle traveling speed V is not smaller than 2 [km/h], the control flow proceeds to step S203 and judges whether the vehicle acceleration α(=dV/dt), which is a differential value of the vehicle traveling speed V, is larger than a predetermined value, e.g., 2 [m/s²]. When the judgement condition is satisfied in step S203, i.e., when the vehicle acceleration α is larger than 2 [m/s²], the control flow proceeds to step S204 and further judges whether a previous control mode is the acceleration mode corresponding to the filter region Ba. When the judgement condition is not satisfied in step S204, the control flow proceeds to step S205 to reset an acceleration mode counter value TBa to "0." When the judgement condition is satisfied in step S204, i.e., when the previous control mode is the acceleration mode corresponding to the filter region Ba, or after finishing the processing of step S205, the control flow proceeds to step S206. In step S206, the acceleration mode counter value TBa is renewed by adding a sampling interval ΔT (i.e., TBa=TBa+ΔT).

Next, the control flow proceeds to step S207 to judge whether the acceleration mode counter value TBa exceeds an initial mode limit time Tm. When the judgement condition is not satisfied in step S207, i.e., when the acceleration mode counter value TBa is not larger than the initial mode limit time Tm, the control flow proceeds to step S208. The step S208 sets the initial acceleration mode Ba1 corresponding to the Ba1 filter (i.e., no filter) of the filter region Ba shown in FIG. 3. According to the initial acceleration mode Ba1, the pitch angle causes a large variation. Thus, no filter is used so that the actuator can respond quickly to the pitch angle variation occurring in an initial stage of the acceleration. Then, this subroutine is terminated. On the other hand, when the judgement condition is satisfied in step S207, i.e., when the acceleration mode counter value TBa exceeds the initial mode limit time Tm, the control flow proceeds to step S209. The step S209 sets the ordinary acceleration mode Ba2 corresponding to the Ba2 filter (equivalent to 1 sec moving average filter) of the filter region Ba shown in FIG. 3. According to the ordinary acceleration mode Ba2, a very weak filter is used so that the actuator can respond at an adequate faster speed to the variation of the pitch angle. Then, this subroutine is terminated.

Returning to the step S203, when the judgement condition is not satisfied, i.e., when the vehicle acceleration α is not larger than 2 [m/s²], the control flow proceeds to step S210 and further judges whether the vehicle acceleration α is smaller than −2 [m/s²]. When the judgement condition is satisfied in step S210, i.e., when the vehicle acceleration α is smaller than −2 [m/s²], the control flow proceeds to step S211 and further judges whether the previous control mode is the deceleration mode corresponding to the filter region Bd. When the judgement condition is not satisfied in step S211, the control flow proceeds to step S212 to reset a deceleration mode counter value TBd to "0." When the judgement condition is satisfied in step S211, i.e., when the previous control mode is the deceleration mode corresponding to the filter region Bd, or after finishing the processing of step S212, the control flow proceeds to step S213. In step S213, the deceleration mode counter value TBd is renewed by adding the sampling interval ΔT (i.e., TBd=TBd+ΔT).

Next, the control flow proceeds to step S214 to judge whether the deceleration mode counter value TBd exceeds the initial mode limit time Tm. When the judgement condition is not satisfied in step S214, i.e., when the deceleration mode counter value TBd is not larger than the initial mode limit time Tm, the control flow proceeds to step S215. The step S215 sets the initial deceleration mode Bd1 corresponding to the Bd1 filter (i.e., no filter) of the filter region Bd shown in FIG. 3. According to the initial deceleration mode Bd1, the pitch angle causes a large variation. Thus, no filter is used so that the actuator can respond quickly to the pitch angle variation occurring in an initial stage of the deceleration. Then, this subroutine is terminated. On the other hand, when the judgement condition is satisfied in step S214, i.e., when the deceleration mode counter value TBd exceeds the initial mode limit Tm, the control flow proceeds to step S216. The step S216 sets the ordinary deceleration mode Bd2 corresponding to the Bd2 filter (equivalent to 1 sec moving average filter) of the filter region Bd shown in FIG. 3. According to the ordinary deceleration mode Bd2, a very weak filter is used so that the actuator can respond at an adequate faster speed to the variation of the pitch angle. Then, this subroutine is terminated.

Returning to the step S210, when the judgement condition is not satisfied, i.e., when the vehicle acceleration α is not smaller than −2 [m/s²], the control flow proceeds to step S217 and further judges whether the previous control mode is the constant-speed mode corresponding to the filter region C. When the judgement condition is not satisfied in step S217, the control flow proceeds to step S218 to reset a constant-speed mode counter value TC to "0." When the judgement condition is satisfied in step S217, i.e., when the previous control mode is the constant-speed mode corresponding to the filter region C, or after finishing the processing of step S218, the control flow proceeds to step S219. In step S219, the constant-speed mode counter value TC is renewed by adding the sampling interval ΔT (i.e., TC=TC+ΔT).

Next, the control flow proceeds to step S220 to judge whether the constant-speed mode counter value TC exceeds the initial mode limit time Tm. When the judgement condition is not satisfied in step S220, i.e., when the constant-speed mode counter value TC is not larger than the initial mode limit time Tm, the control flow proceeds to step S221. The step S221 sets the initial constant-speed mode C1 corresponding to the C1 filter (i.e., no or 1 sec moving average filter) of the filter region C shown in FIG. 3. According to the initial constant-speed mode C1, the pitch angle causes a large variation. Therefore, no filter or a very weak filter is used so that the actuator can respond quickly to the pitch angle variation occurring in an initial stage of the constant-speed condition. Then, this subroutine is terminated.

On the other hand, when the judgement condition is satisfied in step S220, i.e., when the constant-speed mode counter value TC exceeds the initial mode limit Tm, the control flow proceeds to step S222. The step S222 sets the ordinary constant-speed mode C2 corresponding to the C2 filter (equivalent to 10 sec moving average filter) of the filter region C shown in FIG. 3. According to the ordinary constant-speed mode C2, the pitch angle does not cause a large variation. Therefore, a strong filter is used to cancel any pitch angle variation derived from higher-frequency components of the vehicle body vibration or surface roughness of the road. This is effective to prevent the actuator from erroneously responding to the disturbance-like variations of the pitch angle. Then, this subroutine is terminated.

Figure 7:
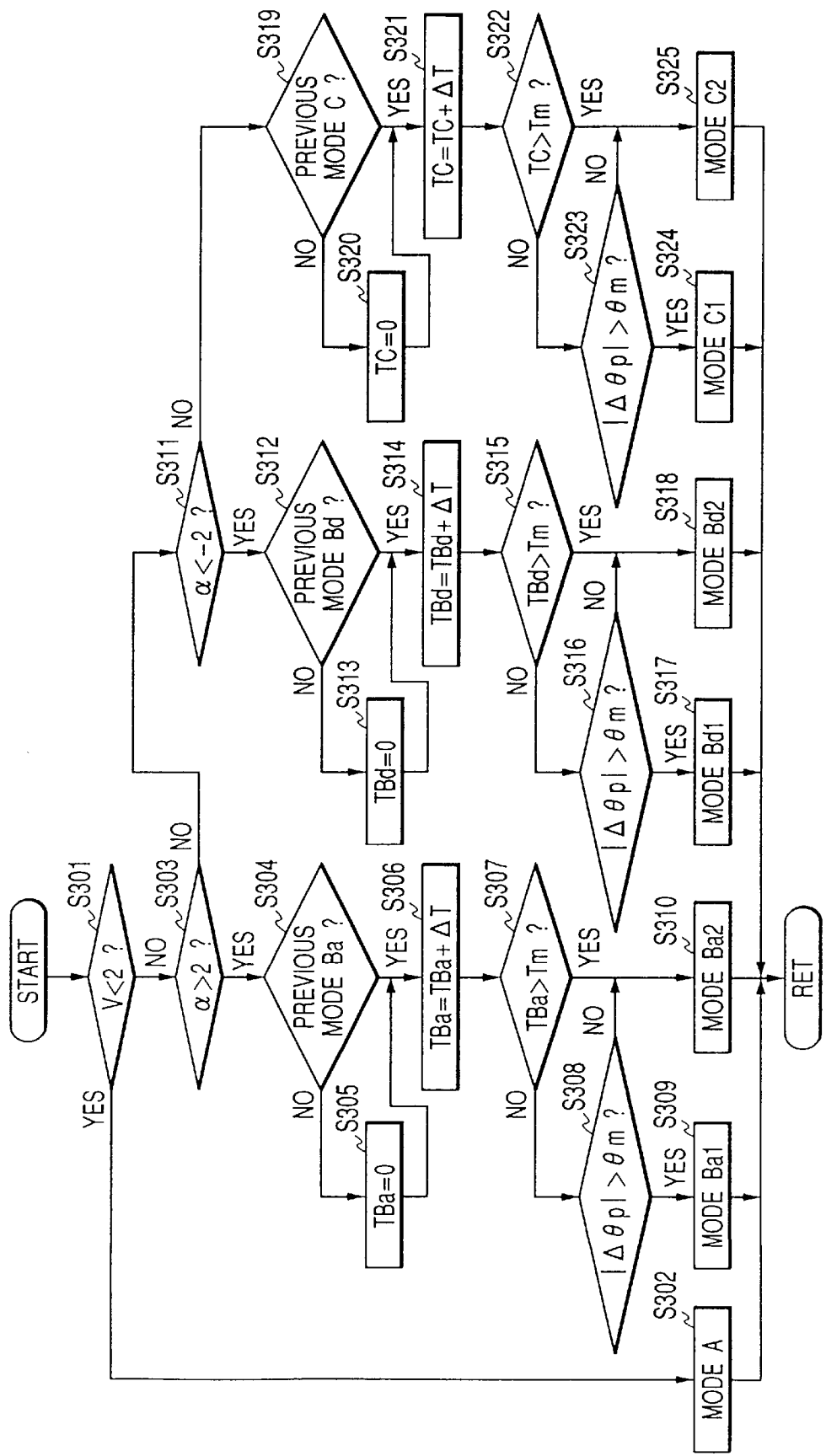
FIG. 7 is a flowchart showing another subroutine as a first modification of the control mode set subroutine shown in FIG. 6.

Next, FIG. 7 is a flowchart shows a first modified embodiment of the above-described control mode set subroutine of FIG. 6. The first modified embodiment will be explained hereinafter with reference to the table-like graph of FIG. 3. The first modified embodiment differs from the above-described embodiment of FIG. 6 in that the initial control mode is set only when the pitch angle causes a variation larger than a predetermined threshold. Because, there is no necessity of removing the filter when the pitch angle does not cause a large variation.

In FIG. 7, step S301 judges whether the vehicle traveling speed V is smaller than a predetermined value, e.g., 2 [km/h]. The judgement condition of step S301 is provided for detecting a stopping condition of the automotive vehicle. When the judgement condition is satisfied in step S301, i.e., when the vehicle traveling speed V is smaller than 2 [km/h], the control flow proceeds to step S302 and sets the stopping mode A corresponding to the filter region A shown in FIG. 3. In this filter region A, no filter or a very weak filter (equivalent to 1 sec moving average filter) is used. When the automotive vehicle is stopped, there is a possibility that the pitch angle may cause a large variation due to loading or unloading or the like. In such a case, it is preferable that the actuator responds quickly to the variation of the pitch angle. This is why no filter or a very weak filter is used in the filter region A. After setting the stopping mode A, this sub routine is terminated.

On the other hand, when the judgement condition is not satisfied in step S301, i.e., when the vehicle traveling speed V is not smaller than 2 [km/h], the control flow proceeds to step S303 and judges whether the vehicle acceleration α(=dV/dt), which is a differential value of the vehicle traveling speed V, is larger than a predetermined value, e.g., 2 [m/s²]. When the judgement condition is satisfied in step S303, i.e., when the vehicle acceleration α is larger than 2 [m/s²], the control flow proceeds to step S304 and further judges whether a previous control mode is the acceleration mode corresponding to the filter region Ba. When the judgement condition is not satisfied in step S304, the control flow proceeds to step S305 to reset the acceleration mode counter value TBa to "0." When the judgement condition is satisfied in step S304, i.e., when the previous control mode is the acceleration mode corresponding to the filter region Ba, or after finishing the processing of step S305, the control flow proceeds to step S306. In step S306, the acceleration mode counter value TBa is renewed by adding the sampling interval ΔT (i.e., TBa=TBa+ΔT).

Next, the control flow proceeds to step S307 to judge whether the acceleration mode counter value TBa exceeds the initial mode limit time Tm. When the judgement condition is not satisfied in step S307, i.e., when the acceleration mode counter value TBa is not larger than the initial mode limit time Tm, the control flow proceeds to step S308. The step S308 judges whether the absolute value of a pitch angle variation $\Delta\theta p$ (=$d\theta p/dt$) exceeds a predetermined threshold $\theta m$. When the judgement condition is satisfied in step S308, the control flow proceeds to step S309 to set the initial acceleration mode Ba1 corresponding to the Ba1 filter (i.e., no filter) of the filter region Ba shown in FIG. 3. According to the initial acceleration mode Ba1, the pitch angle causes a large variation. Therefore, no filter is used so that the actuator can respond quickly to the pitch angle variation occurring in an initial stage of the acceleration. Then, this subroutine is terminated. On the other hand, when the judgement condition is satisfied in step S307, i.e., when the acceleration mode counter value TBa exceeds the initial mode limit time Tm, the control flow proceeds to step S310. Furthermore, when the judgement condition is not satisfied in the step S308, i.e., when the absolute value of the pitch angle variation $\Delta\theta p$ is not larger than the predetermined threshold $\theta m$, the control flow proceeds to step S310. The step S310 sets the ordinary acceleration mode Ba2 corresponding to the Ba2 filter (equivalent to 1 sec moving average filter) of the filter region Ba shown in FIG. 3. According to the ordinary acceleration mode Ba2, a very weak filter is used so that the actuator can respond at an adequate faster speed to the variation of the pitch angle. Then, this subroutine is terminated.

Returning to the step S303, when the judgement condition is not satisfied, i.e., when the vehicle acceleration $\alpha$ is not larger than 2 [m/s$^2$], the control flow proceeds to step S311 and further judges whether the vehicle acceleration $\alpha$ is smaller than $-2$ [m/s$^2$]. When the judgement condition is satisfied in step S311, i.e., when the vehicle acceleration $\alpha$ is smaller than $-2$ [m/s$^2$], the control flow proceeds to step S312 and further judges whether the previous control mode is the deceleration mode corresponding to the filter region Bd. When the judgement condition is not satisfied in step S312, the control flow proceeds to step S313 to reset the deceleration mode counter value TBd to "0." When the judgement condition is satisfied in step S312, i.e., when the previous control mode is the deceleration mode corresponding to the filter region Bd, or after finishing the processing of step S313, the control flow proceeds to step S314. In the S314, the deceleration mode counter value TBd is renewed by adding the sampling interval $\Delta T$ (i.e., TBd=TBd+$\Delta T$).

Next, the control flow proceeds to step S315 to judge whether the deceleration mode counter value TBd exceeds the initial mode limit time Tm. When the judgement condition is not satisfied in step S315, i.e., when the deceleration mode counter value TBd is not larger than the initial mode limit time Tm, the control flow proceeds to step S316. The step S316 judges whether the absolute value of the pitch angle variation $\Delta\theta p$ exceeds the predetermined threshold $\theta m$. When the judgement condition is satisfied in step S316, the control flow proceeds to step S317 to set the initial deceleration mode Bd1 corresponding to the Bd1 filter (i.e., no filter) of the filter region Bd shown in FIG. 3. According to the initial deceleration mode Bd1, the pitch angle causes a large variation. Therefore, no filter is used so that the actuator can respond quickly to the pitch angle variation occurring in an initial stage of the deceleration. Then, this subroutine is terminated. On the other hand, when the judgement condition is satisfied in step S315, i.e., when the deceleration mode counter value TBd exceeds the initial mode limit time Tm, the control flow proceeds to step S318. Furthermore, when the judgement condition is not satisfied in the step S316, i.e., when the absolute value of the pitch angle variation $\Delta\theta p$ is not larger than the predetermined threshold $\theta m$, the control flow proceeds to step S318. The step S318 sets the ordinary deceleration mode Bd2 corresponding to the Bd2 filter (equivalent to 1 sec moving average filter) of the filter region Bd shown in FIG. 3. According to the ordinary deceleration mode Bd2, a very weak filter is used so that the actuator can respond at an adequate faster speed to the variation of the pitch angle. Then, this subroutine is terminated.

Returning to the step S311, when the judgement condition is not satisfied, i.e., when the vehicle acceleration $\alpha$ is not smaller than $-2$ [m/s$^2$], the control flow proceeds to step S319 and further judges whether the previous control mode is the constant-speed mode corresponding to the filter region C. When the judgement condition is not satisfied in step S319, the control flow proceeds to step S320 to reset the constant-speed mode counter value TC to "0." When the judgement condition is satisfied in step S319, i.e., when the previous control mode is the constant-speed mode corresponding to the filter region C, or after finishing the processing of step S320, the control flow proceeds to step S321. In step S321, the constant-speed mode counter value TC is renewed by adding the sampling interval $\Delta T$ (i.e., TC=TC+$\Delta T$).

Next, the control flow proceeds to step S322 to judge whether the constant-speed mode counter value TC exceeds the initial mode limit time Tm. When the judgement condition is not satisfied in step S322, i.e., when the constant-speed mode counter value TC is not larger than the initial mode limit time Tm, the control flow proceeds to step S323. The step S323 judges whether the absolute value of the pitch angle variation $\Delta\theta p$ exceeds the predetermined threshold $\theta m$. When the judgement condition is satisfied in step S323, the control flow proceeds to step S324 to set the initial constant-speed mode C1 corresponding to the C1 filter (i.e., no or 1 sec moving average filter) of the filter region C shown in FIG. 3. According to the initial constant-speed mode C1, the pitch angle causes a large variation. Therefore, no filter or a very weak filter is used so that the actuator can respond quickly to the pitch angle variation occurring in an initial stage of the constant-speed condition. Then, this subroutine is terminated.

On the other hand, when the judgement condition is satisfied in step S322, i.e., when the constant-speed mode counter value TC exceeds the initial mode limit Tm, the control flow proceeds to step S325. Furthermore, when the judgement condition is not satisfied in the step S323, i.e., when the absolute value of the pitch angle variation $\Delta\theta p$ is not larger than the predetermined threshold $\theta m$, the control flow proceeds to step S325. The step S325 sets the ordinary constant-speed mode C2 corresponding to the C2 filter (equivalent to 10 sec moving average filter) of the filter region C shown in FIG. 3. According to the ordinary constant-speed mode C2, the pitch angle does not cause a large variation. Therefore, a strong filter is used to cancel any pitch angle variation derived from higher-frequency components of the vehicle body vibration or surface roughness of the road. This is effective to prevent the actuator from erroneously responding to the disturbance-like variations of the pitch angle. Then, this subroutine is terminated.

Figure 8:
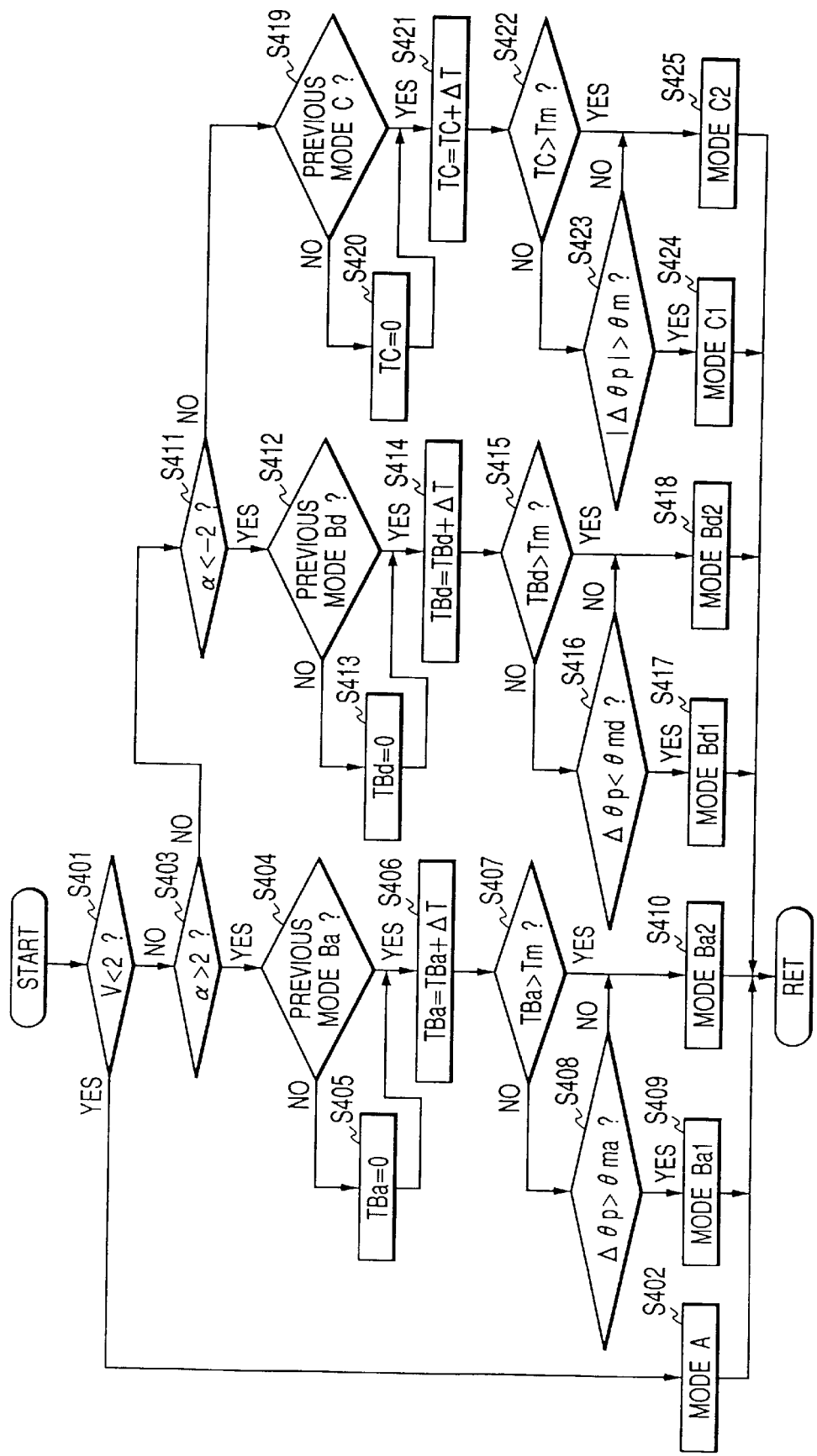
FIG. 8 is a flowchart showing another subroutine as a second modification of the control mode set subroutine shown in FIG. 6.

Next, FIG. 8 is a flowchart shows a second modified embodiment of the above-described control mode set subroutine of FIG. 6. The second modified embodiment will be explained hereinafter with reference to the table-like graph of FIG. 3. The second modified embodiment differs from the above-described embodiment of FIG. 7 in that only a positive pitch angle variation is checked during an acceleration condition while only a negative pitch angle variation is checked during a deceleration condition. This characteristic features is effective to reduce erroneous judgements. For example, it becomes possible to prevent the aiming adjustment from being performed unnecessarily in response to any pitch angle variation derived from the surface roughness.

In FIG. 8, step S401 judges whether the vehicle traveling speed V is smaller than a predetermined value, e.g., 2 [km/h]. The judgement condition of step S401 is provided for detecting a stopping condition of the automotive vehicle. When the judgement condition is satisfied in step S401, i.e., when the vehicle traveling speed V is smaller than 2 [km/h], the control flow proceeds to step S402 and sets the stopping mode A corresponding to the filter region A shown in FIG. 3. In this filter region A, no filter or a very weak filter (equivalent to 1 sec moving average filter) is used. When the automotive vehicle is stopped, there is a possibility that the pitch angle may cause a large variation due to loading or unloading or the like. In such a case, it is preferable that the actuator responds quickly to the variation of the pitch angle. This is why no filter or a very weak filter is used in the filter region A. After setting the stopping mode A, this sub routine is terminated.

On the other hand, when the judgement condition is not satisfied in step S401, i.e., when the vehicle traveling speed V is not smaller than 2 [km/h], the control flow proceeds to step S403 and judges whether the vehicle acceleration $\alpha(=dV/dt)$, which is a differential value of the vehicle traveling speed V, is larger than a predetermined value, e.g., 2 [m/s$^2$]. When the judgement condition is satisfied in step S403, i.e., when the vehicle acceleration $\alpha$ is larger than 2 [m/s$^2$], the control flow proceeds to step S404 and further judges whether a previous control mode is the acceleration mode corresponding to the filter region Ba. When the judgement condition is not satisfied in step S404, the control flow proceeds to step S405 to reset the acceleration mode counter value TBa to "0." When the judgement condition is satisfied in step S404, i.e., when the previous control mode is the acceleration mode corresponding to the filter region Ba, or after finishing the processing of step S405, the control flow proceeds to step S406. In step S406, the acceleration mode counter value TBa is renewed by adding the sampling interval $\Delta T$ (i.e., TBa=TBa+$\Delta T$).

Next, the control flow proceeds to step S407 to judge whether the acceleration mode counter value TBa exceeds the initial mode limit time Tm. When the judgement condition is not satisfied in step S407, i.e., when the acceleration mode counter value TBa is not larger than the initial mode limit time Tm, the control flow proceeds to step S408. The step S408 judges whether a pitch angle variation $\Delta\theta p$ (=d$\theta$p/dt) exceeds a predetermined positive threshold $\theta$ma. When the judgement condition is satisfied in step S408, the control flow proceeds to step S409 to set the initial acceleration mode Ba1 corresponding to the Ba1 filter (i.e., no filter) of the filter region Ba shown in FIG. 3. According to the initial acceleration mode Ba1, the pitch angle causes a large variation. Therefore, no filter is used so that the actuator can respond quickly to the pitch angle variation occurring in an initial stage of the acceleration. Then, this subroutine is terminated. On the other hand, when the judgement condition is satisfied in step S407, i.e., when the acceleration mode counter value TBa exceeds the initial mode limit time Tm, the control flow proceeds to step S410. Furthermore, when the judgement condition is not satisfied in the step S408, i.e., when the pitch angle variation $\Delta\theta p$ is not larger than the predetermined positive threshold $\theta$ma, the control flow proceeds to step S410. The step S410 sets the ordinary acceleration mode Ba2 corresponding to the Ba2 filter (equivalent to 1 sec moving average filter) of the filter region Ba shown in FIG. 3. According to the ordinary acceleration mode Ba2, a very weak filter is used so that the actuator can respond at an adequate faster speed to the variation of the pitch angle. Then, this subroutine is terminated.

Returning to the step S403, when the judgement condition is not satisfied, i.e., when the vehicle acceleration $\alpha$ is not larger than 2 [m/s$^2$], the control flow proceeds to step S411 and further judges whether the vehicle acceleration $\alpha$ is smaller than $-2$ [m/s$^2$]. When the judgement condition is satisfied in step S411, i.e., when the vehicle acceleration $\alpha$ is smaller than $-2$ [m/s$^2$], the control flow proceeds to step S412 and further judges whether the previous control mode is the deceleration mode corresponding to the filter region Bd. When the judgement condition is not satisfied in step S412, the control flow proceeds to step S413 to reset the deceleration mode counter value TBd to "0." When the judgement condition is satisfied in step S412, i.e., when the previous control mode is the deceleration mode corresponding to the filter region Bd, or after finishing the processing of step S413, the control flow proceeds to step S414. In the S414, the deceleration mode counter value TBd is renewed by adding the sampling interval $\Delta T$ (i.e., TBd=TBd+$\Delta T$).

Next, the control flow proceeds to step S415 to judge whether the deceleration mode counter value TBd exceeds the initial mode limit time Tm. When the judgement condition is not satisfied in step S415, i.e., when the deceleration mode counter value TBd is not larger than the initial mode limit time Tm, the control flow proceeds to step S416. The step S416 judges whether the pitch angle variation $\Delta\theta p$ is smaller than a predetermined negative threshold $\theta$md. When the judgement condition is satisfied in step S416, the control flow proceeds to step S417 to set the initial deceleration mode Bd1 corresponding to the Bd1 filter (i.e., no filter) of the filter region Bd shown in FIG. 3. According to the initial deceleration mode Bd1, the pitch angle causes a large variation. Therefore, no filter is used so that the actuator can respond quickly to the pitch angle variation occurring in an initial stage of the deceleration. Then, this subroutine is terminated. On the other hand, when the judgement condition is satisfied in step S415, i.e., when the deceleration mode counter value TBd exceeds the initial mode limit time Tm, the control flow proceeds to step S418. Furthermore, when the judgement condition is not satisfied in the step S416, i.e., when the pitch angle variation $\Delta\theta p$ is not smaller than the predetermined negative threshold $\theta$md, the control flow proceeds to step S418. The step S418 sets the ordinary deceleration mode Bd2 corresponding to the Bd2 filter (equivalent to 1 sec moving average filter) of the filter region Bd shown in FIG. 3. According to the ordinary deceleration mode Bd2, a very weak filter is used so that the actuator can respond at an adequate faster speed to the variation of the pitch angle. Then, this subroutine is terminated.

Returning to the step S411, when the judgement condition is not satisfied, i.e., when the vehicle acceleration $\alpha$ is not smaller than $-2$ [m/s$^2$], the control flow proceeds to step S419 and further judges whether the previous control mode is the constant-speed mode corresponding to the filter region C. When the judgement condition is not satisfied in step S419, the control flow proceeds to step S420 to reset the constant-speed mode counter value TC to "0." When the judgement condition is satisfied in. step S419, i.e., when the previous control mode is the constant-speed mode corresponding to the filter region C, or after finishing the processing of step S420, the control flow proceeds to step S421. In step S421, the constant-speed mode counter value TC is renewed by adding the sampling interval $\Delta T$ (i.e., TC=TC+$\Delta T$).

Next, the control flow proceeds to step S422 to judge whether the constant-speed mode counter value TC exceeds the initial mode limit time Tm. When the judgement condition is not satisfied in step S422, i.e., when the constant-speed mode counter value TC is not larger than the initial mode limit time Tm, the control flow proceeds to step S423. The step S423 judges whether the absolute value of the pitch angle variation $\Delta\theta p$ exceeds the predetermined threshold $\theta m$. When the judgement condition is satisfied in step S423, the control flow proceeds to step S424 to set the initial constant-speed mode C1 corresponding to the C1 filter (i.e., no or 1 sec moving average filter) of the filter region C shown in FIG. 3. According to the initial constant-speed mode C1, the pitch angle causes a large variation. Therefore, no filter or a very weak filter is used so that the actuator can respond quickly to the pitch angle variation occurring in an initial stage of the constant-speed condition. Then, this subroutine is terminated.

On the other hand, when the judgement condition is satisfied in step S422, i.e., when the constant-speed mode counter value TC exceeds the initial mode limit Tm, the control flow proceeds to step S425. Furthermore, when the judgement condition is not satisfied in the step S423, i.e., when the absolute value of the pitch angle variation $\Delta\theta p$ is not larger than the predetermined threshold $\theta m$, the control flow proceeds to step S425. The step S425 sets the ordinary constant-speed mode C2 corresponding to the C2 filter (equivalent to 10 sec moving average filter) of the filter region C shown in FIG. 3. According to the ordinary constant-speed mode C2, the pitch angle does not cause a large variation. Therefore, a strong filter is used to cancel any pitch angle variation derived from higher-frequency components of the vehicle body vibration or surface roughness of the road. This is effective to prevent the actuator from erroneously responding to the disturbance-like variations of the pitch angle. Then, this subroutine is terminated.

Figure 9:
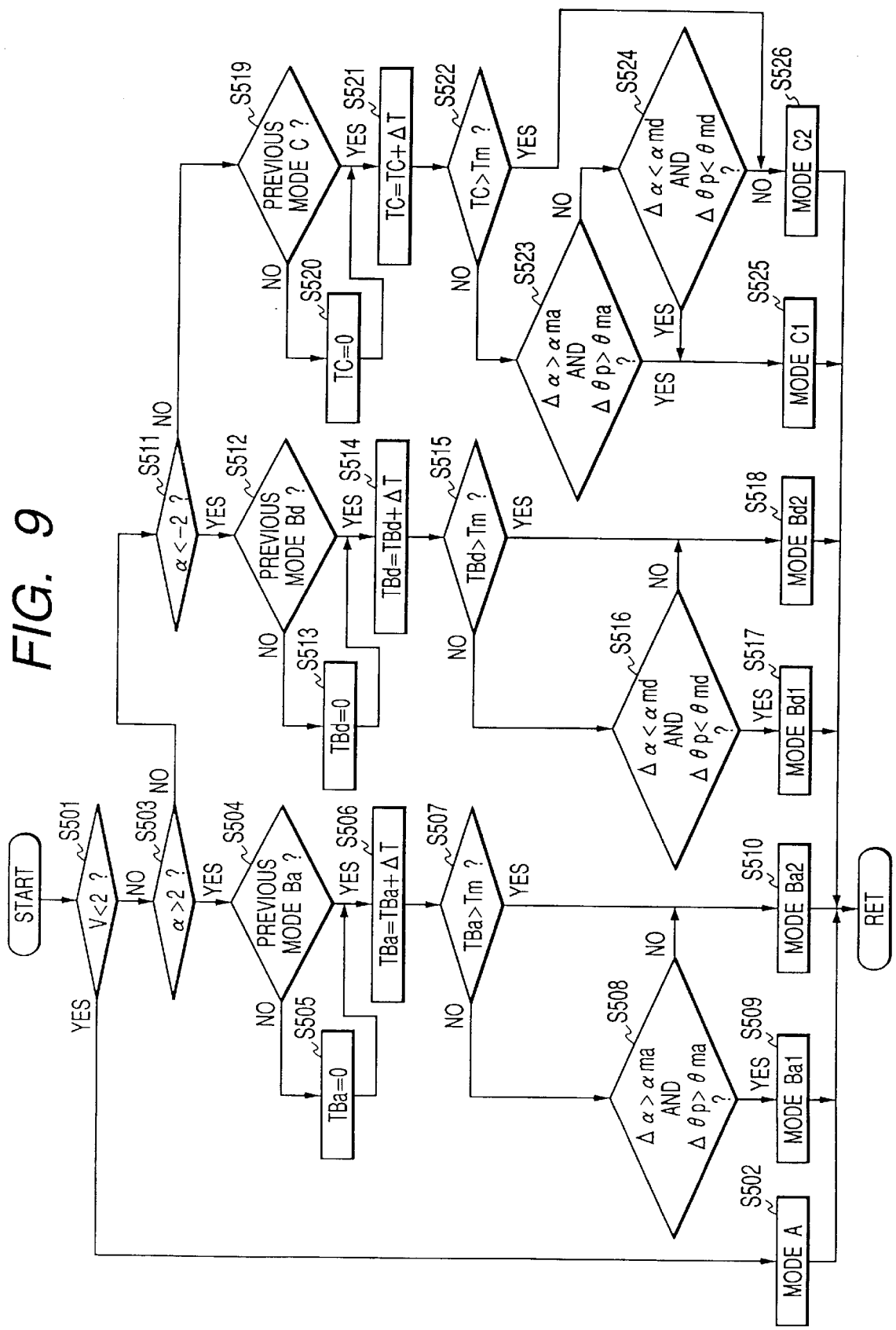
FIG. 9 is a flowchart showing another subroutine as a third modification of the control mode set subroutine shown in FIG. 6.

Next, FIG. 9 is a flowchart shows a third modified embodiment of the above-described control mode set subroutine of FIG. 6. The third modified embodiment will be explained hereinafter with reference to the table-like graph of FIG. 3. The third modified embodiment differs from the above-described embodiment of FIG. 8 in that the variation of the vehicle acceleration is checked in addition to the pitch angle variation (i.e., positive pitch angle variation during an acceleration condition, or negative pitch angle variation during a deceleration condition) to eliminate erroneous judgements derived from the surface roughness, since the pitch angle variation is synchronous with the vehicle acceleration or deceleration. That is, when the acceleration is constant, the pitch angle does not cause any variation. In other words, when both the vehicle acceleration and the pitch angle are changed simultaneously, there is no necessity of using a filter. Thus, no filter is used so that the actuator can operate quickly. In other cases, a pitch angle variation is regarded as being derived from the surface roughness. Thus, an ordinary filtering control is performed.

In FIG. 9, step S501 judges whether the vehicle traveling speed V is smaller than a predetermined value, e.g., 2 [km/h]. The judgement condition of step S501 is provided for detecting a stopping condition of the automotive vehicle. When the judgement condition is satisfied in step S501, i.e., when the vehicle traveling speed V is smaller than 2 [km/h], the control flow proceeds to step S502 and sets the stopping mode A corresponding to the filter region A shown in FIG. 3. In this filter region A, no filter or a very weak filter (equivalent to 1 sec moving average filter) is used. When the automotive vehicle is stopped, there is a possibility that the pitch angle may cause a large variation due to loading or unloading or the like. In such a case, it is preferable that the actuator responds quickly to the variation of the pitch angle. This is why no filter or a very weak filter is used in the filter region A. After setting the stopping mode A, this sub routine is terminated.

On the other hand, when the judgement condition is not satisfied in step S501, i.e., when the vehicle traveling speed V is not smaller than 2 [km/h], the control flow proceeds to step S503 and judges whether the vehicle acceleration $\alpha(=dV/dt)$, which is a differential value of the vehicle traveling speed V, is larger than a predetermined value, e.g., 2 [m/s$^2$]. When the judgement condition is satisfied in step S503, i.e., when the vehicle acceleration $\alpha$ is larger than 2 [m/s$^2$], the control flow proceeds to step S504 and farther judges whether a previous control mode is the acceleration mode corresponding to the filter region Ba. When the judgement condition is not satisfied in step S504, the control flow proceeds to step S505 to reset the acceleration mode counter value TBa to "0." When the judgement condition is satisfied in step S504, i.e., when the previous control mode is the acceleration mode corresponding to the filter region Ba, or after finishing the processing of step S505, the control flow proceeds to step S506. In step S506, the acceleration mode counter value TBa is renewed by adding the sampling interval $\Delta T$ (i.e., TBa=TBa+$\Delta T$).

Next, the control flow proceeds to step S507 to judge whether the acceleration mode counter value TBa exceeds the initial mode limit time Tm. When the judgement condition is not satisfied in step S507, i.e., when the acceleration mode counter value TBa is not larger than the initial mode limit time Tm, the control flow proceeds to step S508. The step S508 judges whether an acceleration variation $\Delta\alpha(=dV/dt^2)$ exceeds a predetermined positive threshold $\alpha ma$ and a pitch angle variation $\Delta\theta p$ (=d$\theta$p/dt) exceeds a predetermined positive threshold $\theta ma$ at the same time. When the judgement condition is satisfied in step S508, the control flow proceeds to step S509 to set the initial acceleration mode Ba1 corresponding to the Ba1 filter (i.e., no filter) of the filter region Ba shown in FIG. 3. According to the initial acceleration mode Ba1, the pitch angle causes a large variation. Therefore, no filter is used so that the actuator can respond quickly to the pitch angle variation occurring in an initial stage of the acceleration. Then, this subroutine is terminated. On the other hand, when the judgement condition is satisfied in step S507, i.e., when the acceleration mode counter value TBa exceeds the initial mode limit time Tm, the control flow proceeds to step S510. Furthermore, when the judgement condition is not satisfied in the step S508, i.e., when the acceleration variation $\Delta\alpha(=dV/dt^2)$ is not larger than the predetermined positive threshold $\alpha ma$ or the pitch angle variation $\Delta\theta p$ is not larger than the predetermined positive threshold $\theta ma$, the control flow proceeds to step S510. The step S510 sets the ordinary acceleration mode Ba2 corresponding to the Ba2 filter (equivalent to 1 sec moving average filter) of the filter region Ba shown in FIG. 3. According to the ordinary acceleration mode Ba2, a very weak filter is used so that the actuator can respond at an adequate faster speed to the variation of the pitch angle. Then, this subroutine is terminated.

Returning to the step S503, when the judgement condition is not satisfied, i.e., when the vehicle acceleration α is not larger than 2 [m/s²], the control flow proceeds to step S511 and further judges whether the vehicle acceleration α is smaller than −2 [m/s²]. When the judgement condition is satisfied in step S511, i.e., when the vehicle acceleration α is smaller than −2 [m/s²], the control flow proceeds to step S512 and farther judges whether the previous control mode is the deceleration mode corresponding to the filter region Bd. When the judgement condition is not satisfied in step S512, the control flow proceeds to step S513 to reset the deceleration mode counter value TBd to "0." When the judgement condition is satisfied in step S512, i.e., when the previous control mode is the deceleration mode corresponding to the filter region Bd, or after finishing the processing of step S513, the control flow proceeds to step S514. In the S514, the deceleration mode counter value TBd is renewed by adding the sampling interval ΔT (i.e., TBd=TBd+ΔT).

Next, the control flow proceeds to step S515 to judge whether the deceleration mode counter value TBd exceeds the initial mode limit time Tm. When the judgement condition is not satisfied in step S515, i.e., when the deceleration mode counter value TBd is not larger than the initial mode limit time Tm, the control flow proceeds to step S516. The step S516 judges whether the acceleration variation Δα is smaller than a predetermined negative threshold αmd and the pitch angle variation Δθp is smaller than a predetermined negative threshold θmd at the same time. When the judgement condition is satisfied in step S516, the control flow proceeds to step S517 to set the initial deceleration mode Bd1 corresponding to the Bd1 filter (i.e., no filter) of the filter region Bd shown in FIG. 3. According to the initial deceleration mode Bd1, the pitch angle causes a large variation. Therefore, no filter is used so that the actuator can respond quickly to the pitch angle variation occurring in an initial stage of the deceleration. Then, this subroutine is terminated. On the other hand, when the judgement condition is satisfied in step S515, i.e., when the deceleration mode counter value TBd exceeds the initial mode limit time Tm, the control flow proceeds to step S518. Furthermore, when the judgement condition is not satisfied in the step S516, i.e., when the acceleration variation Δα is not smaller than the predetermined negative threshold αmd or the pitch angle variation Δθp is not smaller than the predetermined negative threshold θmd, the control flow proceeds to step S518. The step S518 sets the ordinary deceleration mode Bd2 corresponding to the Bd2 filter (equivalent to 1 sec moving average filter) of the filter region Bd shown in FIG. 3. According to the ordinary deceleration mode Bd2, a very weak filter is used so that the actuator can respond at an adequate faster speed to the variation of the pitch angle. Then, this subroutine is terminated.

Returning to the step S511, when the judgement condition is not satisfied, i.e., when the vehicle acceleration α is not smaller than −2 [m/s²], the control flow proceeds to step S519 and further judges whether the previous control mode is the constant-speed mode corresponding to the filter region C. When the judgement condition is not satisfied in step S519, the control flow proceeds to step S520 to reset the constant-speed mode counter value TC to "0." When the judgement condition is satisfied in step S519, i.e., when the previous control mode is the constant-speed mode corresponding to the filter region C, or after finishing the processing of step S520, the control flow proceeds to step S521. In step S521, the constant-speed mode counter value TC is renewed by adding the sampling interval ΔT (i.e., TC=TC+ΔT).

Next, the control flow proceeds to step S522 to judge whether the constant-speed mode counter value TC exceeds the initial mode limit time Tm. When the judgement condition is not satisfied in step S522, i.e., when the constant-speed mode counter value TC is not larger than the initial mode limit time Tm, the control flow proceeds to step S523. The step S523 judges whether the acceleration variation Δα exceeds the predetermined positive threshold αma and the pitch angle variation Δθp exceeds the predetermined positive threshold θma at the same time. When the judgement condition is not satisfied in step S523, the control flow proceeds to step S524. The step S524 judges whether the acceleration variation Δα is smaller than the predetermined negative threshold αmd and the pitch angle variation Δθp is smaller than the predetermined negative threshold θmd at the same time. When the judgement condition is satisfied in step S524, or when the judgement condition is satisfied in step S523, the control flow proceeds to step S525 to set the initial constant-speed mode C1 corresponding to the C1 filter (i.e., no or 1 sec moving average filter) of the filter region C shown in FIG. 3. According to the initial constant-speed mode C1, the pitch angle causes a large variation. Therefore, no filter or a very weak filter is used so that the actuator can respond quickly to the pitch angle variation occurring in an initial stage of the constant-speed condition. Then, this subroutine is terminated.

On the other hand, when the judgement condition is satisfied in step S522, i.e., when the constant-speed mode counter value TC exceeds the initial mode limit Tm, the control flow proceeds to step S526. Furthermore, when the judgement condition is not satisfied in the step S524, i.e., when the acceleration variation Δα is not smaller than the predetermined negative threshold αmd or the pitch angle variation Δθp is not smaller than the predetermined negative threshold θmd, the control flow proceeds to step S526. The step S526 sets the ordinary constant-speed mode C2 corresponding to the C2 filter (equivalent to 10 sec moving average filter) of the filter region C shown in FIG. 3. According to the ordinary constant-speed mode C2, the pitch angle does not cause a large variation. Therefore, a strong filter is used to cancel any pitch angle variation derived from higher-frequency components of the vehicle body vibration or surface roughness of the road. This is effective to prevent the actuator from erroneously responding to the disturbance-like variations of the pitch angle. Then, this subroutine is terminated.

Figure 10:
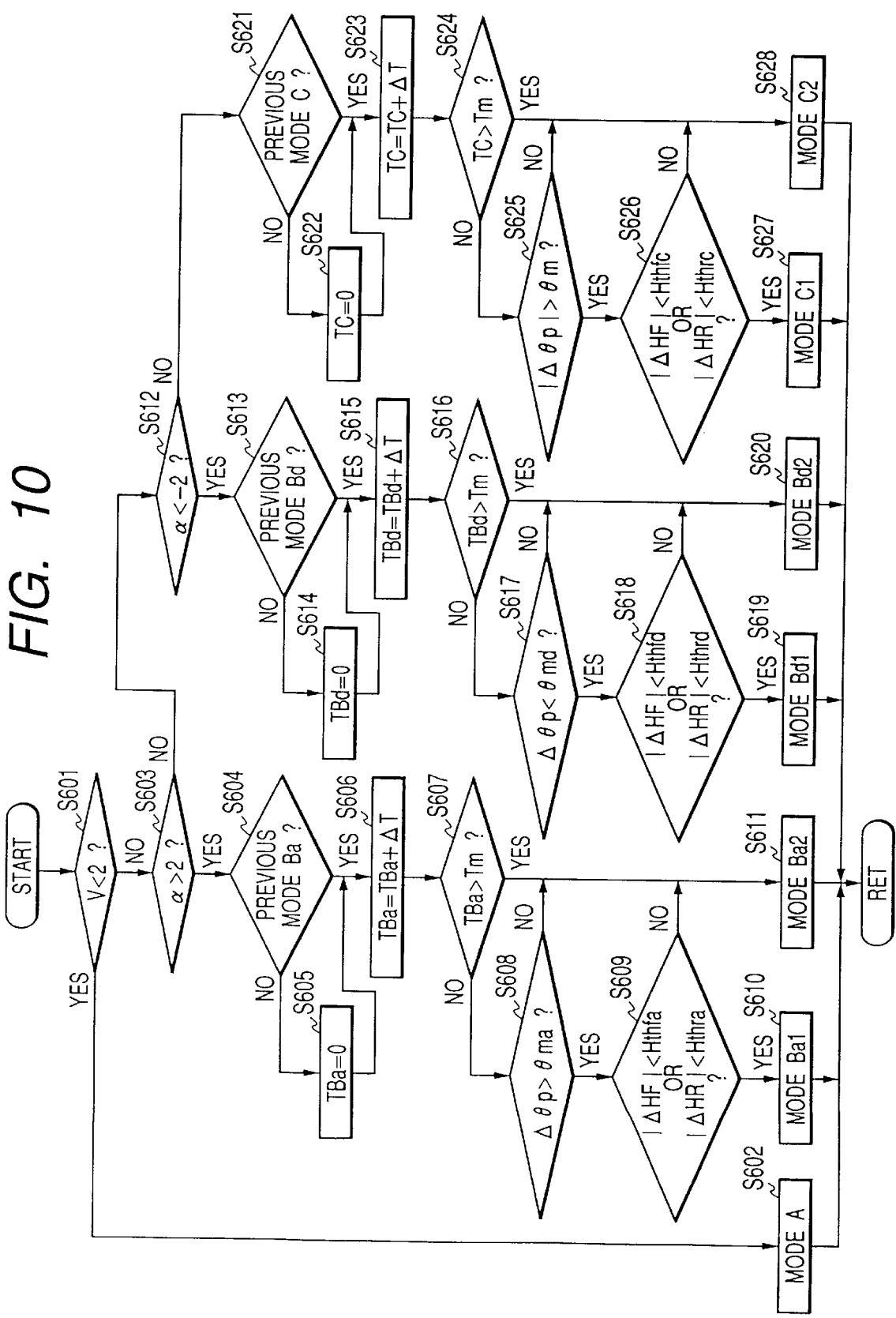
FIG. 10 is a flowchart showing another subroutine as a fourth modification of the control mode set subroutine shown in FIG. 6.

Next, FIG. 10 is a flowchart shows a fourth modified embodiment of the above-described control mode set subroutine of FIG. 6. The fourth modified embodiment will be explained hereinafter with reference to the table-like graph of FIG. 3. The fourth modified embodiment differs from the above-described embodiment of FIG. 8 in that the variation of a front or rear height value of the vehicle is checked in addition to the pitch angle variation (i.e., positive pitch angle variation during an acceleration condition, or negative pitch angle variation during a deceleration condition) to eliminate erroneous judgements derived from the surface roughness. When a variation of the vehicle height (i.e., front or rear height) exceeds a predetermined value, no filter is used. That is, when the acceleration is within a normal range, the variation of the vehicle height does not exceed a predetermined value. On the other hand, many of the height variations induced by the road surface roughness are so steep that their values exceed this predetermined value. Accordingly, the fourth modified embodiment simply uses the variation of the vehicle height in the judgement. It will be preferable to process the front height value or the rear height value by a high-pass filter so as to obtain a higher frequency component thereof.

In FIG. 10, step S601 judges whether the vehicle traveling speed V is smaller than a predetermined value, e.g., 2 [km/h]. The judgement condition of step S601 is provided for detecting a stopping condition of the automotive vehicle. When the judgement condition is satisfied in step S601, i.e., when the vehicle traveling speed V is smaller than 2 [km/h], the control flow proceeds to step S602 and sets the stopping mode A corresponding to the filter region A shown in FIG. 3. In this filter region A, no filter or a very weak filter (equivalent to 1 sec moving average filter) is used. When the automotive vehicle is stopped, there is a possibility that the pitch angle may cause a large variation due to loading or unloading or the like. In such a case, it is preferable that the actuator responds quickly to the variation of the pitch angle. This is why no filter or a very weak filter is used in the filter region A. After setting the stopping mode A, this sub routine is terminated.

On the other hand, when the judgement condition is not satisfied in step S601, i.e., when the vehicle traveling speed V is not smaller than 2 [km/h], the control flow proceeds to step S603 and judges whether the vehicle acceleration $\alpha(=dV/dt)$, which is a differential value of the vehicle traveling speed V, is larger than a predetermined value, e.g., 2 [m/s$^2$]. When the judgement condition is satisfied in step S603, i.e., when the vehicle acceleration $\alpha$ is larger than 2 [m/s$^2$], the control flow proceeds to step S604 and further judges whether a previous control mode is the acceleration mode corresponding to the filter region Ba. When the judgement condition is not satisfied in step S604, the control flow proceeds to step S605 to reset the acceleration mode counter value TBa to "0." When the judgement condition is satisfied in step S604, i.e., when the previous control mode is the acceleration mode corresponding to the filter region Ba, or after finishing the processing of step S605, the control flow proceeds to step S606. In step S606, the acceleration mode counter value TBa is renewed by adding the sampling interval $\Delta T$ (i.e., TBa=TBa+$\Delta T$).

Next, the control flow proceeds to step S607 to judge whether the acceleration mode counter value TBa exceeds the initial mode limit time Tm. When the judgement condition is not satisfied in step S607, i.e., when the acceleration mode counter value TBa is not larger than the initial mode limit time Tm, the control flow proceeds to step S608. The step S608 judges whether the pitch angle variation $\Delta\theta p$ (=$d\theta p/dt$) exceeds the predetermined positive threshold $\theta ma$. When the judgement condition is satisfied in step S608, the control flow proceeds to step S609. The step S609 judges whether the absolute value of a front height variation $\Delta HF$ (=$dHF/dt$) is smaller than a predetermined threshold Hthfa or the absolute value of a rear height variation $\Delta HR$ (=$dHR/dt$) is smaller than a predetermined threshold Hthra. When the judgement condition is satisfied in step S609, the control flow proceeds to step S610 to set the initial acceleration mode Ba1 corresponding to the Ba1 filter (i.e., no filter) of the filter region Ba shown in FIG. 3. According to the initial acceleration mode Ba1, the pitch angle causes a large variation. Therefore, no filter is used so that the actuator can respond quickly to the pitch angle variation occurring in an initial stage of the acceleration. Then, this subroutine is terminated. On the other hand, when the judgement condition is satisfied in step S607, i.e., when the acceleration mode counter value TBa exceeds the initial mode limit time Tm, the control flow proceeds to step S611. Furthermore, when the judgement condition is not satisfied in the step S608, i.e., when the pitch angle variation $\Delta\theta p$ is not larger than the predetermined positive threshold $\theta ma$, the control flow proceeds to step S611. Moreover, when the judgement condition is not satisfied in the step S609, i.e., when the absolute value of the front height variation $\Delta HF$ is not smaller than the predetermined threshold Hthfa and the absolute value of the rear height variation $\Delta HR$ is not smaller than the predetermined threshold Hthra, the control flow proceeds to step S611. The step S611 sets the ordinary acceleration mode Ba2 corresponding to the Ba2 filter (equivalent to 1 sec moving average filter) of the filter region Ba shown in FIG. 3. According to the ordinary acceleration mode Ba2, a very weak filter is used so that the actuator can respond at an adequate faster speed to the variation of the pitch angle. Then, this subroutine is terminated.

Returning to the step S603, when the judgement condition is not satisfied, i.e., when the vehicle acceleration $\alpha$ is not larger than 2 [m/s$^2$], the control flow proceeds to step S612 and further judges whether the vehicle acceleration $\alpha$ is smaller than -2 [m/s$^2$]. When the judgement condition is satisfied in step S612, i.e., when the vehicle acceleration $\alpha$ is smaller than -2 [m/s$^2$], the control flow proceeds to step S613 and further judges whether the previous control mode is the deceleration mode corresponding to the filter region Bd. When the judgement condition is not satisfied in step S613, the control flow proceeds to step S614 to reset the deceleration mode counter value TBd to "0." When the judgement condition is satisfied in step S613, i.e., when the previous control mode is the deceleration mode corresponding to the filter region Bd, or after finishing the processing of step S614, the control flow proceeds to step S615. In the S615, the deceleration mode counter value TBd is renewed by adding the sampling interval $\Delta T$ (i.e., TBd=TBd+$\Delta T$).

Next, the control flow proceeds to step S616 to judge whether the deceleration mode counter value TBd exceeds the initial mode limit time Tm. When the judgement condition is not satisfied in step S616, i.e., when the deceleration mode counter value TBd is not larger than the initial mode limit time Tm, the control flow proceeds to step S617. The step S617 judges whether the pitch angle variation $\Delta\theta p$ is smaller than the predetermined negative threshold $\theta md$. When the judgement condition is satisfied in step S617, the control flow proceeds to step S618. The step S618 judges whether the absolute value of the front height variation $\Delta HF$ is smaller than a predetermined threshold Hthfd or the absolute value of the rear height variation $\Delta HR$ is smaller than a predetermined threshold Hthrd. When the judgement condition is satisfied in step S618, the control flow proceeds to step S619 to set the initial deceleration mode Bd1 corresponding to the Bd1 filter (i.e., no filter) of the filter region Bd shown in FIG. 3. According to the initial deceleration mode Bd1, the pitch angle causes a large variation. Therefore, no filter is used so that the actuator can respond quickly to the pitch angle variation occurring in an initial stage of the deceleration. Then, this subroutine is terminated. On the other hand, when the judgement condition is satisfied in step S616, i.e., when the deceleration mode counter value TBd exceeds the initial mode limit time Tm, the control flow proceeds to step S620. Furthermore, when the judgement condition is not satisfied in the step S617, i.e., when the pitch angle variation $\Delta\theta p$ is not smaller than the predetermined negative threshold $\theta md$, the control flow proceeds to step S620. Moreover, when the judgement condition is not satisfied in the step S618, i.e., when the absolute value of the front height variation $\Delta HF$ is not smaller than the predetermined threshold Hthfd and the absolute value of the rear height variation $\Delta HR$ is not smaller than the predetermined threshold Hthrd, the control flow proceeds to step S620. The step S620 sets the ordinary deceleration mode Bd2 corresponding to the Bd2 filter (equivalent to 1 sec moving average filter) of the filter region Bd shown in FIG. 3. According to the ordinary deceleration mode Bd2, a very weak filter is used so that the actuator can respond at an adequate faster speed to the variation of the pitch angle. Then, this subroutine is terminated.

Returning to the step S612, when the judgement condition is not satisfied, i.e., when the vehicle acceleration α is not smaller than $-2$ [m/s$^2$], the control flow proceeds to step S621 and further judges whether the previous control mode is the constant-speed mode corresponding to the filter region C. When the judgement condition is not satisfied in step S621, the control flow proceeds to step S622 to reset the constant-speed mode counter value TC to "0." When the judgement condition is satisfied in step S621, i.e., when the previous control mode is the constant-speed mode corresponding to the filter region C, or after finishing the processing of step S622, the control flow proceeds to step S623. In step S623, the constant-speed mode counter value TC is renewed by adding the sampling interval ΔT (i.e., TC=TC+ΔT).

Next, the control flow proceeds to step S624 to judge whether the constant-speed mode counter value TC exceeds the initial mode limit time Tm. When the judgement condition is not satisfied in step S624, i.e., when the constant-speed mode counter value TC is not larger than the initial mode limit time Tm, the control flow proceeds to step S625. The step S625 judges whether the absolute value of the pitch angle variation Δθp exceeds the predetermined threshold θm. When the judgement condition is satisfied in step S625, the control flow proceeds to step S626. The step S626 judges whether the absolute value of the front height variation ΔHF is smaller than a predetermined threshold Hthfc or the absolute value of the rear height variation ΔHR is smaller than a predetermined threshold Hthrc. When the judgement condition is satisfied in step S626, the control flow proceeds to step S627 to set the initial constant-speed mode C1 corresponding to the C1 filter (i.e., no or 1 sec moving average filter) of the filter region C shown in FIG. 3. According to the initial constant-speed mode C1, the pitch angle causes a large variation. Therefore, no filter or a very weak filter is used so that the actuator can respond quickly to the pitch angle variation occurring in an initial stage of the constant-speed condition. Then, this subroutine is terminated.

On the other hand, when the judgement condition is satisfied in step S624, i.e., when the constant-speed mode counter value TC exceeds the initial mode limit Tm, the control flow proceeds to step S628. Furthermore, when the judgement condition is not satisfied in the step S625, i.e., when the absolute value of the pitch angle variation Δθp is not larger than the predetermined threshold θm, the control flow proceeds to step S628. Moreover, when the judgement condition is not satisfied in the step S626, i.e., when the absolute value of the front height variation ΔHF is not smaller than the predetermined threshold Hthfc and the absolute value of the rear height variation ΔHR is not smaller than the predetermined threshold Hthrd, the control flow proceeds to step S628. The step S628 sets the ordinary constant-speed mode C2 corresponding to the C2 filter (equivalent to 10 sec moving average filter) of the filter region C shown in FIG. 3. According to the ordinary constant-speed mode C2, the pitch angle does not cause a large variation. Therefore, a strong filter is used to cancel any pitch angle variation derived from higher-frequency components of the vehicle body vibration or surface roughness of the road. This is effective to prevent the actuator from erroneously responding to the disturbance-like variations of the pitch angle. Then, this subroutine is terminated.

As apparent from the foregoing description, the automatic aiming adjustment apparatus for the headlights of an automotive vehicle in accordance with the first embodiment comprises a pair of the height sensors 11F and 11R provided at front and rear portions of the vehicle body to detect the variation of the vehicle height, respectively. ECU 20 functions as the gradient calculating means for calculating the pitch angle θp, which is an inclination of an aiming direction of the headlights 30L and 30R of the automotive vehicle with respect to a horizontal plane, based on output values HF and HR of the height sensors 11F and 11R. The wheel speed sensor 12 functions as the vehicle speed sensor for detecting the vehicle traveling speed V of the automotive vehicle. ECU 20 further functions as the mode setting means for determining a control mode suitable for the present traveling condition based on the vehicle traveling speed V and the vehicle acceleration α(=dV/dt) which is calculated from the vehicle traveling speed V. ECU 20 further functions as the filter switching means for selecting a preferable one of a plurality of filters in accordance with the control mode determined by the mode setting means. The plurality of filters are used to change the response sensitivity in the aiming adjustment of the headlights 30L and 30R. Moreover, ECU 20 functions as the aiming adjusting means for adjusting the aiming direction of the headlights 30L and 30R based on the pitch angle θpf which is obtained by modifying the pitch angle θp calculated by the gradient calculating means with the filter selected by the filter switching means.

Accordingly, in ECU 20 functioning as the gradient calculating means, the pitch angle θp is calculated, as an inclination of the aiming direction of the headlights 30L and 30R of the automotive vehicle with respect to a horizontal plane, based on the output values HF and HR of the height sensors 11F and 11R provided at the front and rear portions of the vehicle body. Furthermore, in ECU 20 functioning as the mode setting means, the preferable control mode corresponding to the present traveling condition is determined based on the vehicle traveling speed V detected by the wheel speed sensor 12 and the vehicle acceleration α calculated from the vehicle traveling speed V. Furthermore, in ECU 20 functioning as the filter switching means, a preferable filter is selected in accordance with the control mode for changing the response sensitivity in the aiming adjustment of the headlights 30L and 30R. Moreover, in ECU 20 functioning as the aiming adjusting means, the aiming direction of the headlights 30L and 30R is adjusted based on the pitch angle θpf processed by the selected filter. Accordingly, the pitch angle θp is modified by using an optimum filter corresponding to the present traveling condition of the automotive vehicle. Thus, the aiming adjustment of the headlights 30L and 30R can be performed with an appropriate response sensitivity.

Furthermore, according to the automatic aiming adjustment apparatus for the headlights of an automotive vehicle of the first embodiment, ECU 20 functioning as the mode setting means sets an initial control mode for a predetermined time Tm immediately after the control mode is switched. Accordingly, the aiming adjustment of the headlights 30L and 30R is quickly performed as an initial control mode during a time immediately after the control mode is switched because the pitch angle variation Δθp is large.

Furthermore, according to the automatic aiming adjustment apparatus for the headlights of an automotive vehicle of the first embodiment, ECU 20 functioning as the mode setting means sets the initial control mode only when the absolute value of the pitch angle variation Δθp exceeds the predetermined value θm. More specifically, in ECU 20 functioning as the mode setting means, the initial control mode is set only when the absolute value of the pitch angle variation Δθp exceeds the predetermined value θm within the predetermined time Tm immediately after the control mode is switched. Accordingly, the aiming adjustment of the headlights 30L and 30R is quickly performed as an initial control mode during a time immediately after the control mode is switched because the absolute value of the pitch angle variation Δθp is large.

Furthermore, according to the automatic aiming adjustment apparatus for the headlights of an automotive vehicle of the first embodiment, ECU 20 functioning as the mode setting means sets the initial control mode only when the pitch angle variation Δθp exceeds the predetermined value θma or θmd corresponding to the acceleration or deceleration. More specifically, in ECU 20 functioning as the mode setting means, the initial control mode is set only when the pitch angle variation Δθp exceeds the predetermined value θma or θmd corresponding to the acceleration or deceleration of the automotive vehicle within the predetermined time Tm immediately after the control mode is switched. Accordingly, the aiming adjustment of the headlights 30L and 30R is quickly performed as an initial control mode during a time immediately after the control mode is switched because the pitch angle variation Δθp is large in response to an acceleration or deceleration of the automotive vehicle.

Furthermore, according to the automatic aiming adjustment apparatus for the headlights of an automotive vehicle of the first embodiment, ECU 20 functioning as the mode setting means sets the initial control mode only when the acceleration change Δα exceeds the predetermined values αma or αmd and the pitch angle variation Δθp exceeds θma or θmd corresponding to an acceleration or deceleration of the automotive vehicle. More specifically, in ECU 20 functioning as the mode setting means, the initial control mode is set only when the acceleration change Δα exceeds the predetermined values αma or αmd and the pitch angle variation Δθp exceeds θma or θmd corresponding to an acceleration or deceleration of the automotive vehicle within the predetermined time Tm immediately after the control mode is switched. Accordingly, the aiming adjustment of the headlights 30L and 30R is quickly performed as an initial control mode during a time immediately after the control mode is switched because both the acceleration change Δα and the pitch angle variation Δθp are large in response to an acceleration or deceleration of the automotive vehicle.

Furthermore, according to the automatic aiming adjustment apparatus for the headlights of an automotive vehicle of the first embodiment, ECU 20 functioning as the mode setting means sets the initial control mode only when the pitch angle variation Δθp exceeds θma or θmd corresponding to an acceleration or deceleration of the automotive vehicle and the output value changes ΔHF and ΔHR of the height sensors 11F and 11R are smaller than the predetermined values Hthfa, Hthra, or Hthfd, Hthrd, or Hthfc, Hthrc, respectively. More specifically, in ECU 20 functioning as the mode setting means, the initial control mode is set only when the pitch angle variation Δθp exceeds θma or θmd corresponding to an acceleration or deceleration of the automotive vehicle and the output value changes ΔHF and ΔHR of the height sensors 11F and 11R are smaller than the predetermined values Hthfa, Hthra, or Hthfd, Hthrd, or Hthfc, Hthrc within the predetermined time Tm immediately after the control mode is switched. Accordingly, the aiming adjustment of the headlights 30L and 30R is quickly performed as an initial control mode during a time immediately after the control mode is switched because the acceleration change Δα is large in response to an acceleration or deceleration of the automotive vehicle and the output value changes ΔHF and ΔHR of the height sensors 11F and 11R are smaller than the predetermined values Hthfa, Hthra, or Hthfd, Hthrd, or Hthfc, Hthrc.

Figure 11:
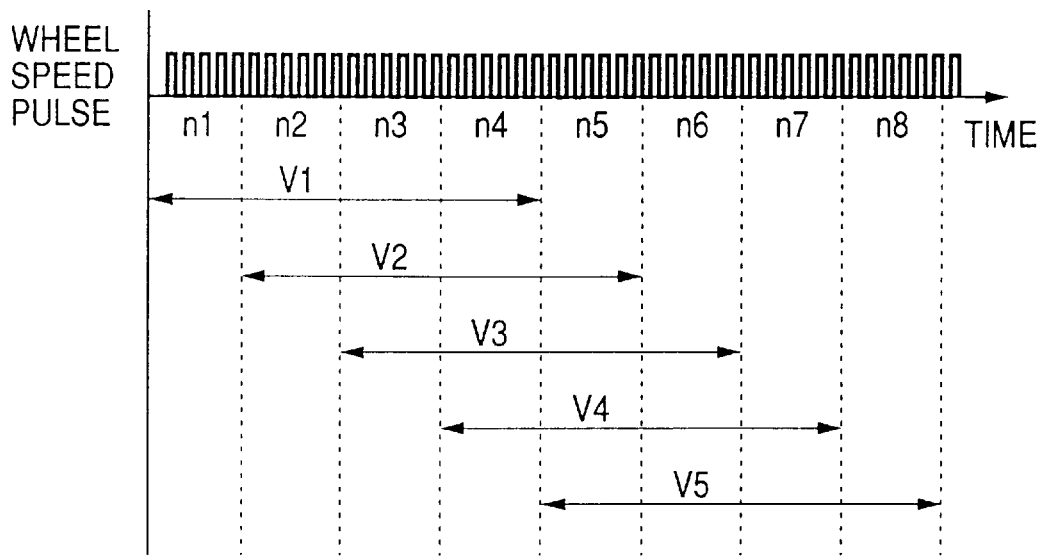
FIG. 11 is a view illustrating the processing of wheel speed pulses generated from a wheel speed sensor used in the automatic aiming adjustment apparatus for the headlights of an automotive vehicle in accordance with the first embodiment of the present invention.

FIG. 11 is a view illustrating the processing of wheel speed pulses generated from the wheel speed sensor 12 in accordance with the first embodiment.

The vehicle traveling speed V is calculated by counting the number of wheel speed pulses generated during a predetermined count interval. The shorter the count interval, the smaller the number of the wheel speed pulses generated. Using a smaller number of wheel speed pulses for obtaining the vehicle traveling speed V possibly worsens the accuracy in the calculation of the vehicle acceleration α(=dV/dt) which is obtained from the vehicle traveling speed V. For example, it is assumed that the actuator is operated at an actuation timing of 50 ms. The wheel speed pulses are counted every 50 ms, and converted into the vehicle traveling speed V. The vehicle acceleration α is calculated based on a deviation between the thus-obtained latest vehicle traveling speed V and the previous vehicle traveling speed V obtained 50 ms before. Ordinarily, the wheel speed sensor 12 has a pulse generation capability equivalent to 0.04 m/pulse. The resolution of the vehicle traveling speed is in a level of $0.04 \text{ m}/(0.05s)^2 = 16 \text{ m/s}^2$. This level is improper when used in the judgement of the table-like graph of FIG. 3. If the count interval of the wheel speed pulses is increased to 200 ms, the resolution of the vehicle traveling speed V will be improved to a level of $0.04 \text{ m}/(0.2s)^2 = 1 \text{ m/s}^2$, assuring satisfactory accuracy. However, taking a long interval of 200 ms for renewing the vehicle acceleration α is disadvantageous .in that the control is delayed.

As shown in FIG. 11, the pulse number (i.e., n1, n2, - - - ) of the wheel speed pulses is counted every 50 ms. The vehicle traveling speed V (i.e., V1, V2, - - - ) is calculated by accumulating the pulse numbers for a longer interval (e.g., 200 ms) capable of assuring the accuracy of the acceleration α. More specifically, using the wheel pulse count numbers n1, n2, n3 and n4, vehicle traveling speed V1 is calculated according to an equation V1 [km/h]=C×(n1+n2+n3+n4), where C represents a conversion coefficient from the wheel pulse count number to the vehicle traveling speed. The vehicle traveling speed V is renewed every 50 ms in the same manner. Thus, vehicle traveling speed V2 is calculated according to an equation V2 [km/h]=C×(n2+n3+n4+n5). The vehicle acceleration α is calculated using the present vehicle traveling speed V and the previous vehicle traveling speed obtained 200 ms before, according to an equation α[m/s$^2$]=(V5−V1)×1,000/3,600/0.2. Thus, the accuracy of the vehicle acceleration α is assured sufficiently. Furthermore, as the vehicle acceleration α can be obtained at the interval equal to the actuation interval of the actuator, it becomes possible to switch the control mode quickly. The response of the control system can be improved.

As apparent from the foregoing description, according to the automatic aiming adjustment apparatus for the headlights of an automotive vehicle of the first embodiment ECU 20 functioning as the mode setting means calculates the vehicle traveling speed V by accumulating the wheel pulse numbers detected by the vehicle speed sensor 12 for a predetermined time 200 ms required to assure desired acceleration accuracy in determining the control mode, and renews the vehicle traveling speed V every predetermined time 50 ms corresponding to an adjustment interval for the aiming adjustment performed by ECU 20 functioning as the aiming adjusting means. Accordingly, it becomes possible to obtain a desirable acceleration accuracy necessary in the determination of the control mode. Furthermore, the aiming adjustment of the headlights 30L and 30R can be performed quickly because the vehicle traveling speed V is renewed every predetermined time 50 ms corresponding to the adjustment interval for the aiming adjustment.

Figure 12:
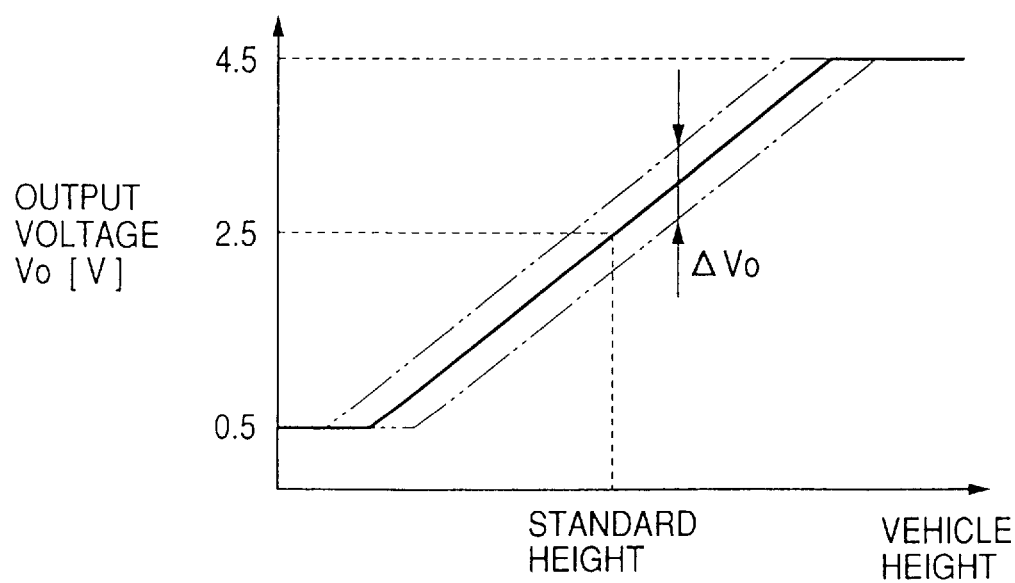
FIG. 12 is a graph showing output characteristics of a height sensor used in the automatic aiming adjustment apparatus for the headlights of an automotive vehicle in accordance with the first embodiment of the present invention.

FIG. 12 is a graph showing output characteristics of the height sensors 11F and 11R used in the first embodiment of the present invention.

The height sensors 11F and 11R generate an output of 2.5 [V] when the vehicle body is positioned at a predetermined standard height. The vehicle height H is expressed by an equation H=Ch×(Vo−2.5), where Ch represents a conversion coefficient and Vo represents an output voltage of the height sensor. However, a practical value of the sensor output possibly includes a significant amount of deviation ΔVo due to mounting or fixing errors in the installation of the height sensors 11F and 11R. Accordingly, even when the vehicle body is positioned at the standard height, the pitch angle θp may be calculated erroneously based on such inaccurate sensor output signals obtained from the front and rear height sensors. Thus, the actuator may be dislocated from a predetermined initial position. When a new vehicle is shipped, the aiming adjustment is performed manually in this condition. Usually, no problem will arise in this condition. However, when the actuator is returned to the initial position due to malfunction, the aiming direction will be angularly deviated from a normal direction by a pitch angle θe. To prevent this, ECU is equipped with an external switch to read an output voltage Vs obtained at the standard height when the height sensor is mounted or fixed on the vehicle body. Thus, the vehicle height H is calculated by an equation of H=Ch×(Vo−Vs). Accordingly, it becomes possible to eliminate the influence of pitch angle θe which is a factor representing the dislocation of the actuator from the initial position due to installation error.

Furthermore, instead of providing the external switch, it is possible to use another method according to which the control is started without correcting the installation error of the height sensors. An average of the pitch angle is obtained during a time when the vehicle driving condition is in the filter region C (i.e., constant-speed mode). In an event of malfunction, the actuator is adjusted to an appropriate angle corresponding to a mean pitch angle obtained by averaging the pitch angle. The mean pitch angle is calculated using the pitch angles obtained only when the vehicle driving condition is in the filter region C (i.e., constant-speed mode) where the vehicle body is stabilized. When the vehicle driving condition enters into the filter region A (i.e., stopping mode), the averaged value is once cleared because there is a possibility of causing a large variation in the pitch angle due to the load change, such as passenger or loading change.

As apparent from the foregoing description, according to the automatic aiming adjustment apparatus for the headlights of an automotive vehicle of the first embodiment, ECU 20 functioning as the inclination correcting means is used in an event of malfunction of the system for correcting the pitch angle θp calculated by ECU 20 functioning as the gradient calculating means based on a deviation of the present output value Vo of the height sensor 11F or 11R from the referential output value Vs representing the standard vehicle height. Accordingly, when the system malfunctions, the output errors of the height sensors 11F and 11R caused due to installation errors can be corrected adequately. Thus, the aiming direction of the headlights 30L and 20R is returned to the standard height.

Furthermore, according to the automatic aiming adjustment apparatus for the headlights of an automotive vehicle of the first embodiment, ECU 20 functioning as memory means memorizes a mean angle as an average of the pitch angle θp calculated by ECU 20 functioning as the gradient calculating means when the automotive vehicle is traveling in the constant-speed condition. Furthermore, ECU 20 functioning as the aiming adjusting means adjusts the aiming direction of the headlights 30L and 30R based on the mean angle of the inclination in an event of malfunction of the system. Accordingly, when the system malfunctions, the aiming direction of the headlights 30L and 30R is returned to the mean angle representing an average of the pitch angle θp obtained during a time the automotive vehicle is traveling in the constantspeed condition, i.e., when the vehicle body is stabilized.

According to the first embodiment of the present invention, the vehicle height sensor measures a relative displacement between the axle shaft and the vehicle body. To detect the pitch angle of the vehicle body, the front height sensor is provided at the front axle shaft and the rear height sensor is provided at the rear axle shaft. This kind of height sensor is generally a sliding resistor type or a non-contact type using a hole element. Either type can use in the above-described embodiment. As shown in Unexamined Japanese Patent Application No. 8-99753, it is possible to provide only one height sensor at the rear axle shaft to detect the pitch angle. Furthermore, instead of measuring the relative displacement between the axle shaft and the vehicle body as described above, it is possible to measure a distance to the ground level by using ultrasonic wave, an infrared lay laser, or a millimeter wave laser. Moreover, it is possible to use any other means for directly measuring the pitch angle of the vehicle body. According to the above-described first embodiment, the wheel speed sensor is used as a vehicle traveling speed sensor. However, it is possible to use a conventional vehicle speed sensor attached to the drive shaft or the like.

Second Embodiment

Figure 13:
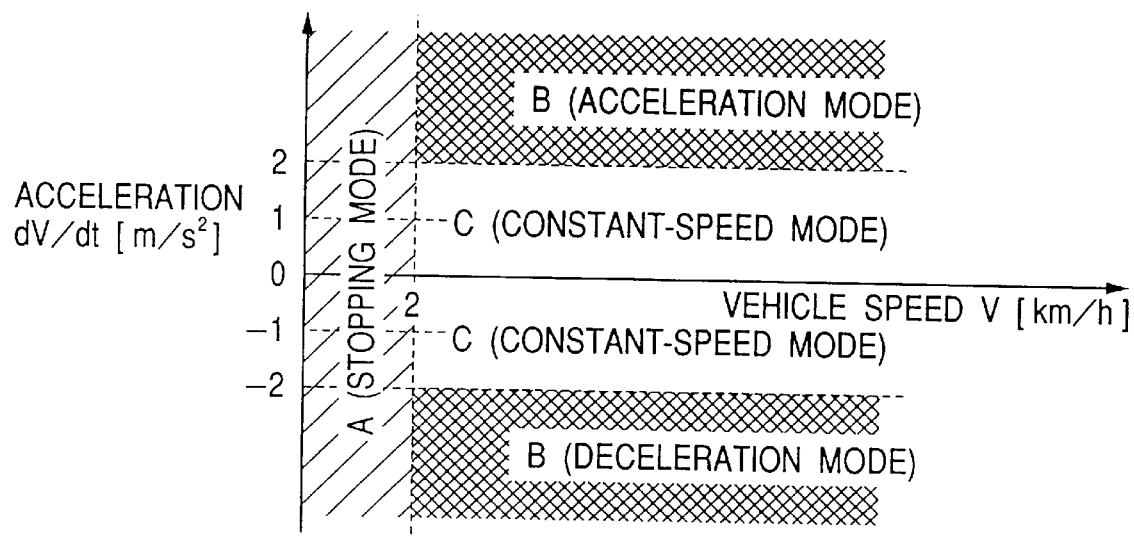
FIG. 13 is a table-like graph showing filter regions corresponding to control modes used in the automatic aiming adjustment apparatus for the headlights of an automotive vehicle in accordance with a second embodiment of the present invention.

FIG. 13 is a graph showing table-like filter regions representing various control modes used in the automatic aiming adjustment apparatus for the headlights of an automotive vehicle in accordance with a second embodiment of the present invention. In FIG. 13, an abscissa is the vehicle traveling speed V [km/h], while an ordinate is the vehicle acceleration dV/dt [m/s$^2$] which is a differential value of the vehicle traveling speed V. A plurality of filter regions A, B and C are provided for vehicle control modes (i.e., stopping mode, acceleration mode, deceleration mode, and constant-speed mode). These filters can be constituted by using a hardware arrangement capable of processing the height sensor signals (for example, a CR circuit having a capability of smoothing signals), or by using a software arrangement capable of processing the height sensor signals and the pitch angles (for example, a signal smoothing operation performed by ECU using a moving average method or a standard deviation method). The present system incorporates ECU. Thus, from the view point of cost, the present embodiment is based on the moving average method applied for processing the pitch angles.

According to FIG. 13, when the vehicle traveling speed V is smaller than a predetermined value (e.g., 2 [km/h]), a filter A corresponding to the stopping mode is selected. When the automotive vehicle is stopped, there is a possibility that the pitch angle may cause a large variation due to loading or unloading or the like. In such a case, it is preferable that the actuator responds quickly to the variation of the pitch angle. This is why no filter or a very weak filter is used in the filter region A.

When the vehicle traveling speed V exceeds the predetermined value (e.g., 2 [km/h]) and the vehicle acceleration dV/dt being a differential value of the vehicle traveling speed V exceeds a predetermined threshold (e.g., ±2[m/s$^2$], a filter region B corresponding to the acceleration mode or the deceleration mode is selected. When the automotive vehicle is accelerated or decelerated, the pitch angle may cause a relatively large variation. Thus, it is preferable to use a very weak filter to cause the actuator to respond at an adequate faster speed to the variation of the pitch angle. As described later, according to this embodiment, even if the vehicle driving condition is in the constant-speed mode, the filter B is selected when the vehicle traveling speed V exceeds the above-described predetermined value (e.g., 2 [km/h]) and the vehicle acceleration dV/dt exceeds a predetermined auxiliary threshold (e.g., ±1 [m/s$^2$] continuously for a predetermined time (e.g., two times a sampling interval). When such conditions are satisfied, it is regarded that the vehicle driving condition will soon transfer from the constant-speed mode to the acceleration mode. Thus, this embodiment quickly sets the filter B corresponding to the acceleration or deceleration mode.

Furthermore, when the vehicle traveling speed V exceeds the above-described predetermined value (e.g., 2 [km/h]) and the vehicle acceleration dV/dt does not exceed the above-described predetermined threshold (e.g., ±2 [m/s$^2$], a filter C corresponding to the constant-speed mode is selected. When the automotive vehicle is traveling at a constant speed, the pitch angle does not cause a large variation. Therefore, a strong filter is used to cancel any pitch angle variation derived from higher-frequency components of the vehicle body vibration or surface roughness of the road. This is effective to prevent the actuator from erroneously responding to the disturbance-like variations of the pitch angle.

Figure 14:
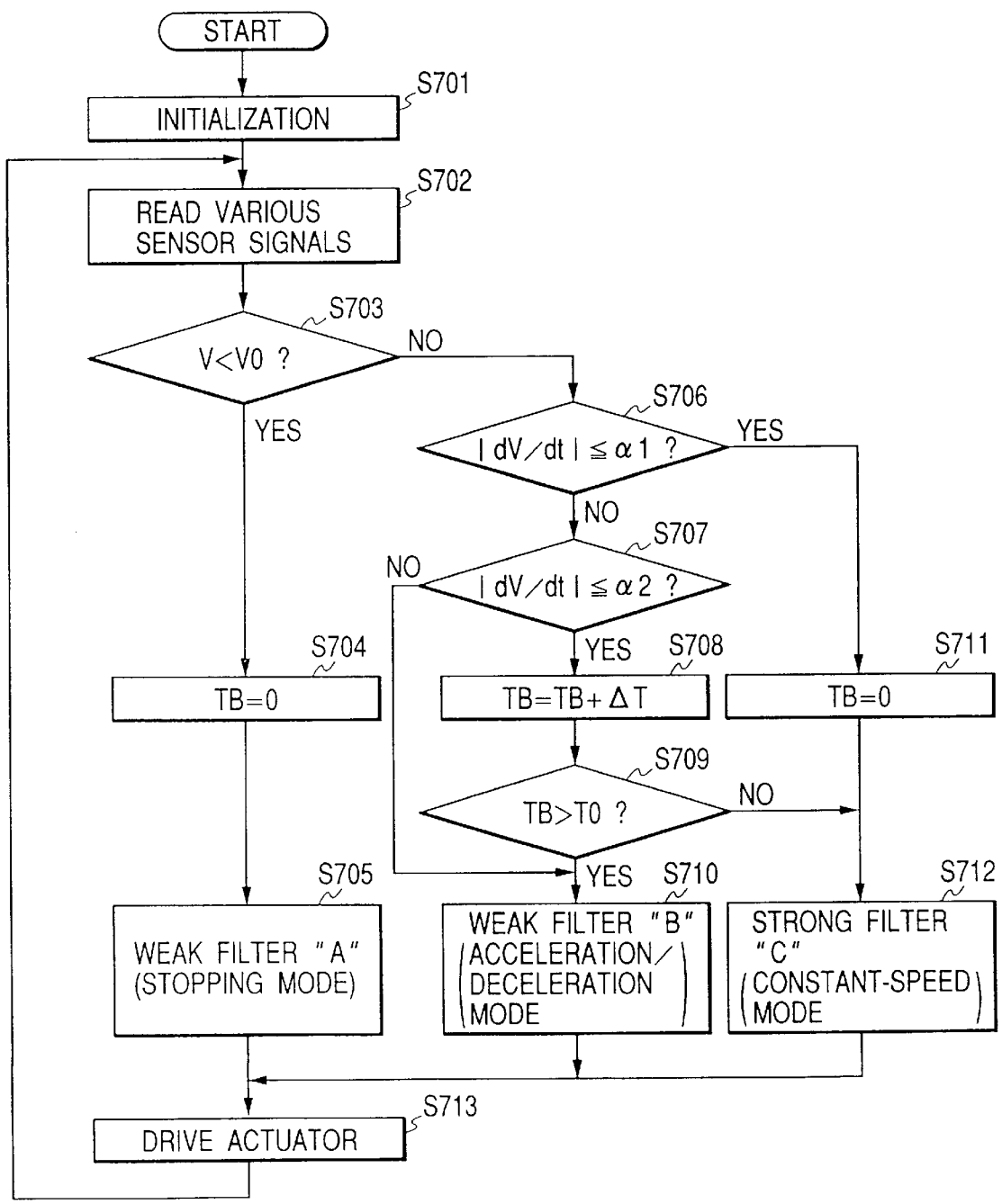
FIG. 14 is a flowchart showing an aiming control procedure performed in CPU of ECU used in the automatic aiming adjustment apparatus for the headlights of an automotive vehicle in accordance with the second embodiment of the present invention.

FIG. 14 is a flowchart showing an aiming control procedure performed in CPU 21 of ECU 20 incorporated in the automatic aiming adjustment apparatus for the headlights of an automotive vehicle in accordance with the second embodiment of the present invention. This routine is executed at intervals of approximately 50 msec. Hereinafter, details of the automatic aiming adjustment apparatus for the headlights of an automotive vehicle will be explained with reference to this flowchart and timing diagrams shown in FIGS. 15 and 16.

In FIG. 14, step S701 performs initialization processing. Next, step S702 reads various sensor signals including the wheel speed pulses, the front height value HF, and the rear height value HR. Then, the control flow proceeds to step S703 to judge whether the vehicle traveling speed V is smaller than a predetermined value Vo. The vehicle traveling speed V is calculated from the wheel speed pulses read in the step S702. The predetermined value Vo is, for example, 2 [km/h] as shown in FIG. 13. When the judgement condition is satisfied in step S703, the control flow proceeds to step S704 to reset a timer TB (i.e., TB=0) and subsequently proceeds to step S705 to set a weak filter A shown in FIG. 13. Namely, it is regarded that the vehicle driving condition is in the stopping mode. The pitch angle θp calculated according to the above-described equation (1) is processed by using the selected weak filter A. The pitch angle θpf processed by the selected weak filter A can follow up the transition of the actual pitch angle θp to a certain degree.

On the other hand, when the judgement condition is not satisfied in the step S703, i.e., when the vehicle traveling speed V is not smaller than 2 [km/h], the control flow proceeds to step S706. The step S706 judges whether the absolute value of the vehicle acceleration dV/dt is not larger than a predetermined threshold α1. The vehicle acceleration dV/dt is a differential value of the vehicle traveling speed V. The predetermined threshold α1 is, for example, ±1 [m/s$^2$] as shown in FIG. 13. When the absolute value of the vehicle acceleration dV/dt is larger than the predetermined threshold α1, the control flow proceeds to step S707 and further judges whether the absolute value of the vehicle acceleration dV/dt is not larger than a predetermined threshold α2. The predetermined threshold α2 is, for example, ±2 [m/s$^2$] as shown in FIG. 13. When the absolute value of the vehicle acceleration dV/dt is not larger than the predetermined threshold α2, the control flow proceeds to step S708 to judge whether the vehicle driving condition will soon transfer to the acceleration or deceleration condition. The step S708 increments the timer TB by ΔT (i.e., TB=TB+ΔT). The timer TB has a function of measuring a time during which the absolute value of the acceleration dV/dt continuously remains between the threshold α1 and the threshold α2. According to this embodiment, instead of measuring the predetermined time, it is possible to count the number of sampling times when the absolute value of the acceleration dV/dt continuously remains between the threshold α1 and the threshold α2.

Next, the control flow proceeds to step S709 to judge whether the count time of the timer TB exceeds a predetermined value To. When the count time of the timer TB exceeds the predetermined value To, the control flow proceeds to step S710 to set a weak filter B shown in FIG. 13. Namely, it is regarded that the vehicle driving condition is in the acceleration or deceleration mode. The pitch angle θp calculated according to the above-described equation (1) is processed by using the selected weak filter B. The pitch angle θpf processed by the selected weak filter B can follow up the transition of the actual pitch angle θp to a certain degree in the same manner as the above-described stopping mode.

On the other hand, when the judging condition is not satisfied in step S707, i.e., when the absolute value of the vehicle acceleration dV/dt is larger than the predetermined threshold α2, the control flow skips the above-described steps S708 and S709 and directly proceeds to the step S710 to set the weak filter B shown in FIG. 13. Namely, it is regarded that the vehicle driving condition is in the acceleration or deceleration mode. Thus, the pitch angle θp calculated according to the above-described equation (1) is processed by using the selected weak filter B. The pitch angle θpf processed by the selected weak filter B can follow up the transition of the actual pitch angle θp to a certain degree in the same manner as the above-described stopping mode.

The above-described embodiment provides two kinds of thresholds α1 and α2 in the control mode judgement performed in the above-described steps S706 and S707 for checking the absolute value of the vehicle acceleration dV/dt. An effect of providing these two kinds of thresholds α1 and α2 will be described hereinafter with reference to the timing diagrams of FIGS. 15 and 16.

Figure 15:
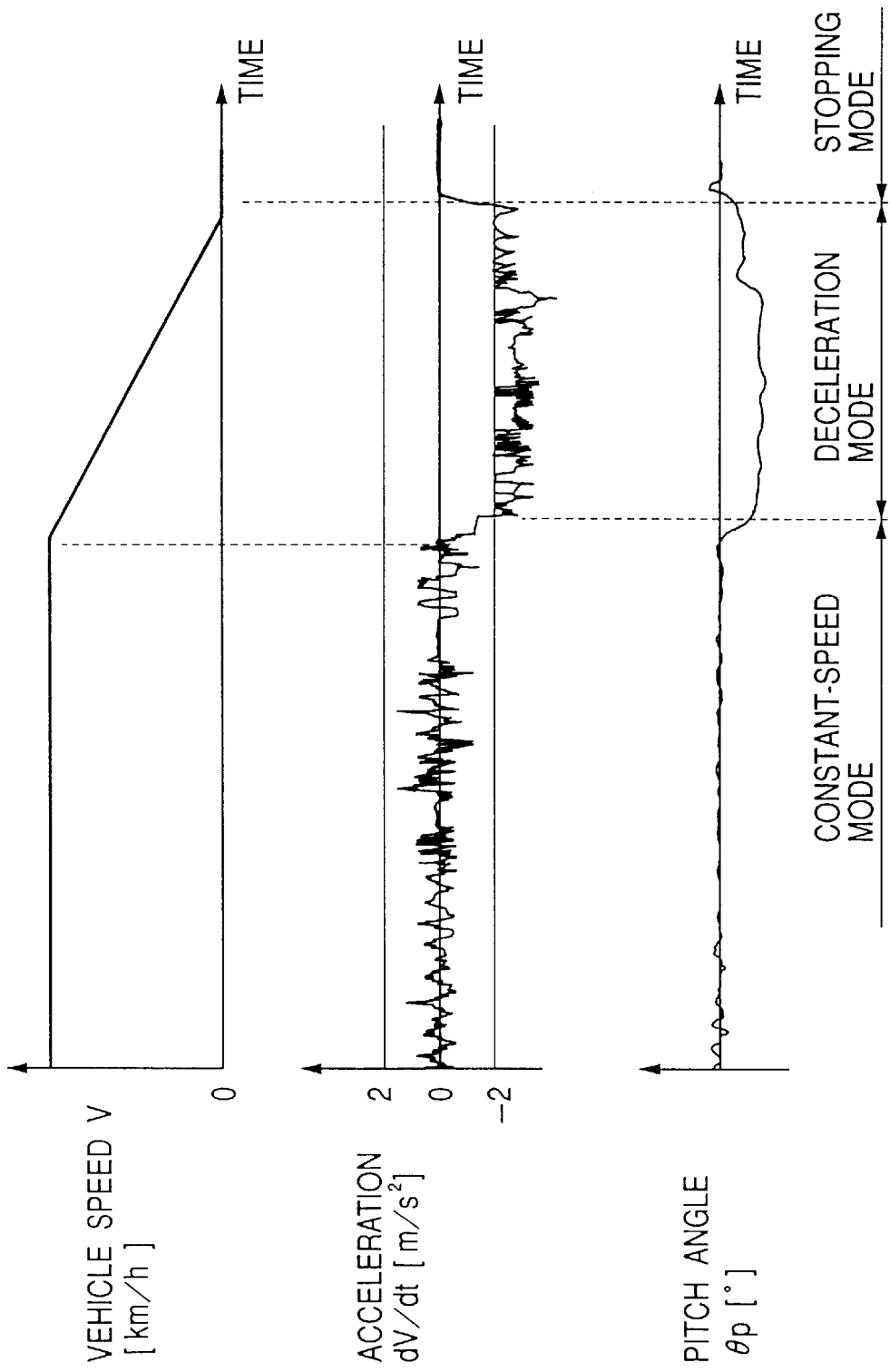
FIG. 15 is a comparative timing diagram used for illustrating the effectiveness of aiming adjustment performed by the automatic aiming adjustment apparatus for the headlights of an automotive vehicle in accordance with the second embodiment of the present invention.
Figure 16:
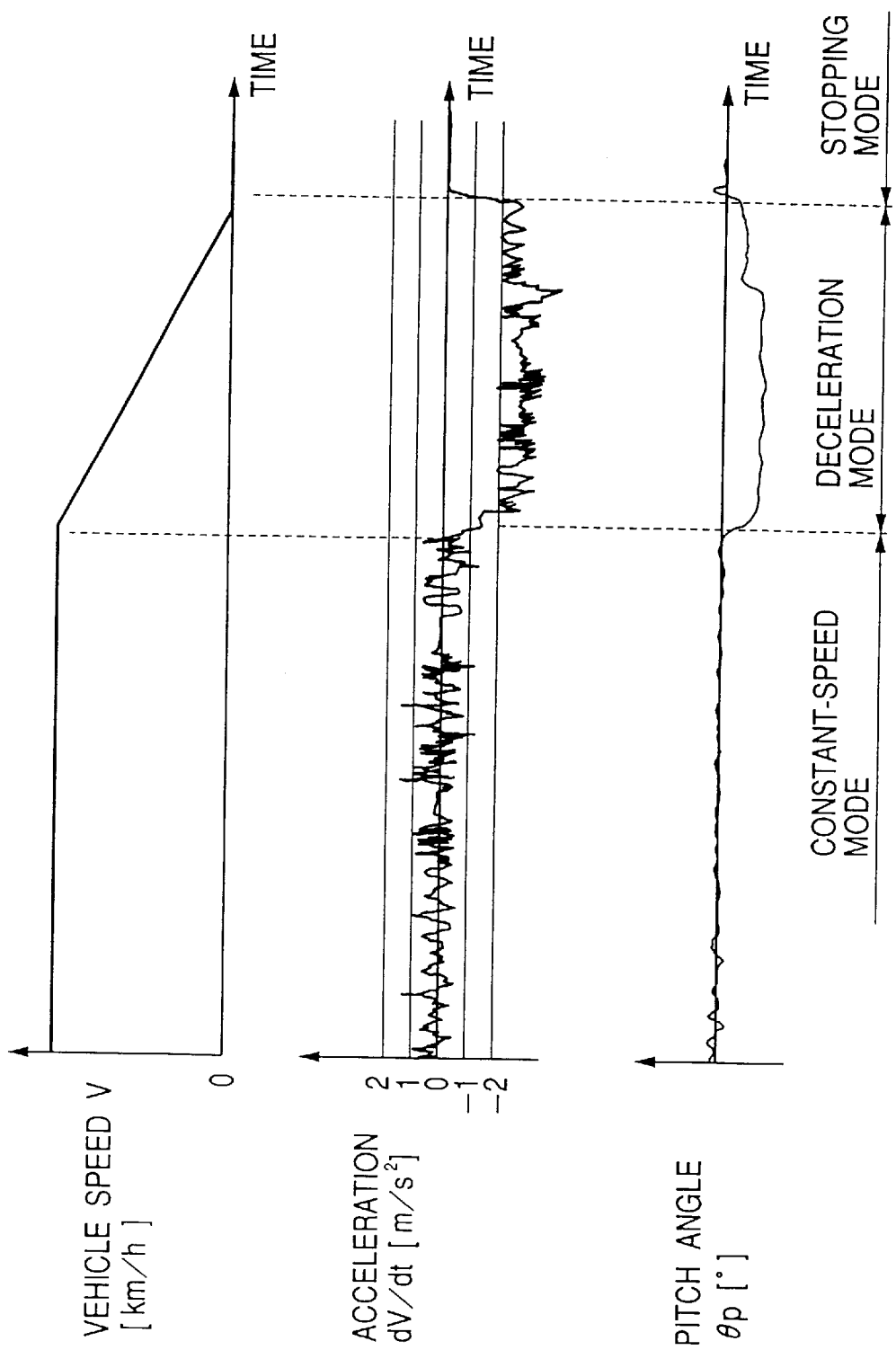
FIG. 16 is a timing diagram used for illustrating the effectiveness of the aiming adjustment performed by the automatic aiming adjustment apparatus for the headlights of an automotive vehicle in accordance with the second embodiment of the present invention.

FIG. 15 shows a case where only one threshold, e.g., ±2 [m/s$^2$], is provided for checking the absolute value of the vehicle acceleration dV/dt. When the absolute value of the vehicle acceleration dV/dt exceeds this threshold, the control mode is switched from the constant-speed mode to the deceleration mode corresponding to a vehicle decelerating condition. When carefully observed, the transition of the vehicle driving condition shows a characteristic change. More specifically, as understood from FIG. 16, during a transition from the constant-speed traveling mode to the decelerating traveling condition, there is a tendency that the vehicle acceleration dV/dt is once increased and this condition continues for a while, and then the acceleration is further increased. The second embodiment pays attention to this characteristic transition of the acceleration dV/dt occurring when the vehicle traveling condition is changed. More specifically, as shown in FIG. 16, two different thresholds, i.e., ±1 [m/s$^2$] and ±2 [m/s$^2$], are provided for checking the absolute value of the vehicle acceleration dV/dt. Accordingly, when the absolute value of the vehicle acceleration dV/dt exceeds the threshold of ±1 [m/s$^2$] and this condition continues for a predetermined time, there is a tendency that the automotive vehicle will soon enter into the acceleration of decelerating traveling condition. Hence, as shown in FIG. 16, the control mode is switched from the constant-speed mode to the deceleration mode at an earlier timing before the absolute value of the vehicle acceleration exceeds another threshold of ±2 [m/s$^2$].

Returning to step S706, when the judgement condition is satisfied, i.e., when the absolute value of the vehicle acceleration dV/dt is not larger than the predetermined threshold α1, it is believed that the automotive vehicle is traveling at a constant speed. Thus, the control flow proceeds to step S711 to reset the timer TB (i.e., TB=0) and subsequently proceeds to step S712. Furthermore, when the judgement condition is not satisfied in the step S709, i.e., when the count time of the timer TB does not exceed the predetermined value To, it is concluded that there is no tendency that the automotive vehicle will soon enter into the acceleration or decelerating traveling condition. Thus, the control flow proceeds to the step S712. The step S712 sets the strong filter C shown in FIG. 13. Thus, the pitch angle θp calculated according to the above-described equation (1) is processed by using the selected strong filter C. The pitch angle θpf processed by the selected strong filter C is robust against fine vibration and therefore includes no higher frequency component appearing during the transition of the actual pitch angle θp.

As described in the foregoing description, the pitch angle θpf is obtained as a result of the filtering processing which selects an adequate filter in accordance with each of the stopping mode of step S705, the acceleration or deceleration mode of step S710, and the constant-speed mode of step S712. Thus, an actuator drive angle (i.e., target aiming adjustment angle) θa which does not dazzle an oncoming vehicle's driver is calculated based on the filtered pitch angle θpf. In this case, θa≈−θpf. Next, the control flow proceeds to step S713 to drive the actuator 35L (35R) in accordance with the actuator drive angle θa so as to adjust the aiming direction of the headlight 30L (30R). Then, the control flow returns to step S702 to repetitively perform the processing of steps S702 through S713. Although not shown, the control speed of the actuator 35L (35R) may be variable and finely controlled in this embodiment. Accordingly, the aiming adjustment for the headlight 30L (30R) can be quickly and properly performed in accordance with the vehicle traveling condition (i.e., each of the stopping mode, the acceleration/deceleration mode, and the constant-speed mode).

As apparent from the foregoing description, the automatic aiming adjustment apparatus for the headlights of an automotive vehicle of the second embodiment comprises a pair of the height sensors 11F and 11R provided at front and rear portions of the vehicle body to detect the variation of the vehicle height, respectively. ECU 20 functions as the gradient calculating means for calculating the pitch angle θp, which is an inclination of an aiming direction of the headlights 30L and 30R of the automotive vehicle with respect to a horizontal plane, based on output values HF and HR of the height sensors 11F and 11R. The wheel speed sensor 12 functions as the vehicle speed sensor for detecting the vehicle traveling speed V based on a left wheel speed $V_L$ and a right wheel speed $V_R$ of the automotive vehicle. ECU 20 further functions as the mode setting means for determining a control mode suitable for the present traveling condition based on the vehicle traveling speed V and the vehicle acceleration dV/dt which is calculated from the vehicle traveling speed V. ECU 20 further functions as the filter switching means for selecting a preferable one of a plurality of filters in accordance with the control mode determined by the mode setting means. The plurality of filters are used to change the response sensitivity in the aiming adjustment of the headlights 30L and 30R. Moreover, ECU 20 functions as the aiming adjusting means for adjusting the aiming direction of the headlights 30L and 30R based on the actuator drive angle θa corresponding to the pitch angle θpf which is obtained by modifying the pitch angle θp calculated by the gradient calculating means with the filter selected by the filter switching means. The mode setting means provides two different thresholds α1 and α2 as a plurality of judging levels for detecting a transfer of the automotive vehicle into an acceleration or deceleration condition. When the vehicle acceleration dV/dt exceeds a lower threshold α1 of the two different thresholds α1 and α2 for a predetermined time To, or when the vehicle acceleration dV/dt exceeds an upper threshold α2 of the two different thresholds α1 and α2, the control mode is set to the acceleration mode corresponding to the vehicle's accelerating condition or the deceleration mode corresponding to the driver's deceleration condition.

Accordingly, in ECU 20 functioning as the gradient calculating means, the pitch angle θp is calculated, as an inclination of the aiming direction of the headlights 30L and 30R of the automotive vehicle with respect to a horizontal plane, based on the output values HF and HR of the height sensors 11F and 11R provided at the front and rear portions of the vehicle body. Furthermore, in ECU 20 functioning as the mode setting means, the preferable control mode corresponding to the present traveling condition is determined based on the vehicle traveling speed V detected by the wheel speed sensor 12 and the vehicle acceleration α calculated from the vehicle traveling speed V. Furthermore, in ECU 20 functioning as the filter switching means, a preferable filter is selected in accordance with the control mode for changing the response sensitivity in the aiming adjustment of the headlights 30L and 30R. Moreover, in ECU 20 functioning as the aiming adjusting means, the aiming direction of the headlights 30L and 30R is adjusted based on the pitch angle θpf processed by the selected filter. In this case, in ECU 20 functioning as the mode setting means, the transfer of the automotive vehicle into an acceleration or deceleration condition is detected when the vehicle acceleration dV/dt exceeds the lower threshold α1 for the predetermined time To or when the vehicle acceleration dV/dt exceeds the upper threshold α2. Accordingly, the pitch angle θp is modified by using an optimum filter corresponding to the present traveling condition of the automotive vehicle. Thus, the aiming adjustment of the headlights 30L and 30R can be performed with an appropriate response sensitivity. Furthermore, when there is a tendency that the automotive vehicle will soon enter into the acceleration or deceleration condition, the pitch angle θp is promptly processed at an earlier timing by using a suitable filter. Thus, the aiming adjustment for the headlights 30L and 30R is quickly and properly performed. The reliability in the aiming adjustment is thus increased.

Figure 17:
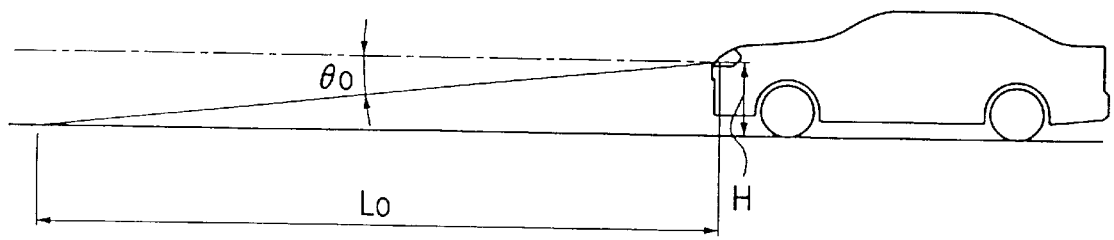
FIG. 17 is a view showing a target aiming angle which is set as an initial value in the aiming control performed by the automatic aiming adjustment apparatus for the headlights of an automotive vehicle in accordance with the second embodiment of the present invention.

FIG. 17 is a view showing a target aiming angle θo of the headlight 30L (30R) of the automotive vehicle. The target aiming angle θo is set as an initial value in the aiming control performed by the automatic aiming adjustment apparatus for the headlights of an automotive vehicle in accordance with the second embodiment of the present invention. Hereinafter, a method of correcting the target aiming angle θo will be explained with reference to FIG. 17.

As shown in FIG. 17, the target aiming angle θo of the headlight 30L (30R) is an initial set value determined with respect to a horizontal plane. For example, the target aiming angle θo is −1%. That is, θo is −tan$^{-1}$ 0.01≈−0.57 [°]. When the mounting height H of the headlight 30L (30R) is 0.65 m, the optical axis of the headlight 30L (30R) reaches the ground at 65 m ahead of the automotive vehicle. This distance is referred to as an initial reaching distance Lo (i.e., Lo=65 m).

Such initial set conditions will be acceptable when the automotive vehicle is traveling in an ordinary urban area. However, when the automotive vehicle is traveling on a highway, the vehicle traveling speed V may reach 100 km/h which requires approximately 100 m as a braking distance Ls. In such a case, it is desirable that the optical axis of the headlight 30L (30R) reaches 100 m ahead of the automotive vehicle. To satisfy such a desire, the target aiming angle θo, which is an initial set value for the headlight 30L (30R) determined by the aiming control, is corrected in the following manner. More specifically, a corrected target aiming angle θc is calculated according to the following equation (2), where "a" takes a value from 0 to 30 m and the corrected target aiming angle θc is fixed to θc=−0.57 [°] when θc becomes smaller than −0.57°.

$$\theta c = -\tan^{-1} \{H/(Ls+a)\} \quad (2)$$

When a vehicle-to-vehicle distance Lc [m], i.e., a distance between the subjective vehicle and a preceding vehicle (including an opposed vehicle), is equal to or smaller than (Ls+a) (m), there is no necessity of extending the reaching distance of light. For example, the vehicle-to-vehicle distance Lo can be measured by using a radar. In such a case, the corrected target aiming angle θc [°], to be obtained by correcting an initial set value θo for the aiming control of the headlight 30L (30R), can be calculated by using the following equation (3), where the corrected target aiming angle θc is fixed to θc=−0.57° when θc becomes smaller than −0.57°.

$$\theta c = -\tan^{-1}\{H/Lc\} \quad (3)$$

Next, details of the correcting operation of the target aiming angle θo, which is performed after the target aiming angle θo is initially set for the headlight 30L (30R) by the aiming control, will be explained with reference to a flowchart shown in FIG. 18. This routine is repetitively executed at predetermined interrupt timings.

Figure 18:
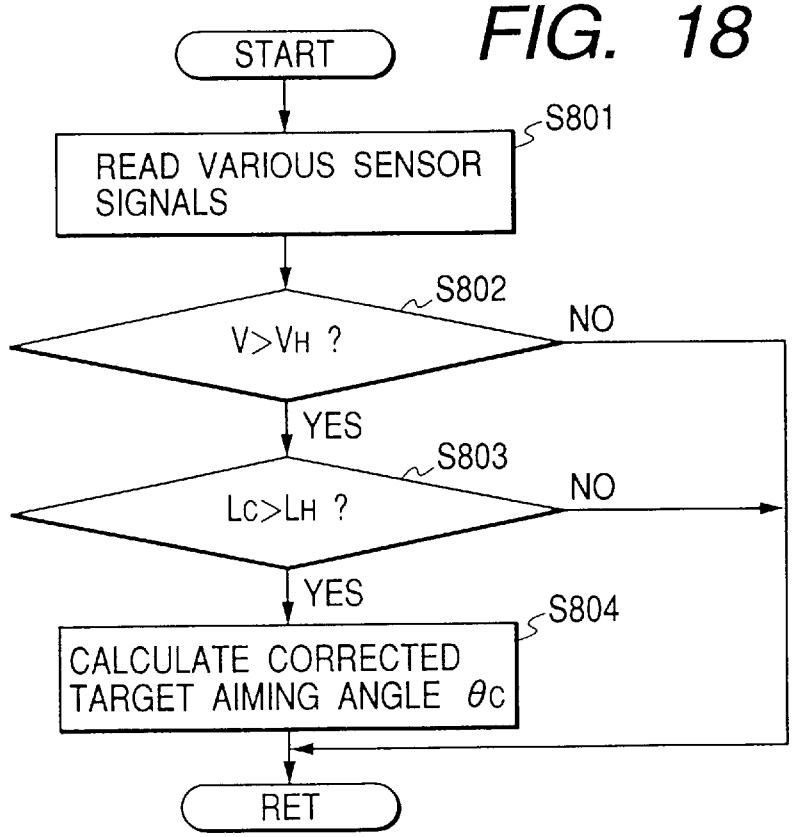
FIG. 18 is a flowchart showing a target aiming angle correcting procedure performed in CPU of ECU used in the automatic aiming adjustment apparatus for the headlights of an automotive vehicle in accordance with the second embodiment of the present invention.

In FIG. 18, step S801 reads various sensor signals including wheel speed pulses, and radar signals obtained from a radar (not shown) which measures the vehicle-to-vehicle distance Lc. Next, the control flow proceeds to step S802 to judge whether the vehicle traveling speed V, calculated from the wheel speed pulses read in the step S801, exceeds a predetermined threshold $V_H$ [km/h] which is set in relation to the mounting height H [m] of the headlight 30L (30R). That is, as explained with reference to FIG. 17, when the optical axis of the headlight 30L (30R) is inclined −1% with respect to the horizontal plane and the mounting height H is 0.65 m, light of the headlight 30L (30R) reaches the ground at 65 m ahead of the automotive vehicle. In view of this, the threshold $V_H$ is set to 65 km/h by taking account of the braking distance Ls which is required for the automotive vehicle to stop.

When the judgement condition is satisfied in step S802, i.e., when the vehicle traveling speed exceeds the threshold $V_H$, the control flow proceeds to step S803. The step S803 judges whether the vehicle-to-vehicle distance Lc [m], calculated from the radar signals read in the step S801, exceeds the threshold $L_H$ (=100×H) [m] which is set in relation to the mounting height H of the headlight 30L (30R). When the judgement condition is satisfied in step S803, i.e., when the vehicle-to-vehicle distance Lc exceeds the threshold $L_H$, the control flow proceeds to step S804. The step S804 calculates the corrected target aiming angle θc according to the above-described equations (2) or (3), so as to correct the initially set target aiming angle θo by using at least one of the braking distance Ls corresponding to the vehicle traveling speed V and the vehicle-to-vehicle distance Lc. Then, this routine is terminated. When the corrected target aiming angle θc becomes smaller than −0.57°, the value of the corrected target aiming angle θc is fixed to −0.57°. When the judgement condition is not satisfied in the step S802 or S803, this routine is terminated without performing the correction of the target aiming angle θo.

As apparent from the foregoing description, according to the automatic aiming adjustment apparatus for the headlights of an automotive vehicle of the second embodiment, the aiming adjusting means constituted by ECU 20 comprises the aiming correcting means for correcting the target aiming direction θo, which is set as an initial value for the headlight 30L (30R), in accordance with at least one of the braking distance Ls corresponding to the vehicle traveling speed V and the vehicle-to-vehicle distance Lc representing the distance between the subjective vehicle and the preceding vehicle. That is, when ECU 20 functioning as the aiming adjusting means comprises the aiming correcting means, the initially set aiming angle θ0 is appropriately corrected in accordance with the vehicle traveling speed V or the vehicle-to-vehicle distance Lc. Thus, the driver's visibility can be improved when the automotive vehicle is traveling on a highway. Even when the vehicle-to-vehicle distance is reduced, the aiming adjustment of the headlight 30L (30R) can be adequately performed.

Third Embodiment

Figure 19:
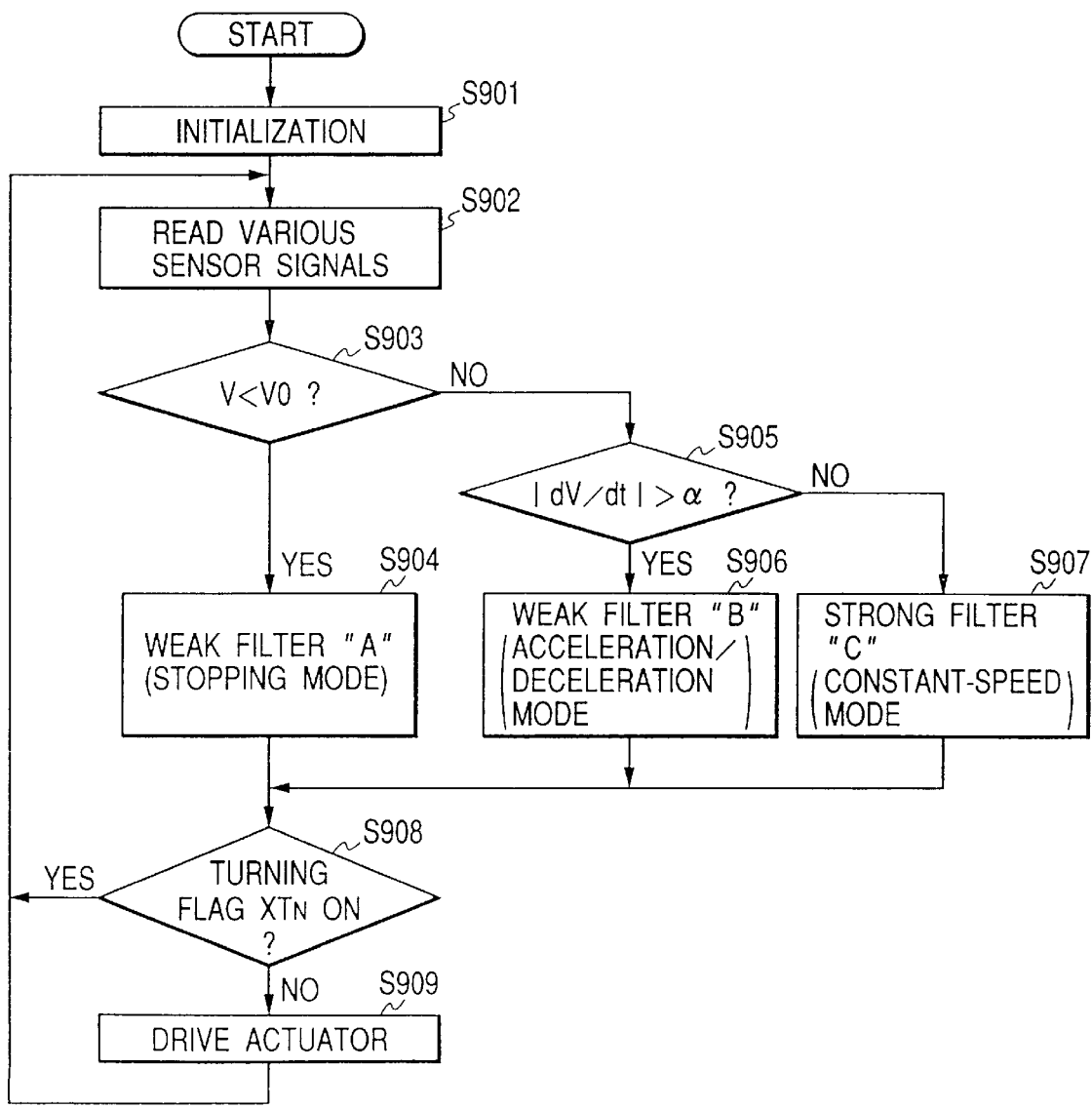
FIG. 19 is a flowchart showing an aiming control procedure performed in CPU of ECU used in the automatic aiming adjustment apparatus for the headlights of an automotive vehicle in accordance with a third embodiment of the present invention.

FIG. 19 is a flowchart showing an aiming control procedure performed in CPU 21 of ECU 20 incorporated in the automatic aiming adjustment apparatus for the headlights of an automotive vehicle in accordance with the third embodiment of the present invention. This routine is executed at intervals of approximately 50 msec.

In FIG. 19, step S901 performs initialization processing. Then, control flow proceeds to step S902 to read various sensor signals including the wheel speed pulses, the front height value HF, and the rear height value HR. Then, the control flow proceeds to step S903 to judge whether the vehicle traveling speed V is smaller than a predetermined value Vo. The vehicle traveling speed V is calculated from the wheel speed pulses read in the step S902. The predetermined value Vo is, for example, 2 [km/h] as shown in FIG. 13. When the judgement condition is satisfied in step S903, the control flow proceeds to step S904 to set the weak filter A shown in FIG. 13. Namely, it is regarded that the vehicle driving condition is in the stopping mode. The pitch angle θp calculated according to the above-described equation (1) is processed by using the selected weak filter A The pitch angle θpf processed by the selected weak filter A can follow up the transition of the actual pitch angle θp to a certain degree.

On the other hand, when the judgement condition is not satisfied in the step S903, i.e., when the vehicle traveling speed V is not smaller than 2 [m/h], the control flow proceeds to step S905 to judge whether the absolute value of the vehicle acceleration dV/dt exceeds a predetermined threshold a. The vehicle acceleration dV/dt is a differential value of the vehicle traveling speed V. The predetermined threshold α is, for example, ±2 [m/s$^2$] as shown in FIG. 13. When the judgement condition is satisfied in step S905, the control flow proceeds to step S906 to set the weak filter B shown in FIG. 13. Namely, it is regarded that the vehicle driving condition is in the acceleration or deceleration mode. The pitch angle θp calculated according to the above-described equation (1) is processed by using the selected weak filter B. The pitch angle θpf processed by the selected weak filter B can follow up the transition of the actual pitch angle θp to a certain degree in the same manner as the above-described stopping mode.

On the other hand, when the judging condition is not satisfied in step S905, i.e., when the absolute value of the vehicle acceleration dV/dt is not larger than the predetermined threshold α, it is concluded that the automotive vehicle is traveling at a constant speed. Thus, the control flow proceeds to step S907 to set the strong filter C shown in FIG. 13. The pitch angle θp calculated according to the above-described equation (1) is processed by using the selected strong filter C. The pitch angle θpf processed by the selected strong filter C is robust against fine vibration and therefore includes no higher frequency component appearing during the transition of the actual pitch angle θp. Hence, when the automotive vehicle is accelerated or decelerated during a normal driving condition, the weak filter is selected based on the judgements on the vehicle speed and the vehicle acceleration. Therefore, the actuator can be driven quickly.

As described in the foregoing description, the pitch angle θpf is obtained as a result of the filtering processing which selects an adequate filter in accordance with each of the stopping mode of step S904, the acceleration or deceleration mode of step S906, and the constant-speed mode of step S907. Thus, an actuator drive angle (i.e., target aiming adjustment angle) θa which does not dazzle an oncoming vehicle's driver is calculated based on the filtered pitch angle θpf. In this case, θa≈−θpf. Next, the control flow proceeds to step S908 to judge whether a turning flag XT$_N$ is turned on, i.e., whether the automotive vehicle is traveling on a cornered or curved road. Detailed setting of the turning flag XT$_N$ will be explained later. When the judgement condition is not satisfied in step S908, i.e., when the turning flag XT$_N$ is turned off (i.e., the automotive vehicle is not traveling on a cornered or curved road), the control flow proceeds to step S909 to drive the actuator 35L (35R) in accordance with the actuator drive angle θa so as to adjust the aiming direction of the headlight 30L (30R). Then, the control flow returns to step S902 to repetitively perform the processing of steps S902 through S909.

On the other hand, when the judgement condition is satisfied in the step S908, i.e., when the turning flag XT$_N$ is turned on (i.e., the automotive vehicle is traveling on a cornered or curved road), the control flow directly returns to the step S902 without driving the actuator 35L (35R), and repetitively perform the above-described processing. In general, when the automotive vehicle is traveling on a cornered or curved road, the vehicle body shows unstable behavior causing fine variations in the pitch angle. If the aiming adjustment is performed in such unstable condition, the aiming direction will be controlled unintendedly. This is why the driving operation of the actuator 35L (35R) is stopped when the automotive vehicle is traveling on a cornered or curved road. Although not shown, the control speed of the actuator 35L (35R) may be variable and finely controlled in this embodiment. Accordingly, the aiming adjustment for the headlight 30L (30R) can be properly performed in accordance with the vehicle traveling, condition except for the turning condition (i.e., each of the stopping mode, the acceleration/deceleration mode, and the constant-speed mode).

Figure 22:
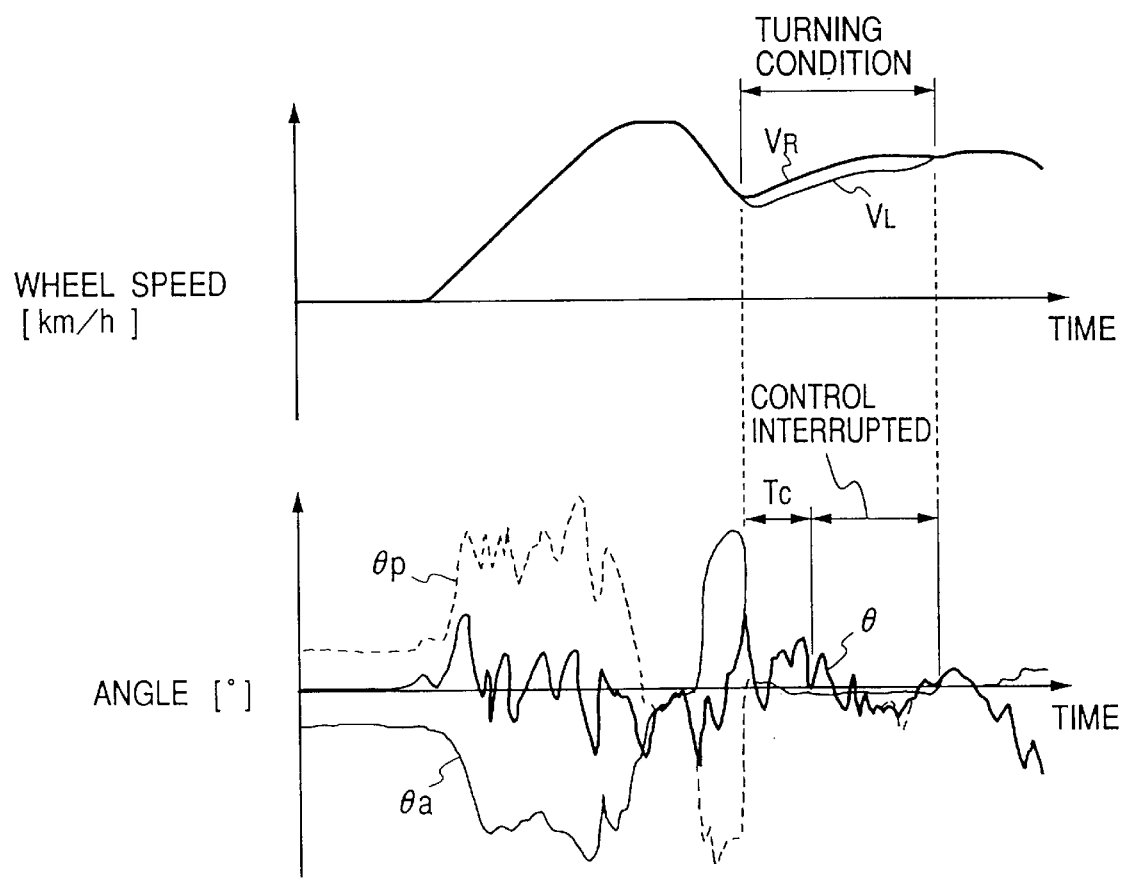
FIG. 22 is a timing diagram showing an aiming control starting a predetermined time after the automotive vehicle starts turning and performed by the automatic aiming adjustment apparatus for the headlights of an automotive vehicle in accordance with the third embodiment of the present invention.

Next, the setting of the turning flag XT$_N$ judged in step S908 of FIG. 19 will be explained based on a turning judging routine shown in FIG. 20, with reference to the timing diagrams of FIGS. 21 and 22. The timing diagrams of FIGS. 21 and 22 show right and left wheel speeds V$_R$ and V$_L$ [km/h], the actuator drive angle θa [°] corresponding to the pitch angle θp [°], and a final aiming adjustment angle θ[°] for the headlight 30L (30R). When the automotive vehicle is tuning, a turning radius of an outer wheel is larger than a turning radius of an inner wheel. In other words, there is a difference between the right and left wheel speeds V$_R$ and V$_L$. Thus, it is possible to judge the turning condition of the automotive vehicle by detecting the difference between the right and left wheels speeds.

FIG. 21 shows a case where the driving operation of the actuator 35L (35R) is immediately stopped when a significant amount of difference is caused between the right and left wheels V$_R$ and V$_L$. As understood from FIG. 21, when the automotive vehicle is turning, the driving control of the actuator 35L (35R) is interrupted. That is, the actuator drive angle θa is maintained at a same value during this interruption, even if the pitch angle θp causes a variation. This is effective to prevent the aiming adjustment angle θ from being improperly adjusted through the aiming adjustment. In general, when the automotive vehicle is in an initial stage of the turning motion, the pitch angle θp causes unstable variation due to braking and deceleration. If the aiming adjustment is stopped immediately in response to the wheel speed difference during the initial stage of the turning motion, there is a possibility that the aiming adjustment may be undesirably ceased before the aiming direction is set to the intended position.

On the other hand, the timing diagram of FIG. 22 shows a case where the driving operation of the actuator 35L (35R) is stopped after a predetermine time has passed from a time a significant amount of difference is caused between the right and left wheels V$_R$ and V$_L$. As understood from FIG. 22, when the automotive vehicle is turning, a predetermined time Tc is provided before the driving control of the actuator 35L (35R) is interrupted. That is, the actuator drive angle θa is maintained at a same value after the passage of the predetermined time Tc, even if the pitch angle θp causes a variation. In other words, the predetermined time Tc is a delay time for assuring the aiming direction to be surely set to the intended position. Accordingly, FIG. 20 shows a routine based on the aiming control shown by the timing diagram of FIG. 22.

Figure 20:
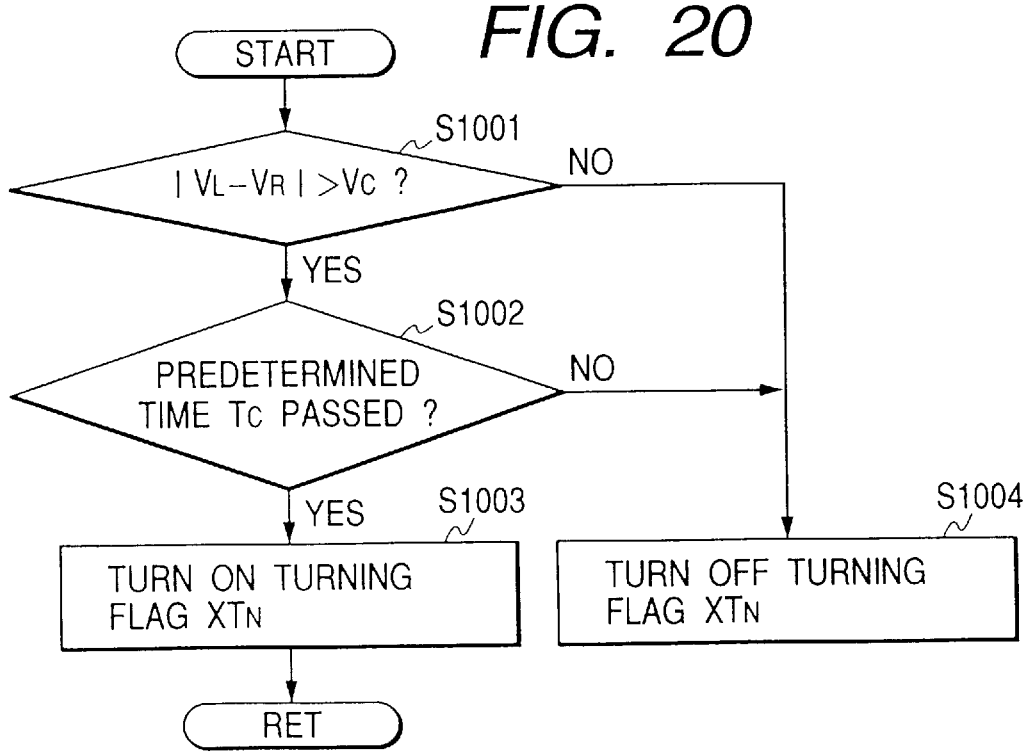
FIG. 20 is a flowchart showing a turning judgement procedure performed in CPU of ECU used in the automatic aiming adjustment apparatus for the headlights of an automotive vehicle in accordance with the third embodiment of the present invention.

In FIG. 20, step S1001 judges whether the absolute value of a difference between the right and left wheel speeds V$_R$ and V$_L$ exceeds a predetermined judgement value Vc. The right and left wheel speeds V$_R$ and V$_L$ are obtained from the wheel speed sensors 12 provided at right and left wheels, respectively. When the judgement condition is satisfied in step S1001, the control flow proceeds to step S1002 to judge whether a predetermined time Tc has passed. When the judgement condition is satisfied in step S1002, i.e., when the predetermined time Tc has passed, the control flow proceeds to step S1003 to turn on the turning flag $XT_N$. Then, this routine is terminated. On the other hand, when the judgement condition is not satisfied in the step S1001 or S1002, the control flow proceeds to step S1004 to turn off the turning flag $XT_N$. Then, this routine is terminated.

As apparent from the foregoing description, the automatic aiming adjustment apparatus for the headlights of an automotive vehicle of the third embodiment comprises a pair of the height sensors 11F and 11R provided at front and rear portions of the vehicle body to detect the variation of the vehicle height, respectively. ECU 20 functions as the gradient calculating means for calculating the pitch angle θp, which is an inclination of an aiming direction of the headlights 30L and 30R of the automotive vehicle with respect to a horizontal plane, based on output values HF and HR of the height sensors 11F and 11R. The wheel speed sensor 12 functions as the vehicle speed sensor for detecting the vehicle traveling speed V based on a left wheel speed $V_L$ and a right wheel speed $V_R$ of the automotive vehicle. ECU 20 further functions as the mode setting means for determining a control mode suitable for the present traveling condition based on the vehicle traveling speed V and the vehicle acceleration dV/dt which is calculated from the vehicle traveling speed V. ECU 20 further functions as the filter switching means for selecting a preferable one of a plurality of filters in accordance with the control mode determined by the mode setting means. The plurality of filters are used to change the response sensitivity in the aiming adjustment of the headlights 30L and 30R. Moreover, ECU 20 functions as the aiming adjusting means for adjusting the aiming direction of the headlights 30L and 30R based on the actuator drive angle θa corresponding to the pitch angle θpf which is obtained by modifying the pitch angle θp calculated by the gradient calculating means with the filter selected by the filter switching means. Furthermore, ECU 20 functions as the turning judging means for judging a turning condition of the automotive vehicle based on a difference between right and left wheel speeds $V_R$ and $V_L$. ECU 20 interrupts the aiming adjustment for the headlights 30L and 30R performed by the aiming adjusting means when the turning judging means judges that the automotive vehicle is turning (i.e., the turning flag $XT_N$ is turned on).

Accordingly, in ECU 20 functioning as the gradient calculating means, the pitch angle θp is calculated, as an inclination of the aiming direction of the headlights 30L and 30R of the automotive vehicle with respect to a horizontal plane, based on the output values HF and HR of the height sensors 11F and 11R provided at the front and rear portions of the vehicle body. Furthermore, in ECU 20 functioning as the mode setting means, the preferable control mode corresponding to the present traveling condition is determined based on the vehicle traveling speed V detected by the wheel speed sensor 12 and the vehicle acceleration α calculated from the vehicle traveling speed V. Furthermore, in ECU 20 functioning as the filter switching means, a preferable filter is selected in accordance with the control mode for changing the response sensitivity in the aiming adjustment of the headlights 30L and 30R. Moreover, in ECU 20 functioning as the aiming adjusting means, the aiming direction of the headlights 30L and 30R is adjusted based on the pitch angle θpf processed by the selected filter. In this case, the aiming adjustment for the headlights 30L and 30R performed by the aiming adjusting means is interrupted when ECU 20 functioning as the turning judging means judges that the automotive vehicle is turning. Accordingly, the pitch angle θp is modified by using an optimum filter corresponding to the present traveling condition of the automotive vehicle. Thus, the aiming adjustment of the headlights 30L and 30R can be performed with an appropriate response sensitivity. Furthermore, when the automotive vehicle is traveling on a cornered or curved road, the driving operation of the actuator 35L (35R) is interrupted. Thus, even when the vehicle body shows unstable behavior, the aiming adjustment for the headlights 30L and 30R is performed properly.

Furthermore, according to the automatic aiming adjustment apparatus for the headlights of an automotive vehicle of the third embodiment, a delay or waiting duration equivalent to the predetermined time Tc is provided when ECU 20 functioning as the turning judging means judges that the automotive vehicle is turning. Thus, the aiming adjustment for the headlights 30L and 30R performed by ECU 20 functioning as the aiming adjusting means is interrupted after the predetermined time Tc has passed.

Accordingly, the aiming adjustment for the headlights 30L and 30R is not immediately interrupted in response to a turning motion of the automotive vehicle detected by ECU 20 functioning as the turning judging means. After the predetermined time Tc has completely passed, the aiming adjustment is interrupted. Therefore, the aiming direction of the headlights 30L and 30R is surely stabilized before the aiming adjustment is interrupted. Thus, it becomes possible to prevent the headlights 30L and 30R from dazzling an oncoming vehicle's driver or prevent the subjective vehicle's driver from losing the visibility in a far area.

Figure 23:
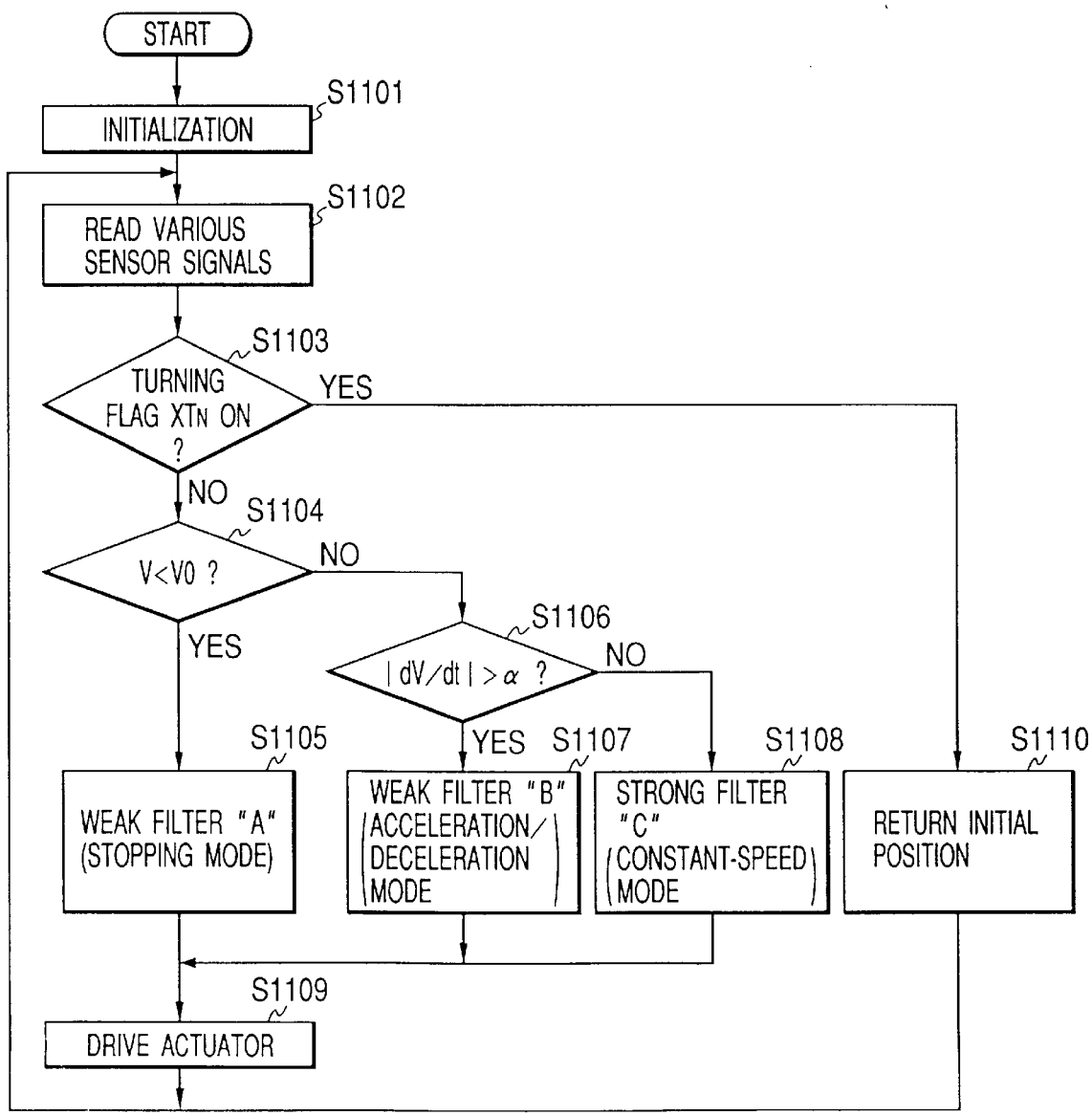
FIG. 23 is a flowchart showing a modification of the aiming control procedure shown in FIG. 19.

Next, FIG. 23 is a flowchart showing a modified aiming control procedure performed in CPU 21 of ECU 20 incorporated in the automatic aiming adjustment apparatus for the headlights of an automotive vehicle in accordance with the third embodiment of the present invention. This routine is executed at intervals of approximately 50 msec. According to the above-described embodiment, the aiming adjustment is interrupted in response to a detection of the turning motion of the automotive vehicle. However, according to this routine, the aiming direction is returned to an initial position when the automotive vehicle is turning. The judgement of the turning motion of the automotive vehicle is performed by the above-described routine shown in FIG. 20. Thus, detailed explanation of the turning judgement will be omitted.

In FIG. 23, step S1101 performs initialization processing. Then, control flow proceeds to step S1102 to read various sensor signals including the wheel speed pulses, the front height value HF, and the rear height value HR. Then, the control flow proceeds to step S1103 to judge whether the turning flag $XT_N$ set in FIG. 20 is turned on. When the judgement condition is not satisfied in step S1103, i.e., when the automotive vehicle is not turning, the control flow proceeds to step S1104 to judge whether the vehicle traveling speed V is smaller than a predetermined value Vo. The vehicle traveling speed V is calculated from the wheel speed pulses read in the step S1102. The predetermined value Vo is, for example, 2 [km/h] as shown in FIG. 13. When the judgement condition is satisfied in step S1104, the control flow proceeds to step S1105 to set the weak filter A shown in FIG. 13. Namely, it is regarded that the vehicle driving condition is in the stopping mode. The pitch angle θp calculated according to the above-described equation (1) is processed by using the selected weak filter A. The pitch angle θpf processed by the selected weak filter A can follow up the transition of the actual pitch angle θp to a certain degree.

On the other hand, when the judgement condition is not satisfied in the step S1104, i.e., when the vehicle traveling speed V is not smaller than 2 [km/h], the control flow proceeds to step S1106 to judge whether the absolute value of the vehicle acceleration dV/dt exceeds a predetermined threshold α. The vehicle acceleration dV/dt is a differential value of the vehicle traveling speed V. The predetermined threshold α is, for example, ±2 [m/s$^2$] as shown in FIG. 13. When the judgement condition is satisfied in step S1106, the control flow proceeds to step S1107 to set the weak filter B shown in FIG. 23. Namely, it is regarded that the vehicle driving condition is in the acceleration or deceleration mode. The pitch angle θp calculated according to the above-described equation (1) is processed by using the selected weak filter B. The pitch angle θpf processed by the selected weak filter B can follow up the transition of the actual pitch angle θp to a certain degree in the same manner as the above-described stopping mode.

On the other hand, when the judging condition is not satisfied in step S1106, i.e., when the absolute value of the vehicle acceleration dV/dt is not larger than the predetermined threshold α, it is concluded that the automotive vehicle is traveling at a constant speed. Thus, the control flow proceeds to step S1108 to set the strong filter C shown in FIG. 23. The pitch angle θp calculated according to the above-described equation (1) is processed by using the selected strong filter C. The pitch angle θpf processed by the selected strong filter C is robust against fine vibration and therefore includes no higher frequency component appearing during the transition of the actual pitch angle θp. Hence, when the automotive vehicle is accelerated or decelerated during a normal driving condition, the weak filter is selected based on the judgements on the vehicle speed and the vehicle acceleration. Therefore, the actuator can be driven quickly.

As described in the foregoing description, the pitch angle θpf is obtained as a result of the filtering processing which selects an adequate filter in accordance with each of the stopping mode of step S1105, the acceleration or deceleration mode of step S1107, and the constant-speed mode of step S1108. Thus, an actuator drive angle (i.e., target aiming adjustment angle) θa which does not dazzle an oncoming vehicle's driver is calculated based on the filtered pitch angle θpf. In this case, θa≈−θpf. Next, the control flow proceeds to step S1109 to drive the actuator 35L (35R) in accordance with the actuator drive angle θa so as to adjust the aiming direction of the headlight 30L (30R). Then, the control flow returns to step Si 102 to repetitively perform the processing of steps S1102 through S1109.

On the other hand, when the judgement condition is satisfied in the step S1103, i.e., when the turning flag XT$_N$ is turned on (i.e., the automotive vehicle is traveling on a cornered or curved road), the control flow proceeds to step S1110 to drive the actuator 35L (35R) in a direction that the aiming direction of the headlight 30L (30R) is returned to the initial position. Namely, the aiming direction is reset to an initial set value adjusted under a predetermined loading condition before the automotive vehicle starts traveling. Then, the driving operation of the actuator 35L (35R) is ceased. The control flow returns to the step S1102 to repetitively perform the above-described processing. In general, when the automotive vehicle is traveling on a cornered or curved road, the vehicle body shows unstable behavior causing fine variations in the pitch angle. If the aiming adjustment is performed in such unstable condition, the aiming direction will be controlled unintendedly. This is why the aiming direction is returned to the initial position and the driving operation of the actuator 35L (35R) is stopped when the automotive vehicle is traveling on a cornered or curved road. Although not shown, the control speed of the actuator 35L (35R) may be variable and finely controlled in this embodiment. Accordingly, the aiming adjustment for the headlight 30L (30R) can be properly performed in accordance with the vehicle traveling condition except for the tuning condition (i.e., each of the stopping mode, the acceleration/deceleration mode, and the constant-speed mode).

As apparent from the foregoing description, the automatic aiming adjustment apparatus for the headlights of an automotive vehicle of the modified third embodiment comprises a pair of the height sensors 11F and 11R provided at front and rear portions of the vehicle body to detect the variation of the vehicle height, respectively. ECU 20 functions as the gradient calculating means for calculating the pitch angle θp, which is an inclination of an aiming direction of the headlights 30L and 30R of the automotive vehicle with respect to a horizontal plane, based on output values HF and HR of the height sensors 11F and 11R. The wheel speed sensor 12 functions as the vehicle speed sensor for detecting the vehicle traveling speed V based on a left wheel speed $V_L$ and a right wheel speed $V_R$ of the automotive vehicle. ECU 20 further functions as the mode setting means for determining a control mode suitable for the present traveling condition based on the vehicle traveling speed V and the vehicle acceleration dV/dt which is calculated from the vehicle traveling speed V. ECU 20 further functions as the filter switching means for selecting a preferable one of a plurality of filters in accordance with the control mode determined by the mode setting means. The plurality of filters are used to change the response sensitivity in the aiming adjustment of the headlights 30L and 30R. Moreover, ECU 20 functions as the aiming adjusting means for adjusting the aiming direction of the headlights 30L and 30R based on the actuator drive angle θa corresponding to the pitch angle θpf which is obtained by modifying the pitch angle θp calculated by the gradient calculating means with the filter selected by the filter switching means. Furthermore, ECU 20 functions as the turning judging means for judging a turning condition of the automotive vehicle based on a difference between right and left wheel speeds $V_R$ and $V_L$. ECU 20 causes the aiming adjusting means to reset the aiming direction of the headlights 30L and 30R to an initial position when the turning judging means judges that the automotive vehicle is turning (i.e., the turning flag XT$_N$ is turned on).

Accordingly, in ECU 20 functioning as the gradient calculating means, the pitch angle θp is calculated, as an inclination of the aiming direction of the headlights 30L and 30R of the automotive vehicle with respect to a horizontal plane, based on the output values HF and HR of the height sensors 11F and 11R provided at the front and rear portions of the vehicle body. Furthermore, in ECU 20 functioning as the mode setting means, the preferable control mode corresponding to the present traveling condition is determined based on the vehicle traveling speed V detected by the wheel speed sensor 12 and the vehicle acceleration α calculated from the vehicle traveling speed V. Furthermore, in ECU 20 functioning as the filter switching means, a preferable filter is selected in accordance with the control mode for changing the response sensitivity in the aiming adjustment of the headlights 30L and 30R. Moreover, in ECU 20 functioning as the aiming adjusting means, the aiming direction of the headlights 30L and 30R is adjusted based on the pitch angle θpf processed by the selected filter. In this case, the aiming direction of the headlights 30L and 30R set by ECU 20 functioning as the aiming adjusting means is returned to the initial position when ECU 20 functioning as the turning judging means judges that the automotive vehicle is turning. Accordingly, the pitch angle θp is modified by using an optimum filter corresponding to the present traveling condition of the automotive vehicle. Thus, the aiming adjustment of the headlights 30L and 30R can be performed with an appropriate response sensitivity. Furthermore, when the automotive vehicle is traveling on a cornered or curved road, the actuator 35L (35R) is returned to the initial position. Thus, even when the vehicle body shows unstable behavior, the aiming adjustment for the headlights 30L and 30R is performed properly.

Furthermore, according to the automatic aiming adjustment apparatus for the headlights of an automotive vehicle of the modified third embodiment, a delay or waiting duration equivalent to the predetermined time Tc can be provided when ECU 20 functioning as the turning judging means judges that the automotive vehicle is turning. Thus, the aiming direction of the headlights 30L and 30R adjusted by ECU 20 functioning as the aiming adjusting means is returned to the initial position after the predetermined time Tc has passed.

Accordingly, the aiming direction of the headlights 30L and 30R is not immediately returned to the initial position in response to a turning motion of the automotive vehicle detected by ECU 20 functioning as the turning judging means. After the predetermined time Tc has completely passed, the aiming direction is reset to the initial position. Therefore, the aiming direction of the headlights 30L and 30R is surely stabilized before the aiming direction is returned to the initial position. In the aiming adjustment for the headlights 30L and 30R during a turning condition of the automotive vehicle, it becomes possible to prevent the actuator 35L (35R) from being erroneously driven in response to a large variation of the pitch angle θp for a predetermined duration corresponding to an elapse of the predetermined time Tc after the automotive vehicle starts turning. Furthermore, it becomes possible to prevent the headlights 30L and 30R from dazzling an oncoming vehicle's driver or prevent the subjective vehicle's driver from losing the visibility in a far area.

Figure 24:
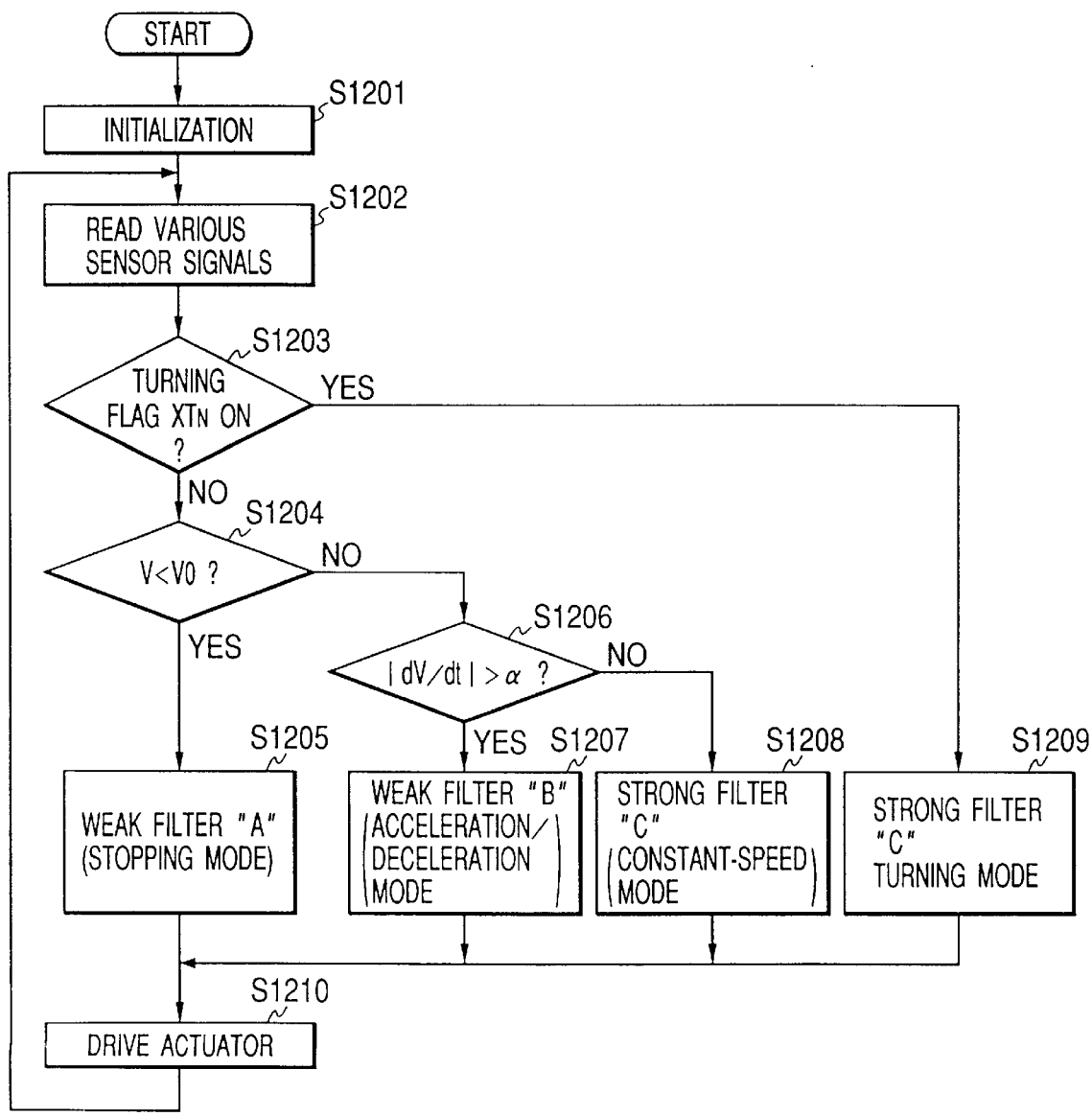
FIG. 24 is a flowchart showing another modification of the aiming control procedure shown in FIG. 19.

Next, FIG. 24 is a flowchart showing another modified aiming control procedure performed in CPU 21 of ECU 20 incorporated in the automatic aiming adjustment apparatus for the headlights of an automotive vehicle in accordance with the third embodiment of the present invention. This routine is executed at intervals of approximately 50 msec. According to the previously-described embodiment, the aiming adjustment is interrupted in response to a detection of the turning motion of the automotive vehicle. According to the above-described modified embodiment, the aiming direction is returned to the initial position when the automotive vehicle is turning. According to this routine, the actuator response is delayed (i.e., a strong filter is used) in the aiming adjustment when the automotive vehicle is turning. The judgement of the turning motion of the automotive vehicle is performed by the above-described routine shown in FIG. 20. Thus, detailed explanation of the turning judgement will be omitted.

In FIG. 24, step S1201 performs initialization processing. Then, control flow proceeds to step S1202 to read various sensor signals including the wheel speed pulses, the front height value HF, and the rear height value HR. Then, the control flow proceeds to step S1203 to judge whether the turning flag $XT_N$ set in FIG. 20 is turned on. When the judgement condition is not satisfied in step S1203, i.e., when the automotive vehicle is not turning, the control flow proceeds to step S1204 to judge whether the vehicle traveling speed V is smaller than a predetermined value Vo. The vehicle traveling speed V is calculated from the wheel speed pulses read in the step S1202. The predetermined value Vo is, for example, 2 [km/h] as shown in FIG. 13. When the judgement condition is satisfied in step S1204, the control flow proceeds to step S1205 to set the weak filter A shown in FIG. 13. Namely, it is regarded that the vehicle driving condition is in the stopping mode. The pitch angle θp calculated according to the above-described equation (1) is processed by using the selected weak filter A. The pitch angle θpf processed by the selected weak filter A can follow up the transition of the actual pitch angle θp to a certain degree.

On the other hand, when the judgement condition is not satisfied in the step S1204, i.e., when the vehicle traveling speed V is not smaller than 2 [km/h] the control flow proceeds to step S1206 to judge whether the absolute value of the vehicle acceleration dV/dt exceeds a predetermined threshold α. The vehicle acceleration dV/dt is a differential value of the vehicle traveling speed V. The predetermined threshold α is, for example, ±2 [m/s$^2$] as shown in FIG. 13. When the judgement condition is satisfied in step S1206, the control flow proceeds to step S1207 to set the weak filter B shown in FIG. 13. Namely, it is regarded that the vehicle driving condition is in the acceleration or deceleration mode. The pitch angle θp calculated according to the above-described equation (1) is processed by using the selected weak filter B. The pitch angle θpf processed by the selected weak filter B can follow up the transition of the actual pitch angle θp to a certain degree in the same manner as the above-described stopping mode.

On the other hand, when the judging condition is not satisfied in step S1206, i.e., when the absolute value of the vehicle acceleration dV/dt is not larger than the predetermined threshold α, it is concluded that the automotive vehicle is traveling at a constant speed. Thus, the control flow proceeds to step S1208 to set the strong filter C shown in FIG. 13. The pitch angle θp calculated according to the above-described equation (1) is processed by using the selected strong filter C. The pitch angle θpf processed by the selected strong filter C is robust against fine vibration and therefore includes no higher frequency component appearing during the transition of the actual pitch angle θp. Hence, when the automotive vehicle is accelerated or decelerated during a normal driving condition, the weak filter is selected based on the judgements on the vehicle speed and the vehicle acceleration. Therefore, the actuator can be driven quickly.

On the other hand, when the judgement condition is satisfied in the step S1203, i.e., when the turning flag $XT_N$ is turned on (i.e., the automotive vehicle is traveling on a cornered or curved road), it is regarded that the automotive vehicle is in a turning mode. The control flow proceeds to step S1209 to set the strong filter C shown in FIG. 13. The pitch angle θp calculated according to the above-described equation (1) is processed by using the selected strong filter C in the same manner as the above-described constant-speed mode. The pitch angle θpf processed by the selected strong filter C is robust against fine vibration and therefore includes no higher frequency component appearing during the transition of the actual pitch angle θp, only responsive to large vibrations which are not negligible.

As described in the foregoing description, the pitch angle θpf is obtained as a result of the filtering processing which selects an adequate filter in accordance with each of the stopping mode of step S1205, the acceleration or deceleration mode of step S1207, the constant-speed mode of step S1208, and the turning mode of step S1209. Thus, an actuator drive angle (i.e., target aiming adjustment angle) $\theta a$ which does not dazzle an oncoming vehicle's driver is calculated based on the filtered pitch angle $\theta pf$. In this case, $\theta a \approx -\theta pf$. Next, the control flow proceeds to step S1210 to drive the actuator 35L (35R) in accordance with the actuator drive angle $\theta a$ so as to adjust the aiming direction of the headlight 30L (30R). Then, the control flow returns to step S1202 to repetitively perform the processing of steps S1202 through S1210.

In general, when the automotive vehicle is traveling on a cornered or curved road, the vehicle body shows unstable behavior causing fine variations in the pitch angle. If the aiming adjustment is performed in such unstable condition, the aiming direction will be controlled unintendedly. This is why the strong filter C is used to process the pitch angle $\theta p$ to forcibly remove fine variations and respond to only large variation. Although not shown, the control speed of the actuator 35L (35R) may be variable and finely controlled in this embodiment. Accordingly, the aiming adjustment for the headlight 30L (30R) can be properly performed in accordance with the vehicle traveling condition (i.e., each of the stopping mode, the acceleration/deceleration mode, the constant-speed mode, and the turning mode).

As apparent from the foregoing description, the automatic aiming adjustment apparatus for the headlights of an automotive vehicle of the modified third embodiment comprises a pair of the height sensors 11F and 11R provided at front and rear portions of the vehicle body to detect the variation of the vehicle height, respectively. ECU 20 functions as the gradient calculating means for calculating the pitch angle $\theta p$, which is an inclination of an aiming direction of the headlights 30L and 30R of the automotive vehicle with respect to a horizontal plane, based on output values HF and HR of the height sensors 11F and 11R. The wheel speed sensor 12 functions as the vehicle speed sensor for detecting the vehicle traveling speed V based on a left wheel speed $V_L$ and a right wheel speed $V_R$ of the automotive vehicle. ECU 20 further functions as the mode setting means for determining a control mode suitable for the present traveling condition based on the vehicle traveling speed V and the vehicle acceleration dV/dt which is calculated from the vehicle traveling speed V. ECU 20 further functions as the filter switching means for selecting a preferable one of a plurality of filters in accordance with the control mode determined by the mode setting means. The plurality of filters are used to change the response sensitivity in the aiming adjustment of the headlights 30L and 30R. Moreover, ECU 20 functions as the aiming adjusting means for adjusting the aiming direction of the headlights 30L and 30R based on the actuator drive angle $\theta a$ corresponding to the pitch angle $\theta pf$ which is obtained by modifying the pitch angle $\theta p$ calculated by the gradient calculating means with the filter selected by the filter switching means. Furthermore, ECU 20 functions as the turning judging means for judging a turning condition of the automotive vehicle based on a difference between right and left wheel speeds $V_R$ and $V_L$. The actuator response is delayed in the aiming adjustment for the headlights 30L and 30R performed by the aiming adjusting means when the tuning judging means judges that the automotive vehicle is turning (i.e., the turning flag $XT_N$ is turned on).

Accordingly, in ECU 20 functioning as the gradient calculating means, the pitch angle $\theta p$ is calculated, as an inclination of the aiming direction of the headlights 30L and 30R of the automotive vehicle with respect to a horizontal plane, based on the output values HF and HR of the height sensors 11F and 11R provided at the front and rear portions of the vehicle body. Furthermore, in ECU 20 functioning as the mode setting means, the preferable control mode corresponding to the present traveling condition is determined based on the vehicle traveling speed V detected by the wheel speed sensor 12 and the vehicle acceleration $\alpha$ calculated from the vehicle traveling speed V. Furthermore, in ECU 20 functioning as the filter switching means, a preferable filter is selected in accordance with the control mode for changing the response sensitivity in the aiming adjustment of the headlights 30L and 30R. Moreover, in ECU 20 functioning as the aiming adjusting means, the aiming direction of the headlights 30L and 30R is adjusted based on the pitch angle $\theta pf$ processed by the selected filter. In this case, the actuator response is delayed in the aiming adjustment for the headlights 30L and 30R performed by ECU 20 functioning as the aiming adjusting means when ECU 20 functioning as the turning judging means judges that the automotive vehicle is turning. Accordingly, the pitch angle $\theta p$ is modified by using an optimum filter corresponding to the present traveling condition of the automotive vehicle. Thus, the aiming adjustment of the headlights 30L and 30R can be performed with an appropriate response sensitivity. Furthermore, when the automotive vehicle is traveling on a cornered or curved road, the response of actuator 35L (35R) is delayed by using the above-described strong filter. Thus, even when the vehicle body shows unstable behavior, the aiming adjustment for the headlights 30L and 30R is performed properly.

Furthermore, according to the automatic aiming adjustment apparatus for the headlights of an automotive vehicle of the modified third embodiment, a delay or waiting duration equivalent to the predetermined time Tc can be provided when ECU 20 functioning as the turning judging means judges that the automotive vehicle is turning. Thus, the actuator response in the aiming adjustment for the headlights 30L and 30R performed by ECU 20 functioning as the aiming adjusting means is delayed after the predetermined time Tc has passed.

Accordingly, the actuator response in the aiming adjustment for the headlights 30L and 30R is not immediately delayed in response to a turning motion of the automotive vehicle detected by ECU 20 functioning as the turning judging means. After the predetermined time Tc has completely passed, the actuator response is delayed. Therefore, the aiming direction of the headlights 30L and 30R is surely stabilized before the actuator response is delayed by the strong filter. In the aiming adjustment for the headlights 30L and 30R during a turning condition of the automotive vehicle, it becomes possible to prevent the actuator 35L (35R) from being erroneously driven in response to a large variation of the pitch angle $\theta p$ for a predetermined duration corresponding to an elapse of the predetermined time Tc after the automotive vehicle starts turning. Furthermore, it becomes possible to prevent the headlights 30L and 30R from dazzling an oncoming vehicle's driver or prevent the subjective vehicle's driver from losing the visibility in a far area.

This invention may be embodied in several forms without departing from the spirit of essential characteristics thereof. The present embodiments as described are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. An apparatus for automatically adjusting aiming of headlights of an automotive vehicle, comprising:

a vehicle height sensor for detecting a change in a vehicle height of an automotive vehicle;

gradient calculating means for calculating an inclination of an aiming direction of headlights of the automotive vehicle with respect to a horizontal plane based on an output value of said vehicle height sensor;

a vehicle speed sensor detecting a vehicle traveling speed of said automotive vehicle;

mode setting means for determining a control mode suitable for a present traveling condition based on said vehicle traveling speed and an acceleration of said automotive vehicle, said acceleration being obtained based on said vehicle speed;

filter switching means for selecting a preferable one of a plurality of filters in accordance with the control mode determined by said mode setting means, said plurality of filters being used to change response sensitivity in the aiming adjustment for said headlights; and aiming adjusting means for adjusting the aiming direction of said headlights based on a filtered angle which is obtained by modifying said inclination calculated by said gradient calculating means with the filter selected by said filter switching means.

2. The apparatus for automatically adjusting aiming of headlights of an automotive vehicle in accordance with claim 1, wherein said mode setting means sets an initial control mode for a predetermined time immediately after said control mode is switched.

3. The apparatus for automatically adjusting aiming of headlights of an automotive vehicle in accordance with claim 2, wherein said mode setting means sets said initial control mode only when the absolute value of a change in said inclination of said aiming direction exceeds a predetermined value.

4. The apparatus for automatically adjusting aiming of headlights of an automotive vehicle in accordance with claim 2, wherein said mode setting means sets said initial control mode only when a change in said inclination of said aiming direction exceeds a predetermined value corresponding to an acceleration or a deceleration of said automotive vehicle.

5. The apparatus for automatically adjusting aiming of headlights of an automotive vehicle in accordance with claim 2, wherein said mode setting means sets said initial control mode only when both a change in said acceleration of said automotive vehicle and a change in said inclination exceed predetermined values respectively corresponding to an acceleration or a deceleration of said automotive vehicle.

6. The apparatus for automatically adjusting aiming of headlights of an automotive vehicle in accordance with claim 2, wherein said mode setting means sets said initial control mode only when a change in said inclination exceeds a predetermined value corresponding to an acceleration or a deceleration of said automotive vehicle and a change of an output value obtained from said vehicle height sensor is within a predetermined value.

7. The apparatus for automatically adjusting aiming of headlights of an automotive vehicle in accordance with claim 1, wherein said mode setting means calculates said vehicle traveling speed by accumulating pulse numbers detected by said vehicle speed sensor for a predetermined time required to assure desired acceleration accuracy in determining said control mode, and renews the vehicle traveling speed every predetermined time corresponding to an adjustment interval for the aiming adjustment performed by said aiming adjusting means.

8. The apparatus for automatically adjusting aiming of headlights of an automotive vehicle in accordance with claim 1, further comprising inclination correcting means used in an event of malfunction of the system for correcting said inclination calculated by said gradient calculating means based on a deviation of a present output value of said vehicle height sensor from a referential output value representing a standard vehicle height.

9. The apparatus for automatically adjusting aiming of headlights of an automotive vehicle in accordance with claim 1, further comprising memory means for memorizing a mean angle as an average of said inclination calculated by said gradient calculating means when said automotive vehicle is traveling at a constant speed, and said aiming adjusting means adjusts the aiming direction of said headlights based on said mean angle of the inclination in an event of malfunction of the system.

10. An apparatus for automatically adjusting aiming of headlights of an automotive vehicle, comprising:

a vehicle height sensor for detecting a change in a vehicle height of an automotive vehicle;

gradient calculating means for calculating an inclination of an aiming direction of headlights of the automotive vehicle with respect to a horizontal plane based on an output value of said vehicle height sensor;

a vehicle speed sensor detecting a vehicle traveling speed of said automotive vehicle;

mode setting means for determining a control mode suitable for a present traveling condition based on said vehicle traveling speed and an acceleration of said automotive vehicle, said acceleration being obtained based on said vehicle speed;

filter switching means for selecting a preferable one of a plurality of filters in accordance with the control mode determined by said mode setting means, said plurality of filters being used to change response sensitivity in the aiming adjustment for said headlights; and aiming adjusting means for adjusting the aiming direction of said headlights based on a filtered angle which is obtained by modifying said inclination calculated by said gradient calculating means with the filter selected by said filter switching means, wherein said mode setting means provides a plurality of judging levels for detecting a transfer of the automotive vehicle into an acceleration or deceleration condition, and the control mode is set to a mode corresponding to vehicle's accelerating or deceleration condition when the vehicle acceleration exceeds a lower judging level of said plurality of judging levels for a predetermined time or when the vehicle acceleration exceeds an upper judging level of said plurality of judging levels.

11. The apparatus for automatically adjusting aiming of headlights of an automotive vehicle in accordance with claim 10, wherein said aiming adjusting means comprises aiming correcting means for correcting a target aiming direction, which is set as an initial value for said headlights, in accordance with at least one of a braking distance corresponding to a present vehicle traveling speed and a distance to a preceding vehicle.

12. An apparatus for automatically adjusting aiming of headlights of an automotive vehicle, comprising:

a vehicle height sensor for detecting a change in a vehicle height of an automotive vehicle;

gradient calculating means for calculating an inclination of an aiming direction of headlights of the automotive vehicle with respect to a horizontal plane based on an output value of said vehicle height sensor;

a vehicle speed sensor detecting a vehicle traveling speed of said automotive vehicle;

mode setting means for determining a control mode suitable for a present traveling condition based on said vehicle traveling speed and an acceleration of said automotive vehicle, said acceleration being obtained based on said vehicle speed;

filter switching means for selecting a preferable one of a plurality of filters in accordance with the control mode determined by said mode setting means, said plurality of filters being used to change response sensitivity in the aiming adjustment for said headlights;

aiming adjusting means for adjusting the aiming direction of said headlights based on a filtered angle which is obtained by modifying said inclination calculated by said gradient calculating means with the filter selected by said filter switching means; and turning judging means for judging a turning condition of said automotive vehicle, wherein aiming adjustment for said headlights performed by said aiming adjusting means is interrupted when said turning judging means judges that the automotive vehicle is turning.

13. An apparatus for automatically adjusting aiming of headlights of an automotive vehicle, comprising:

a vehicle height sensor for detecting a change in a vehicle height of an automotive vehicle;

gradient calculating means for calculating an inclination of an aiming direction of headlights of the automotive vehicle with respect to a horizontal plane based on an output value of said vehicle height sensor;

a vehicle speed sensor detecting a vehicle traveling speed of said automotive vehicle;

mode setting means for determining a control mode suitable for a present traveling condition based on said vehicle traveling speed and an acceleration of said automotive vehicle, said acceleration being obtained based on said vehicle speed;

filter switching means for selecting a preferable one of a plurality of filters in accordance with the control mode determined by said mode setting means, said plurality of filters being used to change response sensitivity in the aiming adjustment for said headlights;

aiming adjusting means for adjusting the aiming direction of said headlights based on a filtered angle which is obtained by modifying said inclination calculated by said gradient calculating means with the filter selected by said filter switching means; and turning judging means for judging a turning condition of said automotive vehicle, wherein an aiming direction of said headlights set by said aiming adjusting means is returned to an initial position when said turning judging means judges that the automotive vehicle is tuning.

14. An apparatus for automatically adjusting aiming of headlights of an automotive vehicle, comprising:

a vehicle height sensor for detecting a change in a vehicle height of an automotive vehicle;

gradient calculating means for calculating an inclination of an aiming direction of headlights of the automotive vehicle with respect to a horizontal plane based on an output value of said vehicle height sensor;

a vehicle speed sensor detecting a vehicle traveling speed of said automotive vehicle;

mode setting means for determining a control mode suitable for a present traveling condition based on said vehicle traveling speed and an acceleration of said automotive vehicle, said acceleration being obtained based on said vehicle speed;

filter switching means for selecting a preferable one of a plurality of filters in accordance with the control mode determined by said mode setting means, said plurality of filters being used to change response sensitivity in the aiming adjustment for said headlights;

aiming adjusting means for adjusting the aiming direction of said headlights based on a filtered angle which is obtained by modifying said inclination calculated by said gradient calculating means with the filter selected by said filter switching means; and turning judging means for judging a turning condition of said automotive vehicle, wherein response of aiming adjustment for said headlights performed by said aiming adjusting means is delayed when said turning judging means judges that the automotive vehicle is turning.

15. The apparatus for automatically adjusting aiming of headlights of an automotive vehicle in accordance with any one of claims 12 to 14, wherein a predetermined duration is provided when said tuning judging means judges that said automotive vehicle is turning, and said aiming adjustment for said turning condition performed by said aiming adjusting means is started after said predetermined duration has passed.

* * * * *